United States Patent
Miyata et al.

(10) Patent No.: US 10,746,911 B2
(45) Date of Patent: Aug. 18, 2020

(54) TRANSPARENT HEAT-SHIELDING/HEAT-INSULATING MEMBER HAVING TRANSPARENT SCREEN FUNCTION

(71) Applicant: Maxell Holdings, Ltd., Otokuni-gun, Kyoto (JP)

(72) Inventors: Teruhisa Miyata, Kyoto (JP); Yoshimasa Mitsumoto, Kyoto (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 108 days.

(21) Appl. No.: 16/073,646

(22) PCT Filed: Jan. 27, 2017

(86) PCT No.: PCT/JP2017/002981
§ 371 (c)(1),
(2) Date: Jul. 27, 2018

(87) PCT Pub. No.: WO2017/131174
PCT Pub. Date: Aug. 3, 2017

(65) Prior Publication Data
US 2019/0033504 A1    Jan. 31, 2019

(30) Foreign Application Priority Data
Jan. 29, 2016    (JP) .................................. 2016-015080

(51) Int. Cl.
*G02B 5/28*    (2006.01)
*G03B 21/62*    (2014.01)
(Continued)

(52) U.S. Cl.
CPC ............... *G02B 5/282* (2013.01); *B32B 7/02* (2013.01); *G02B 5/02* (2013.01); *G02B 5/0242* (2013.01);
(Continued)

(58) Field of Classification Search
None
See application file for complete search history.

(56) References Cited

U.S. PATENT DOCUMENTS

| | | |
|---|---|---|
| 6,404,543 B1 | 6/2002 | Shoshi et al. |
| 2001/0005282 A1 | 6/2001 | Etori et al. |

(Continued)

FOREIGN PATENT DOCUMENTS

| | | |
|---|---|---|
| JP | 2003-337381 A | 11/2003 |
| JP | 2004-219900 A | 8/2004 |

(Continued)

OTHER PUBLICATIONS

International Search Report for PCT/JP2017/002981 (PCT/ISA/210) dated Apr. 18, 2017.

*Primary Examiner* — Derek S. Chapel
(74) *Attorney, Agent, or Firm* — Birch, Stewart, Kolasch & Birch, LLP

(57) ABSTRACT

A transparent heat-shielding/heat-insulating member having a transparent screen function of the present invention includes: an infrared reflective layer and an optical adjustment protective layer in this order from a transparent base substrate side; and a light diffusing layer on a surface of the transparent base substrate that is opposite to the surface on which the infrared reflective layer is formed or between the transparent base substrate and the infrared reflective layer. The optical adjustment protective layer includes at least a high refractive index layer and a low refractive index layer in this order from the infrared reflective layer side. The transparent heat-shielding/heat-insulating member has a visible light reflectance of 12% or more and 30% or less, a haze value of 5% or more and 35% or less, a shading coefficient of 0.69 or less, and a normal emissivity of 0.22 or less.

8 Claims, 10 Drawing Sheets

(51) Int. Cl.
*G02B 5/02* (2006.01)
*B32B 7/02* (2019.01)
*G02B 5/26* (2006.01)

(52) U.S. Cl.
CPC ............ *G02B 5/0278* (2013.01); *G02B 5/26* (2013.01); *G02B 5/28* (2013.01); *G03B 21/62* (2013.01)

(56) References Cited

U.S. PATENT DOCUMENTS

| | | |
|---|---|---|
| 2005/0018285 A1 | 1/2005 | Kubota et al. |
| 2006/0181769 A1 | 8/2006 | Kumasawa et al. |
| 2007/0097509 A1 | 5/2007 | Nevitt et al. |
| 2015/0153639 A1 | 6/2015 | Tokunaga |
| 2016/0003989 A1 | 1/2016 | Watanabe et al. |
| 2016/0258694 A1 | 9/2016 | Mitsumoto et al. |
| 2016/0282529 A1 | 9/2016 | Miyata et al. |

FOREIGN PATENT DOCUMENTS

| | | |
|---|---|---|
| JP | 2007-3764 A | 1/2007 |
| JP | 3993980 B2 | 10/2007 |
| JP | 4190657 B2 | 12/2008 |
| JP | 2009-514037 A | 4/2009 |
| JP | 4822104 B2 | 11/2011 |
| JP | 5214577 B2 | 6/2013 |
| JP | 2013-210454 A | 10/2013 |
| JP | 2014-141015 A | 8/2014 |
| JP | 2014-167617 A | 9/2014 |
| JP | 2014-170171 A | 9/2014 |
| JP | 2016-161917 A | 9/2016 |
| JP | 2016-186627 A | 10/2016 |
| JP | 2017-53967 A | 3/2017 |

TRANSPARENT HEAT-SHIELDING/HEAT-INSULATING MEMBER HAVING TRANSPARENT SCREEN FUNCTION

TECHNICAL FIELD

The present invention relates to a transparent heat-shielding/heat-insulating member having a transparent screen function that enables an image projected onto a screen by a projector to be seen as a reflected image from the projector side and as a transmitted image from the opposite side of the projector across the screen, or in other words, enables the image to be clearly viewed from both sides by viewers, as well as the background to be transparently viewed with clarity, while having excellent scratch resistance and excellent appearance.

BACKGROUND ART

From the viewpoint of preventing global warming and saving energy, in order to block heat rays (infrared rays) from sunlight entering through the windows of buildings, display windows of shops, the windows of vehicles and the like, a transparent heat-shielding member is commonly provided on or within a window pane or an organic transparent substrate, thereby to reduce the temperature inside the room or vehicle (for example, Patent Documents 1 and 2). In addition, recently, from the viewpoint of saving energy throughout the year, transparent heat-shielding/heat-insulating members having not only heat shielding properties that block heat rays that cause a temperature increase in summer, but also heat-insulating properties that suppress the escape of heat from the inside of the room in winter by shielding far-infrared rays emitted from the inside to the outside of the room through a light transmitting member (reflecting far-infrared rays toward the inside of the room) so as to reduce the heating load have been proposed as solar control films and are increasingly introduced into the market (for example, Patent Documents 3 and 4).

In recent years, attention has been focused on so-called "digital signage" used as a medium for providing advertisements, guidance and information, instead of conventional signboards, posters and large screen displays, in particular, in glass-walled commercial establishments, and display windows of convenience stores, department stores, and shops such as clothes and automobile shops by attaching a transparent screen onto a window or a display window so as to allow the window itself to function as a large screen, and projecting and displaying various content images such as advertisements, merchandise information and other information by using a projector from the inside while the transparent viewability is maintained at a level at which the interior state and goods can be viewed from the outside, because the digital signage has a very high eye-catching effect for people who are outside, is easily adapted to changes in the content, and is convenient. Likewise, in automobiles, attention has been focused on a head-up display (HUD) apparatus that projects and displays navigation information from a small-sized projector by using a portion of the surface of the windshield, a transparent or semi-transparent beam splitter, called a combiner, provided near the rearview mirror or near the driver's sight lines, or the like, or that projects and displays navigation information as a virtual image through the windshield, so as to allow the driver to see the navigation information without significantly moving his/her viewing point (for example, Patent Documents 5 to 8).

PRIOR ART DOCUMENTS

Patent Documents

Patent Document 1: Japanese Patent No. 4190657
Patent Document 2: JP 2014-170171 A
Patent Document 3: JP 2014-141015 A
Patent Document 4: JP 2014-167617
Patent Document 5: Japanese Patent No. 3993980
Patent Document 6: JP 2013-210454 A
Patent Document 7: Japanese Patent No. 4822104
Patent Document 8: Japanese Patent No. 5214577

DISCLOSURE OF INVENTION

Problem to be Solved by the Invention

The heat-shielding/heat-insulating members of Patent Documents 3 and 4 can, by being attached to a window, provide a heat-shielding/heat-insulating function to the window itself, but they are not always sufficient in the appearance and scratch resistance. The heat-shielding/heat-insulating members hardly function as a transparent screen for digital signage because they are not provided with a transparent screen function that displays content projected by a projector, and a design that gives consideration thereto is not disclosed.

To be specific, Patent Document 3 discloses a stacked film in which a heat ray reflective layer and a hardcoat layer having a thickness of 0.5 to 2.0 μm are stacked in order on a substrate, the heat ray reflective layer having a multilayer structure in which a thin metal film and a thin metal oxide film are alternately stacked. The stacked film disclosed in Patent Document 3 is an infrared reflective stacked film, and has a heat-insulating function that reflects infrared rays toward the inside of the room and excellent scratch resistance. However, since the heat ray reflective layer generally has a relatively high reflectance at a wavelength range of visible light (380 to 780 nm), the hardcoat layer formed on the heat ray reflective layer by coating produces a noticeable glittering phenomenon in the appearance called "iridescent phenomenon" caused by a multi-reflective interference between interfacial reflection at the hardcoat layer and interfacial reflection at the heat ray reflective layer even the presence of a slight variation in the thickness of the hardcoat layer, which may present a problem of appearance when it is used by being attached to a window or the like. Moreover, when the thickness of the hardcoat layer is reduced in order to suppress the absorption of infrared rays and allow the heat-insulating function to work, particularly the thickness of the hardcoat layer is reduced to several hundred nanometers that overlap the wavelength range of visible light (380 to 780 nm), a change in a reflected color as a whole due to a change in the optical path length increases when viewed from a different angle, which may present a problem of appearance when it is used by being attached to a window or the like. Moreover, at least an element for sufficiently scattering light is not included in the constituent members, and other designs that give consideration to a transparent screen are not disclosed, and thus the stacked film hardly functions as a transparent screen for digital signage.

Patent Document 4 discloses an infrared reflective film including an infrared reflective layer and a transparent protective layer having a thickness of 30 to 150 nm in this order on a transparent film substrate, the infrared reflective layer including a first metal oxide layer, a metal layer and a second metal oxide layer in this order, and the transparent protective layer including an organic layer. The infrared reflective film disclosed in Patent Document 4 is of infrared reflective type, and has a favorable heat-insulating function that reflects infrared rays toward the inside of the room and excellent appearance. However, if the thickness of the transparent protective layer is extremely reduced to 30 to 150 nm or less, which is smaller than the wavelength range of visible light, in order to suppress the aforementioned iridescent phenomenon that occurs in the appearance, scratch resistance tends to decrease when the film is rubbed strongly by a cloth or the like, and scratches are likely to be made on the film surface at the time of the maintenance such as cleaning of the applied film, which may present problems caused by the scratches such as poor appearance and corrosion of metal layers. Moreover, at least an element for sufficiently scattering light is not included in the constituent members, and other designs that give consideration to a transparent screen are not disclosed, and thus the infrared reflective film hardly functions as a transparent screen for digital signage.

In an infrared reflective heat-shielding/heat-insulating film including an infrared reflective layer composed of a stack of a thin metal film and a thin metal oxide film as disclosed in Patent Documents 3 and 4, the thin metal film usually has an infrared reflecting function and is formed of a low refractive index layer made of silver or the like that has a relatively low visible light absorption, and the thin metal oxide film has a protection function that, while maintaining the infrared reflecting function of the thin metal film, controls the reflectance at a wavelength in the visible light range so as to increase the transmittance in the visible light range and that suppresses migration of metals in the thin metal film, and is usually formed from a material having a refractive index as high as 1.7 or more.

Accordingly, when an ultraviolet (UV) hardening-type hardcoat layer made of an acrylic-based resin having a refractive index of, for example, around 1.5, which is usually used as a protective layer, is formed on the infrared reflective layer composed of a stack of a thin metal film and a thin metal oxide film, a multi-reflective interference occurs at each interface due to the difference in the refractive index between each layer of the infrared reflective layer and the hardcoat layer and the thickness of each layer. As a result, the reflectance at each wavelength of visible light incident on the infrared reflective film varies significantly. That is, when a visible light reflectance spectrum of the infrared reflective film is obtained, a reflectance curve having a so-called "ripple", which is a shape with significant fluctuations of peaks (maximum reflectance) and valleys (minimum reflectance), is observed.

Normally, a protective layer, such as an ultraviolet (UV) hardening-type hardcoat layer, made of an acrylic-based resin is applied and formed by a wet coating method, and it is practically difficult to uniformly coat the entire surface of a substrate with the protective layer without any variation in the thickness of the layer (thickness variation). It is therefore not possible to completely eliminate the thickness variation caused by the influence of non-uniform drying, non-uniform application, the surface condition of the substrate, or the like. The thickness variation of the protective layer appears as deviations of peaks and valleys in the wavelength in the visible light reflectance spectrum of the infrared reflective film, and causes the generation of an iridescent pattern especially when the thickness of the protective layer is reduced to several hundred nanometers.

When the thickness of the protective layer is extremely increased to a thickness as thick as, for example, several microns, the interval between peaks and valleys decreases in the visible light reflectance spectrum of the infrared reflective film, and even if there is some variation in the thickness of the protective layer, it is difficult to distinctively recognize the reflected color at a specific wavelength with the human eyes, and it is therefore almost not possible to perceive an iridescent pattern. Accordingly, the problem of appearance is unlikely to occur. However, the acrylic ultraviolet (UV) hardening-type hardcoat layer as the protective layer contains, in its molecular backbone, a large number of C=O groups, C—O groups and aromatic groups. For this reason, the acrylic UV hardcoat agent easily absorbs far-infrared rays having a wavelength of 5.5 to 25.2 µm when the protective layer is thick, and the heat-insulating properties of the infrared reflective film tend to decrease.

Accordingly, in order to impart more sufficient heat-insulating properties (for example, a normal emissivity of 0.22 or less and a heat transmission coefficient of 4.2 W/m$^2$·K or less) to the infrared reflective film, the thickness of the protective layer can be reduced to 1.0 µm or less so as to suppress the absorption of far-infrared rays having a wavelength of 5.5 to 25.2 µm as much as possible. However, as explained in connection with Patent Document 3 above, when the thickness of the protective layer is reduced to several hundred nanometers that overlap the wavelength range of visible light, the interval between peaks and valleys increases in the visible light reflectance spectrum of the infrared reflective film, and the human eyes can recognize it as a reflected color at a specific wavelength. Accordingly, even if there is a slight variation in the thickness of the protective layer, it is recognized as the iridescent phenomenon. In addition, a change in a reflected color as a whole due to a change in the optical path length when viewed from a different angle is also readily perceived, which may present a problem of appearance when it is used by being attached to a window or the like. Generally, red and yellow, which give an impression of hotness, and green, which deteriorates the design quality, tend to be avoided. In contrast, blue, which gives an impression of coolness and does not significantly deteriorate the design quality, tends to be preferred. However, when the thickness of the protective layer is reduced to several hundred nanometers that overlap the wavelength range of visible light, there are cases where red and green reflected colors become particularly noticeable in the iridescent pattern and in the reflected color as a whole when viewed from a different angle, which may deteriorate the appearance.

Furthermore, as explained in connection with Patent Document 4 above, when the thickness of the protective layer is extremely reduced to 30 to 150 nm, which is smaller than the wavelength range of visible light, the interval between peaks and valleys further increases in the visible light reflectance spectrum of the infrared reflective film, and a uniform color is observed as an interference reflected color, and thus the problem of appearance is unlikely to occur. However, the scratch resistance tends to decrease when the film is rubbed strongly by a cloth or the like, and thus scratches are likely to be made on the film surface at the time of the maintenance such as cleaning of the applied film, which still may present problems caused by the scratches such as poor appearance and corrosion of metal layers.

On the other hand, the transparent screen members disclosed in Patent Documents 5 to 7 can provide, by being attached to a window, a transparent screen function that displays content projected by a projector on the window itself, but they are not provided with an infrared ray reflecting function. In addition, a design that gives consideration thereto is not disclosed, and thus the transparent screen members hardly function as a transparent heat-shielding/heat-insulating member.

To be specific, Patent Document 5 discloses a transmissive screen obtained by coating a glass or PET (polyethylene terephthalate) film with a resin such as polyvinyl butyral resin, polystyrene-based resin, polyester-based resin, polyurethane-based adhesive or ultraviolet curable acrylate-based resin in which light diffusing particles such as acrylic resin particles, silicone resin particles or polystyrene resin particles are dispersed. However, none of the materials reflects infrared rays. In addition, a design that gives consideration thereto is not disclosed, and thus the transmissive screen hardly functions as a transparent heat-shielding/heat-insulating member.

Patent Document 6 discloses a transmissive screen obtained by coating a PET film with a hydrophilic resin such as a completely or partially saponified polyvinyl alcohol or a cationically modified polyvinyl alcohol in which light diffusing particles made of, for example, amorphous synthetic silica, alumina or hydrated alumina are dispersed. However, none of the materials reflects infrared rays. In addition, a design that gives consideration thereto is not disclosed, and thus the transmissive screen hardly functions as a transparent heat-shielding/heat-insulating member.

Patent Document 7 discloses a projection screen obtained by attaching, to both surfaces of a glass sheet, a PET film coated with a polarization-selective reflective layer made of a cholesteric liquid crystal resin having a selective reflection center wavelength in the visible region and a PET film in which a transmissive volume hologram has been recorded and fixed by application of a hologram photosensitive material made of a photo polymer or the like and exposure to light, by using a pressure-sensitive adhesive. However, as long as the scope of the disclosure of Patent Document 7 is considered, none of the materials reflects infrared rays. In addition, a design that gives consideration thereto is not disclosed, and thus the projection screen hardly functions as a transparent heat-shielding/heat-insulating member.

Patent Document 8 discloses a transmissive screen obtained by coating a glass sheet with a polyvinyl acetal resin in which nanodiamond particles having a very high refractive index are dispersed as light diffusing particles, or by forming them into a laminated glass. However, none of the materials reflects infrared rays. In addition, a design that gives consideration thereto is not disclosed, and thus the transmissive screen hardly functions as a transparent heat-shielding/heat-insulating member.

As described above, despite the fact that a large number of windows in the surrounding living space are required to have a heat-shielding/heat-insulating function as described above from the viewpoint of saving energy throughout the year or to have a transparent screen function as described above from the viewpoint of digital signage, surprisingly, to the best of the inventors' knowledge, a member that has both functions has not been found, and an idea of providing such a member has not been conceived yet.

Furthermore, recently, it is taken for granted that a transparent screen for window display is required to have a high viewability that enables a content image projected by a projector to be viewed from a wide range of angles so as to maximize the function as digital signage. In addition thereto, opportunities are gradually increasing not only for a content image to be viewed from outside of the window to which the transparent screen has been attached (from the opposite side of the projector across the screen) as a transmitted image, but also for the content image projected onto the transparent screen to be viewed from inside of the window (from the projector side with respect to the screen) as a reflected image, and therefore there is an increasing need for a transmissive screen having excellent viewability from the inside and outside of the window, or in other words, excellent viewability from both sides of the screen. However, commercially available transmissive transparent screens have high forward light scattering properties and thus can provide a clear transmitted image as viewed from the opposite side of the projector across the screen, but the backward light scattering properties are not so high, and thus although it is possible to view the reflected image from the projector side, the image has a low brightness (luminance) and slightly blurred. Accordingly, it cannot be said that the image clarity is sufficient.

It is an object of the present invention to provide a transparent heat-shielding/heat-insulating member having a transparent screen function that provides excellent heat-shielding and heat-insulating properties when used as a solar control transparent window film for saving energy throughout the year, and that provides excellent viewability from both sides of a screen onto which an image is projected when used as a transparent screen for digital signage, in particular, in terms of reflective viewability from the projector side, excellent brightness (luminance) and image clarity (less blur), the background to be transparently viewed with clarity, and that has excellent scratch resistance and excellent appearance with less reflected color change due to the iridescent phenomenon or viewing angle.

Means for Solving Problem

As a result of in-depth research to solve the above-described problems, the present inventors found that (1) by providing, on an infrared reflective layer formed on a transparent base substrate, an optical adjustment protective layer that includes at least a high refractive index layer and a low refractive index layer in this order from the infrared reflective layer side and that has a total thickness of 250 nm to 980 nm, it is possible to obtain a transparent heat-shielding/heat-insulating member that provides excellent heat-shielding and heat-insulating properties and excellent scratch resistance as a solar control transparent window film, and that has excellent appearance with less reflected color change due to the iridescent phenomenon or viewing angle.

Generally, in order for the infrared reflective layer to exhibit the heat-shielding performance (e.g., a shading coefficient of 0.69 or less), the reflectance in the near infrared region needs to be set high, which inevitably increases the visible light reflectance in wavelengths from 500 nm to 780 nm monotonously. FIG. 1 exemplifies a reflectance spectrum in the visible region to the near infrared region of an infrared reflective film in which an infrared reflective layer is formed on a polyethylene terephthalate (PET) film, observed in the light entrance measurement from a glass surface side, the PET surface side of the infrared reflective film being attached to the glass with a UV cut transparent pressure-sensitive adhesive. Also, in the visible light reflectance spectrum obtained in the case of providing a protective layer made of a general acrylic-based ultraviolet (UV) hardening-type hardcoat resin on the infrared reflective layer, there is a tendency that in the wavelengths from 500 nm to 780 nm the visible light reflectance largely varies in vertical direction as the wavelength increases, which may generate an iridescent pattern and increase the reflected color change due to the variation in the thickness of the protective layer. FIG. 2 exemplifies a reflectance spectrum in the visible region of an infrared reflective film in which a 680 nm-thick protective layer made of an acrylic-based hardcoat resin is formed on the infrared reflective layer of FIG. 1, observed in a light entrance measurement performed in the same manner as in FIG. 1. A dotted line in FIG. 2 indicates the reflectance spectrum in the visible region in FIG. 1.

As described above, the phenomenon that the reflected color change increases depending on the viewing angle is, if the viewing angle is oblique to the film, due to the shift of the wavelength of reflected light to the short-wavelength side, which is caused by a difference in the optical path length of light reflected from each interface, as compared with a case in which the viewing angle is perpendicular to the film. To cope with this, the present inventors considered that by minimizing the significant fluctuations of peaks and valleys of the reflectance spectrum in the green wavelength region (500 nm to 570 nm), which has a high relative luminous efficiency and deteriorates the design quality, and in the red wavelength region (620 nm to 780 nm), which gives an impression of hotness, so as to moderate the change in the reflectance particularly in the wavelength region from 500 nm to 780 nm corresponding to green to red colors, the reflected color change due to the iridescent phenomenon or viewing angle can be reduced even when there is a slight variation in the thickness of the protective layer. Thereby, the present inventors reached the following conclusion (1): the above conventional problems can be solved by providing, on an infrared reflective layer formed on a transparent base substrate, an optical adjustment protective layer that includes at least a high refractive index layer and a low refractive index layer in this order from the infrared reflective layer side, and setting the total thickness of the optical adjustment protective layer to 250 nm to 980 nm, from the viewpoint of attaining both of the scratch resistance and heat-insulating properties.

Further, the present inventors found that (2) by providing a light diffusing layer in which light diffusing particles are dispersed in a transparent resin, on a surface of the transparent base substrate that is opposite to the surface on which the infrared reflective layer is formed or between the transparent base substrate and the infrared reflective layer in addition to the above configuration, and by setting the transparent heat-shielding/heat-insulating member to have a visible light reflectance of 12% or more and 30% or less and a haze value of 5% or more and 35% or less, the transparent heat-shielding/heat-insulating member can serve as a transparent screen for digital signage that provides excellent viewability from both sides of a screen onto which an image is projected by a projector, in particular, in terms of reflective viewability from the projector side, excellent brightness (luminance) and image clarity (less blur), and the background to be transparently viewed with clarity.

Generally, transmissive transparent screens are designed to have high forward light scattering properties, but the backward light scattering properties are not so high, and thus although it is possible to view the reflected image from the projector side, the image has a low brightness (luminance) and slightly blurred. Accordingly, it cannot be said that the image clarity is sufficient. Therefore, the present inventors considered reflecting visible light properly by utilizing the infrared reflective layer of the transparent heat-shielding/heat-insulating member, so as to properly reflect the projected light from a projector and make up for the low backward light scattering properties of the light diffusing layer, as a result of which the brightness (luminance) and the image clarity (less blur) of the reflected image can be made better, while preventing a significant decrease in the visible light transmittance and maintaining the background viewability.

Next, the present inventors considered forming a light diffusing layer in which light diffusing particles are dispersed in a transparent resin, on a surface of the transparent base substrate that is opposite to the surface on which the infrared reflective layer is formed or between the transparent base substrate and the infrared reflective layer, so as not to disturb the reflection of far-infrared rays toward the inside of the room by the infrared reflective layer, and thereby the heat-insulating performance can be maintained without increasing the normal emissivity of the transparent heat-shielding/heat-insulating member.

The present inventors reached the above conclusion (2) based on the considerations described above.

The present inventors found that the transparent member configured by combining the conclusions (1) and (2) provides excellent heat-shielding and heat-insulating properties (having a shading coefficient of 0.69 or less and a normal emissivity of 0.22 or less) when used as a solar control transparent window film, and provides excellent viewability from both sides of a screen onto which an image is projected when used as a transparent screen for digital signage, in particular, in terms of reflective viewability from the projector side, excellent brightness (luminance) and image clarity (less blur), the background to be transparently viewed with clarity, and that has excellent scratch resistance and excellent appearance with less reflected color change due to the iridescent phenomenon or viewing angle. Thus, the present invention has been accomplished.

The present invention relates to a transparent heat-shielding/heat-insulating member having a transparent screen function that enables an image projected onto a screen by a projector to be seen as a reflected image from the projector side and as a transmitted image from the opposite side of the projector across the screen, or in other words, enables the image to be clearly viewed from both sides. The transparent heat-shielding/heat-insulating member having a transparent screen function includes, with respect to a transparent base substrate, at least: (1) an infrared reflective layer and an optical adjustment protective layer in this order from the transparent base substrate side; and (2) a light diffusing layer on a surface of the transparent base substrate that is opposite to the surface on which the infrared reflective layer is formed or between the transparent base substrate and the infrared reflective layer, wherein (3) the infrared reflective layer includes a metal layer and a metal oxide layer and/or a metal nitride layer, (4) the optical adjustment protective layer includes at least a high refractive index layer and a low refractive index layer in this order from the infrared reflective layer side, and has a total thickness of 250 nm to 980 nm, (5) the light diffusing layer contains a transparent resin and light diffusing particles, and the transparent heat-shielding/heat-insulating member having a transparent screen function has (6) a visible light reflectance measured in accordance with JIS R3106-1998 of 12% or more and 30% or less, (7) a haze value measured in accordance with JIS K7136-2000 of 5% or more and 35% or less, (8) a shading coefficient measured in accordance with JIS A5759-2008 of 0.69 or less, and (9) a normal emissivity measured in accordance with JIS R3106-2008 of 0.22 or less. Here, JIS is an abbreviation for the Japanese Industrial Standards.

With the transparent heat-shielding member having the configuration described above, the infrared reflective layer having a metal layer and a metal oxide layer and/or a metal nitride layer can reflect infrared rays of sunlight ranging from near-infrared rays to far-infrared rays efficiently, and thus good heat-shielding and heat-insulating characteristics can be obtained. Moreover, the optical adjustment protective layer stacked on the infrared reflective layer can significantly reduce the reflectance variation difference that is linked particularly with wavelengths in a range of 500 nm to 780 nm corresponding to green to red colors in the visible light reflectance spectrum, and thereby the change in the reflectance can be moderated. Therefore, even when the total thickness of the optical adjustment protective layer is set within a range that overlaps the wavelength range of visible light (380 to 780 nm) for the sake of attaining both of the scratch resistance and heat-insulating properties of the protective layer, the reflected color change due to the iridescent phenomenon or viewing angle can be reduced to a level where the change is hardly recognized with the human eyes, and thus an excellent appearance can be accomplished.

Moreover, the transparent heat-shielding/heat-insulating member having a visible light reflectance of 12 to 30% can reflect part of visible light properly, and allows most of the remaining light to pass therethrough. Accordingly, with a synergistic effect with the light diffusing layer in which light diffusing particles are dispersed in a transparent resin and that has a predetermined haze value, good visible light scattering/reflecting characteristics can be obtained. Thus, the viewability of a transmitted image and a reflected image projected by a projector is improved, and the reflection of far-infrared rays toward the inside of the room by the infrared reflective layer is hardly disturbed, and thereby high heat-insulating properties can be maintained.

Therefore, when the heat-shielding/heat-insulating transparent member having the configuration described above is used by being attached to a transparent substrate such as, for example, a window pane by using a transparent pressure-sensitive adhesive or the like, it can be used as a transparent heat-shielding/heat-insulating member that allows the background to be transparently viewed with clarity, or in other words, as a solar control transparent film for saving energy throughout the year, and at the same time, as a transparent screen for digital signage that allows a content image projected by a projector to be clearly viewed from both sides. Accordingly, the transparent heat-shielding/heat-insulating member is very useful in every scene.

It is preferable that the optical adjustment protective layer includes a high refractive index layer and a low refractive index layer in this order from the infrared reflective layer side, wherein the high refractive index layer has a refractive index at a wavelength of 550 nm of 1.65 to 1.95 and is set to have a thickness of 160 nm to 870 nm, and the low refractive index layer has a refractive index at a wavelength of 550 nm of 1.30 to 1.45 and is set to have a thickness of 75 nm to 125 nm so that the total thickness of the optical adjustment protective layer will be 250 nm to 980 nm.

In other words, by appropriately selecting and setting the thickness of the high refractive index layer from a range of 160 nm to 870 nm and the thickness of the low refractive index layer from a range of 75 nm to 125 nm, it becomes possible to significantly reduce the reflectance variation difference that is linked with wavelengths in a range of 500 nm to 780 nm in the visible light reflectance spectrum of the infrared reflective film. Meanwhile, the total thickness of the optical adjustment protective layer needs to be 250 nm or more from the viewpoint of obtaining the scratch resistance of the optical adjustment protective layer, and the total thickness of the optical adjustment protective layer needs to be 980 nm or less from the viewpoint of obtaining the heat-insulating properties. Therefore, when appropriately selecting and setting the thickness of the high refractive index layer from a range of 160 nm to 870 nm and the thickness of the low refractive index layer from a range of 75 nm to 125 nm, the total thickness of the optical adjustment protective layer, which is a sum of the thickness of the high refractive index layer and the thickness of the low refractive index layer, always needs to be 250 nm to 980 nm.

More specifically, when the total thickness of the optical adjustment protective layer is 250 nm (lower limit), the thicknesses of the respective layers are appropriately selected and set from a range of 160 nm to 175 nm for the high refractive index layer and from a range of 75 nm to 90 nm for the low refractive index layer so that the combination can reduce the reflectance variation difference in a range of wavelengths from 500 nm to 780 nm of the visible light reflectance spectrum. For example, the reflectance variation difference can be reduced by setting the thickness of the high refractive index layer (refractive index: 1.79) to 160 nm and setting the thickness of the low refractive index layer (refractive index: 1.38) to 90 nm.

When the total thickness of the optical adjustment protective layer is 980 nm (upper limit), the thicknesses of the respective layers are selected and set from a range of 855 nm to 870 nm for the high refractive index layer and from a range of 110 nm to 125 nm for the low refractive index layer so that the combination can reduce the reflectance variation difference. For example, the reflectance variation difference can be reduced by setting the thickness of the high refractive index layer (refractive index: 1.79) to 870 nm and setting the thickness of the low refractive index layer (refractive index: 1.38) to 110 nm.

When the total thickness of the optical adjustment protective layer is 520 nm (value intermediate between the upper limit and the lower limit), the thicknesses of the respective layers are selected and set from a range of 395 nm to 445 nm for the high refractive index layer and from a range of 75 nm to 125 nm for the low refractive index layer so that the combination can reduce the reflectance variation difference. For example, the reflectance variation difference can be reduced by setting the thickness of the high refractive index layer (refractive index: 1.88) to 440 nm and setting the thickness of the low refractive index layer (refractive index: 1.38) to 80 nm. According to the transparent heat-shielding/heat-insulating member having the configuration described above, by forming an optical adjustment protective layer including necessary minimum layers, the productivity is improved and the heat-insulating properties and the appearance are improved at a low cost.

It is preferable that the optical adjustment protective layer includes a medium refractive index layer, a high refractive index layer and a low refractive index layer in this order from the infrared reflective layer side, wherein the medium refractive index layer has a refractive index at a wavelength of 550 nm of 1.45 to 1.55 and is set to have a thickness of 80 nm to 200 nm, the high refractive index layer has a refractive index at a wavelength of 550 nm of 1.65 to 1.95 and is set to have a thickness of 100 nm to 720 nm, and the low refractive index layer has a refractive index at a wavelength of 550 nm of 1.30 to 1.45 and is set to have a thickness of 70 nm to 150 nm so that the total thickness of the optical adjustment protective layer will be 250 nm to 980 nm.

In other words, by appropriately selecting and setting the thickness of the medium refractive index layer from a range of 80 nm to 200 nm, the thickness of the high refractive index layer from a range of 100 nm to 720 nm and the thickness of the low refractive index layer from a range of 70 nm to 150 nm, it becomes possible to significantly reduce the reflectance variation difference that is linked with wavelengths in a range of 500 nm to 780 nm in the visible light reflectance spectrum of the infrared reflective film. Meanwhile, the total thickness of the optical adjustment protective layer needs to be 250 nm or more from the viewpoint of obtaining the scratch resistance of the optical adjustment protective layer, whereas the total thickness of the optical adjustment protective layer needs to be 980 nm or less from the viewpoint of obtaining the heat-insulating properties. Therefore, when appropriately selecting and setting the thickness of the medium refractive index layer from a range of 80 nm to 200 nm, the thickness of the high refractive index layer from a range of 100 nm to 720 nm and the thickness of the low refractive index layer from a range of 70 nm to 150 nm, the total thickness of the optical adjustment protective layer, which is a sum of the thickness of the medium refractive index layer, the thickness of the high refractive index layer and the thickness of the low refractive index layer, always needs to be 250 nm to 980 nm. The specific thicknesses of the respective layers and the like can be the same as those described above. According to the transparent heat-shielding/heat-insulating member having the configuration described above, it is possible to improve not only the heat-insulating properties and the appearance but also the adhesion with the infrared reflective layer.

In this case, it is preferable that the medium refractive index layer in the optical adjustment protective layer contains a modified polyolefin-based resin having an acidic group. The modified polyolefin-based resin having an acidic group has a surprisingly strong interaction with the metal oxide layer or the metal nitride layer of the infrared reflective layer, and thus even better adhesion can be obtained between the infrared reflective layer and the medium refractive index layer. Furthermore, the modified polyolefin-based resin having an acidic group contains a polyolefin in its main backbone, and the number of C=O groups, C—O groups and aromatic groups is not so large. According to the transparent heat-shielding/heat-insulating member having the configuration described above, infrared vibrational absorption is unlikely to occur in the region of far-infrared rays having a wavelength of 5.5 to 25.2 μm, and the increase in normal emissivity can be suppressed, and thus it is unlikely to interfere with providing heat-insulating properties and the adhesion can be obtained.

In the reflectance spectrum of the transparent heat-shielding/heat-insulating member having a transparent screen function measured in accordance with JIS R3106-1998, provided that: a point A is a point at a wavelength of 535 nm on a virtual line a that represents an average of a maximum reflectance and a minimum reflectance of the reflectance spectrum in a range of wavelengths from 500 nm to 570 nm; a point B is a point at a wavelength of 700 nm on a virtual line b that represents an average of a maximum reflectance and a minimum reflectance of the reflectance spectrum in a range of wavelengths from 620 nm to 780 nm; and a "reference straight line AB" of reflectance is a straight line passing through the point A and the point B and extending in a range of wavelengths from 500 nm to 780 nm. It is preferable that when reflectance values of the reflectance spectrum and reflectance values of the reference straight line AB are compared in the range of wavelengths from 500 nm to 570 nm, and provided that a "maximum variation difference $\Delta A$" is an absolute value of a difference in the reflectance value between the reflectance spectrum and the reference straight line AB at a wavelength where the absolute value of the difference becomes maximum, the maximum variation difference $\Delta A$ expressed by percentage of reflectance is 7% or less. It is preferable that when reflectance values of the reflectance spectrum and reflectance values of the reference straight line AB are compared in the range of wavelengths from 620 nm to 780 nm, and provided that a "maximum variation difference $\Delta B$" is an absolute value of a difference in the reflectance value between the reflectance spectrum and the reference straight line AB at a wavelength where the absolute value of the difference becomes maximum, the maximum variation difference $\Delta B$ expressed by percentage of reflectance is 9% or less. According to the transparent heat-shielding/heat-insulating member having the configuration described above, the appearance can be stably good.

Also, the transparent heat-shielding/heat-insulating member having the transparent screen function preferably has a visible light transmittance measured in accordance with JIS A5759-2008 of 65% or more. According to the heat-shielding/heat-insulating member having the configuration described above, good transparent viewability can be obtained. When the transparent member is used by being attached to a transparent substrate such as, for example, a window pane by using a transparent pressure-sensitive adhesive, the internal and external backgrounds and conditions can be clearly viewed from any position both inside and outside without compromising the transparency of the transparent substrate.

Effect of the Invention

The present invention can provide a transparent heat-shielding/heat-insulating member having a transparent screen function that provides excellent heat-shielding and heat-insulating properties when used as a solar control transparent window film for saving energy throughout the year, and that provides excellent viewability from both sides of a screen onto which an image is projected when used as a transparent screen for digital signage, in particular, in terms of reflective viewability from the projector side, excellent brightness (luminance) and image clarity (less blur), the background to be transparently viewed with clarity, and that has excellent scratch resistance and excellent appearance with less reflected color change due to the iridescent phenomenon or viewing angle.

DESCRIPTION OF THE INVENTION

A transparent heat-shielding/heat-insulating member having a transparent screen function of the present invention includes, with respect to a transparent base substrate, at least: (1) an infrared reflective layer and an optical adjustment protective layer in this order from the transparent base substrate side; and (2) a light diffusing layer on a surface of the transparent base substrate that is opposite to the surface on which the infrared reflective layer is formed or between the transparent base substrate and the infrared reflective layer, wherein (3) the infrared reflective layer includes a metal layer and a metal oxide layer and/or a metal nitride layer, (4) the optical adjustment protective layer includes at least a high refractive index layer and a low refractive index layer in this order from the infrared reflective layer side, and has a total thickness of 250 nm to 980 nm, (5) the light diffusing layer contains a transparent resin and light diffusing particles, and the transparent heat-shielding/heat-insulating member having a transparent screen function has (6) a visible light reflectance measured in accordance with JIS R3106-1998 of 12% or more and 30% or less, (7) a haze value measured in accordance with JIS K7136-2000 of 5% or more and 35% or less, (8) a shading coefficient measured in accordance with JIS A5759-2008 of 0.69 or less, and (9) a normal emissivity measured in accordance with JIS R3106-2008 of 0.22 or less.

Hereinafter, an example of a configuration of a transparent heat-shielding/heat-insulating member having a transparent screen function of the present invention will be described with reference to the drawings.

Figure 1:
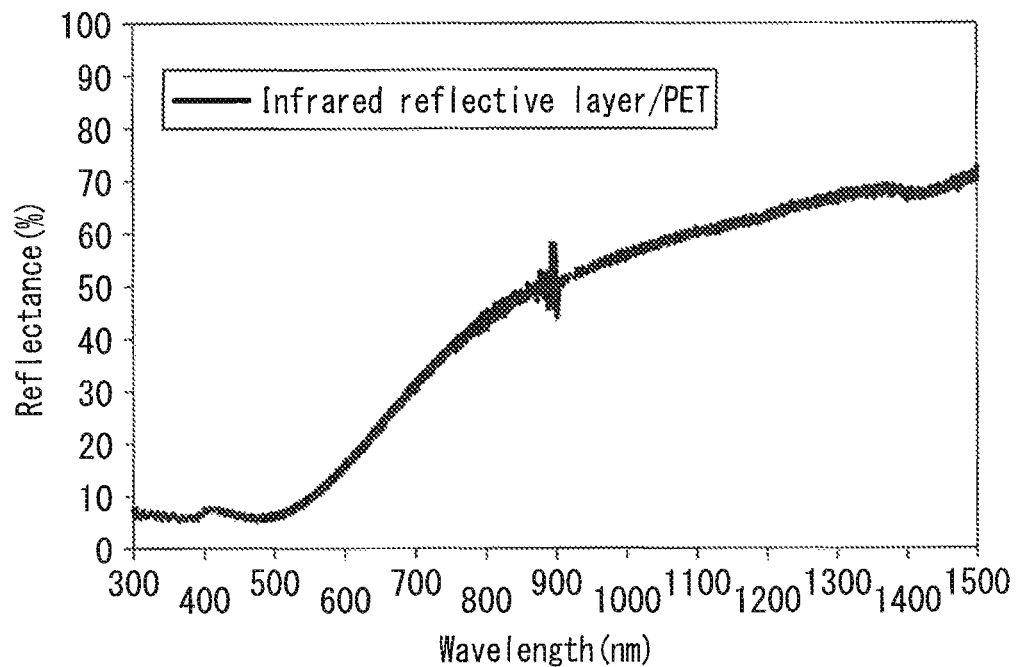
FIG. 1 is an exemplary reflectance spectrum in the visible region to the near infrared region of an infrared reflective film in which an infrared reflective layer is formed on a PET film, observed in a light entrance measurement from a glass surface side, the PET surface side of the infrared reflective film being attached to the glass with a UV cut transparent pressure-sensitive adhesive.
Figure 2:
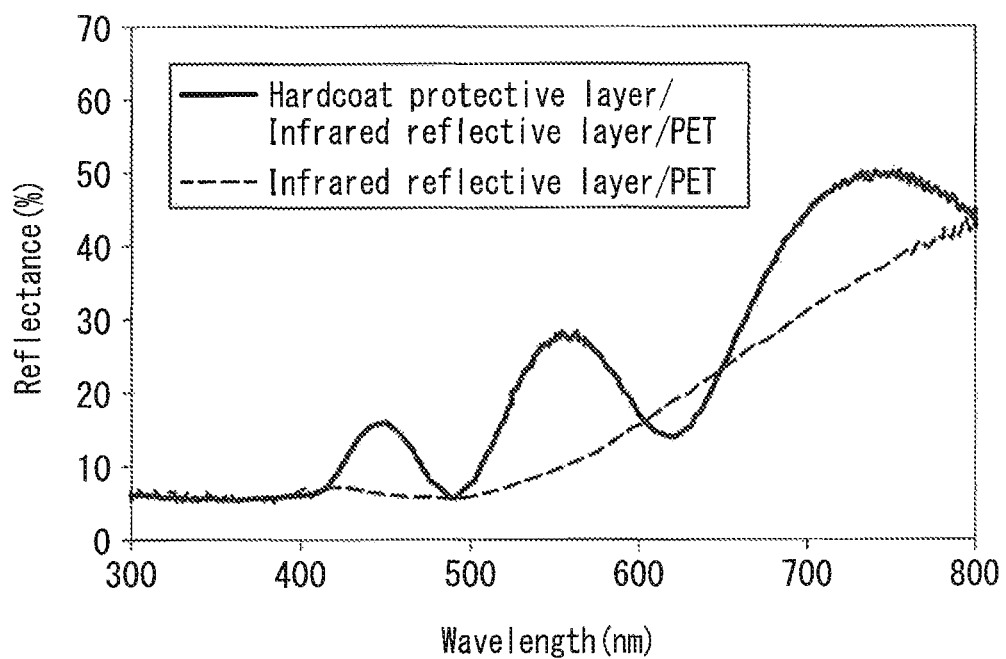
FIG. 2 is a reflectance spectrum in the visible region of an infrared reflective film in which a 680 nm-thick protective layer made of an acrylic-based ultraviolet (UV) hardening-type hardcoat resin is formed on the infrared reflective layer of FIG. 1, observed in a light entrance measurement performed in the same manner as in FIG. 1 (a dotted line indicates the reflectance spectrum in the visible region in FIG. 1).
Figure 3:
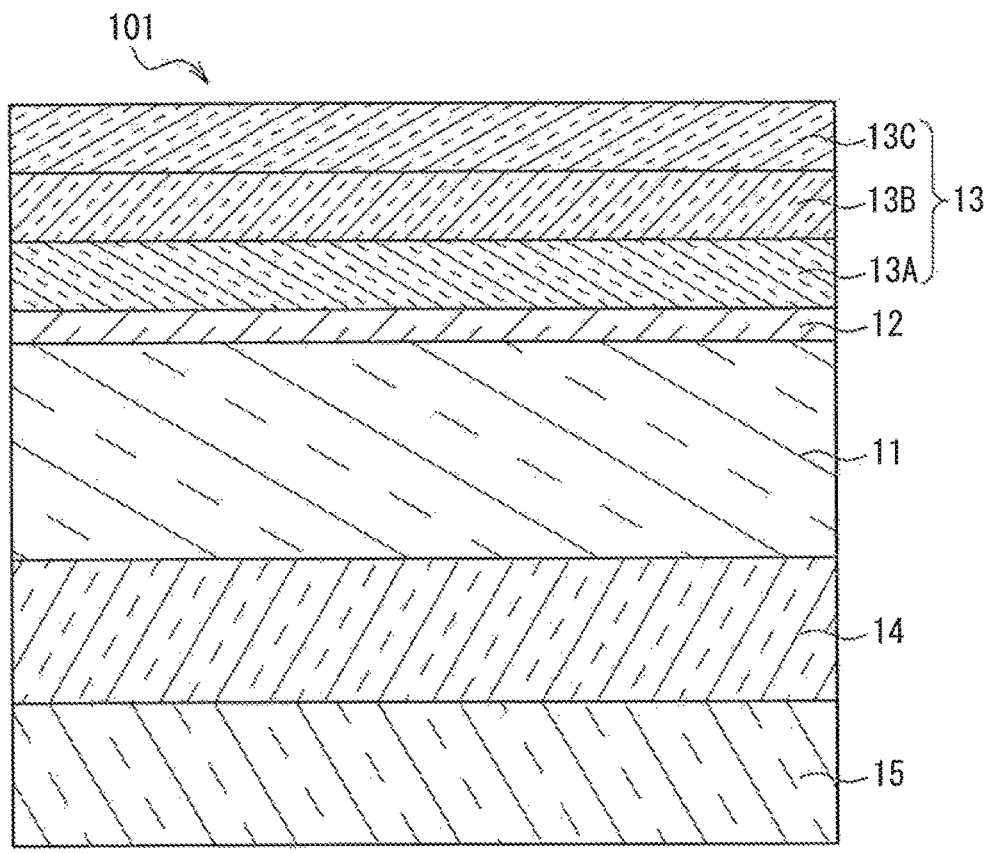
FIG. 3 is a schematic cross-sectional view showing an example of a transparent heat-shielding/heat-insulating member having a transparent screen function of the present invention.

FIG. 3 is a schematic cross-sectional view showing an example of a transparent heat-shielding/heat-insulating member having a transparent screen function of the present invention. In FIG. 3, a transparent heat-shielding/heat-insulating member 101 having a transparent screen function has a configuration including an infrared reflective layer 12 and an optical adjustment protective layer 13 on one surface of a transparent base substrate 11, and a light diffusing layer 14 and a pressure-sensitive adhesive layer 15 on the other surface of the transparent base substrate 11. The optical adjustment protective layer 13 is a stack of three layers including a medium refractive index layer 13A, a high refractive index layer 13B and a low refractive index layer 13C. Although not illustrated, the transparent heat-shielding/heat-insulating member 101 includes a release film on the pressure-sensitive adhesive layer 15.

Figure 4:
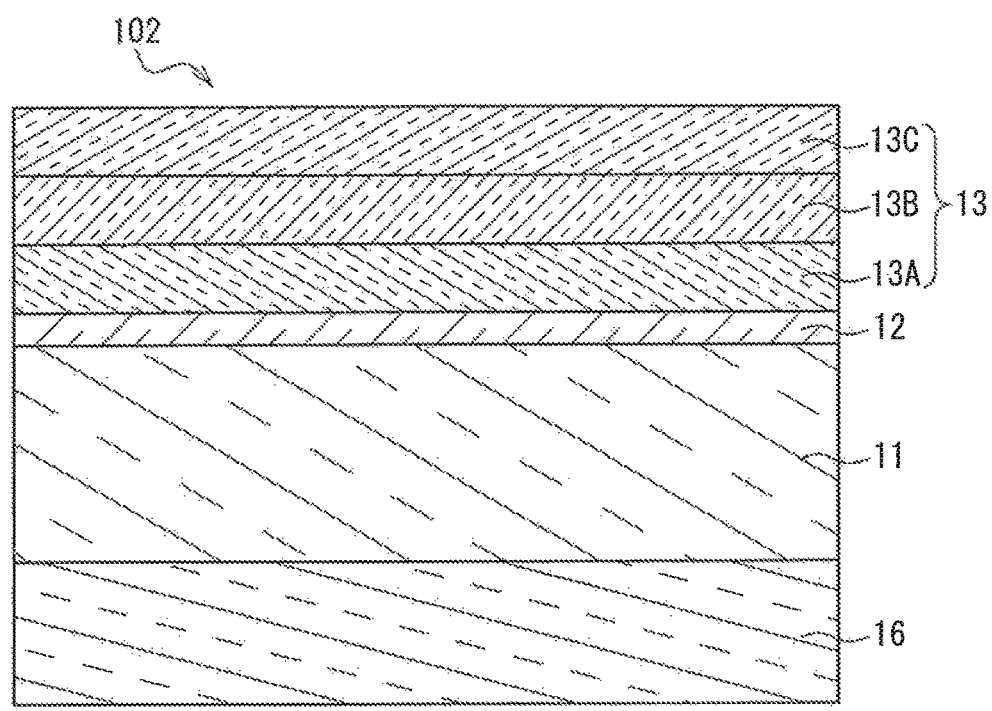
FIG. 4 is a schematic cross-sectional view showing another example of a transparent heat-shielding/heat-insulating member having a transparent screen function of the present invention.

FIG. 4 is a schematic cross-sectional view showing another example of a transparent heat-shielding/heat-insulating member having a transparent screen function of the present invention. In FIG. 4, a transparent heat-shielding/heat-insulating member 102 having a transparent screen function has a configuration obtained by replacing the light diffusing layer 14 and the pressure-sensitive adhesive layer 15 shown in FIG. 3 by a light diffusing pressure-sensitive adhesive layer 16.

Figure 5:
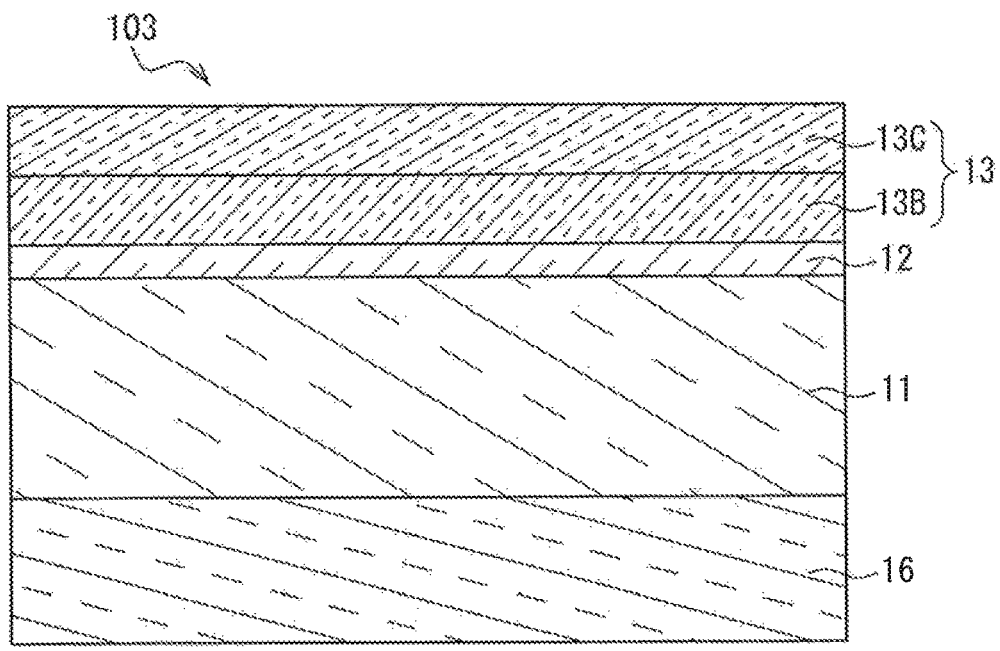
FIG. 5 is a schematic cross-sectional view showing another example of a transparent heat-shielding/heat-insulating member having a transparent screen function of the present invention.

FIG. 5 is a schematic cross-sectional view showing another example of a transparent heat-shielding/heat-insulating member having a transparent screen function of the present invention. In FIG. 5, a transparent heat-shielding/heat-insulating member 103 having a transparent screen function has a configuration including an infrared reflective layer 12 and an optical adjustment protective layer 13 on one surface of a transparent base substrate 11, and a light diffusing pressure-sensitive adhesive layer 16 on the other surface of the transparent base substrate 11. The optical adjustment protective layer 13 is a stack of two layers including a high refractive index layer 13B and a low refractive index layer 13C.

Figure 6:
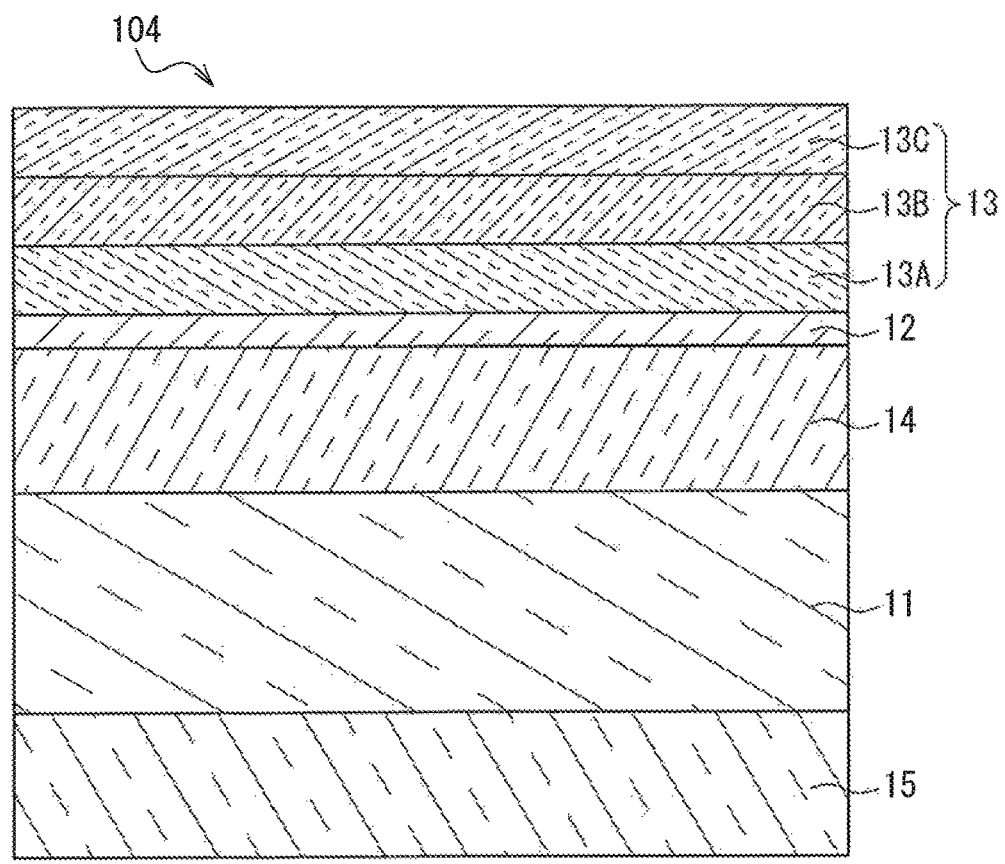
FIG. 6 is a schematic cross-sectional view showing another example of a transparent heat-shielding/heat-insulating member having a transparent screen function of the present invention.

FIG. 6 is a schematic cross-sectional view showing another example of a transparent heat-shielding/heat-insulating member having a transparent screen function of the present invention. In FIG. 6, a transparent heat-shielding/heat-insulating member 104 having a transparent screen function has a configuration including a light diffusing layer 14, an infrared reflective layer 12 and an optical adjustment protective layer 13 on one surface of a transparent base substrate 11, and a pressure-sensitive adhesive layer 15 on the other surface of the transparent base substrate 11. The optical adjustment protective layer 13 is a stack of three layers including a medium refractive index layer 13A, a high refractive index layer 13B and a low refractive index layer 13C.

Figure 7:
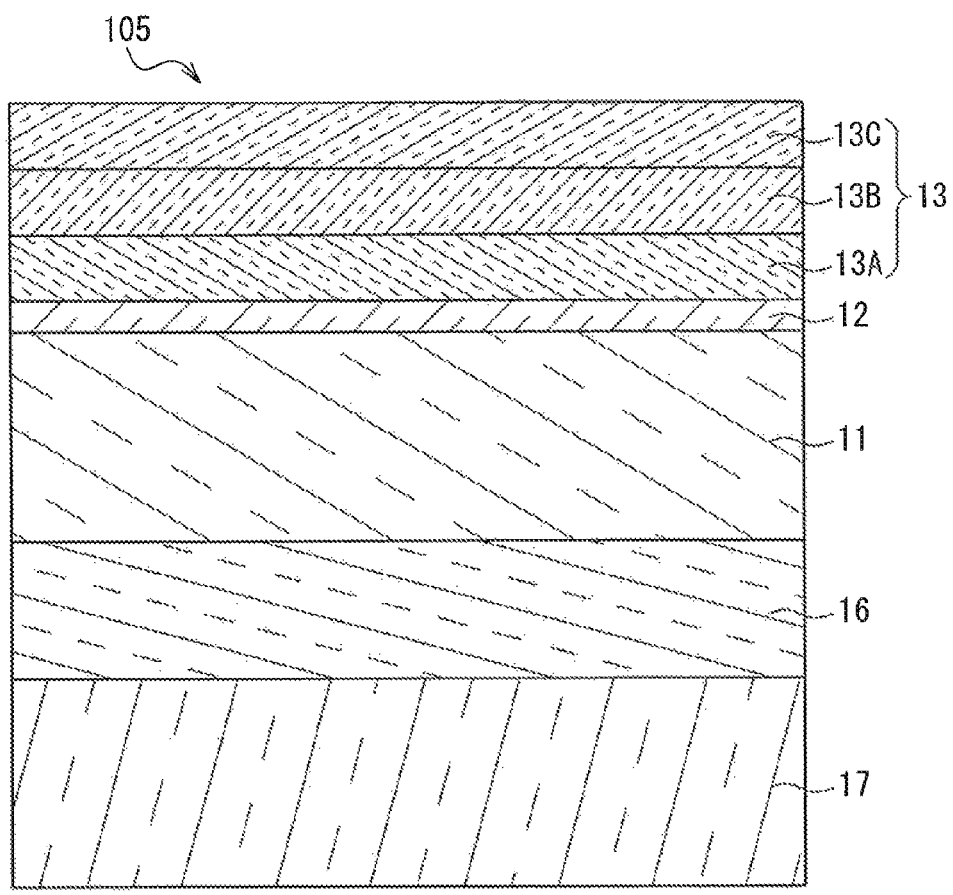
FIG. 7 is a schematic cross-sectional view showing an example in which a transparent heat-shielding/heat-insulating member having a transparent screen function of the present invention is attached to a glass plate.

FIG. 7 is a schematic cross-sectional view showing an example in which a transparent heat-shielding/heat-insulating member having a transparent screen function of the present invention is attached to a glass plate. In FIG. 7, a transparent heat-shielding/heat-insulating member 105 having a transparent screen function has a configuration including an infrared reflective layer 12 and an optical adjustment protective layer 13 on one surface of a transparent base substrate 11, and a light diffusing pressure-sensitive adhesive layer 16 and a glass plate 17 on the other surface of the transparent base substrate 11. The optical adjustment protective layer 13 is a stack of three layers including a medium refractive index layer 13A, a high refractive index layer 13B and a low refractive index layer 13C.

Figure 8:
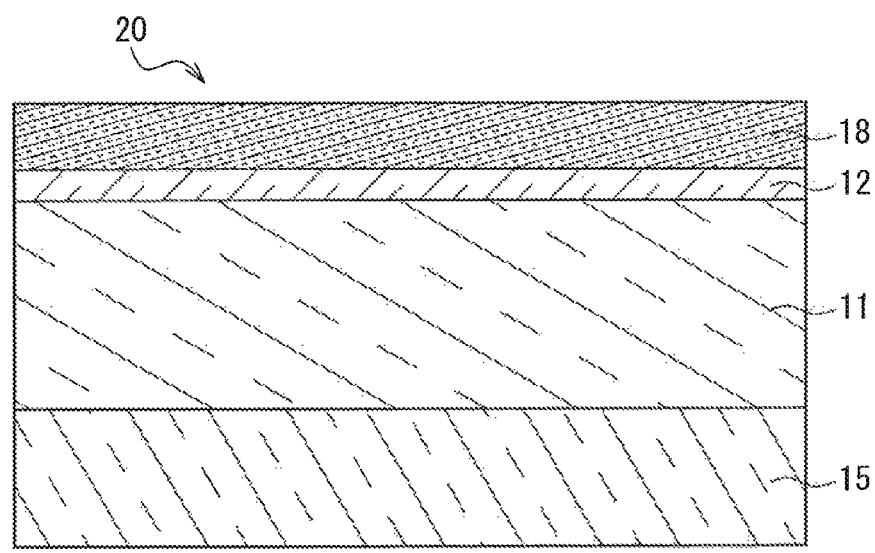
FIG. 8 is a schematic cross-sectional view showing an example of a conventional transparent heat-shielding/heat-insulating member.

FIG. 8 is a schematic cross-sectional view showing an example of a conventional transparent heat-shielding/heat-insulating member. In FIG. 8, a transparent heat-shielding/heat-insulating member 20 has a configuration including an infrared reflective layer 12 and a protective layer 18 on one surface of a transparent base substrate 11, and a pressure-sensitive adhesive layer 15 on the other surface of the transparent base substrate 11.

Figure 9:
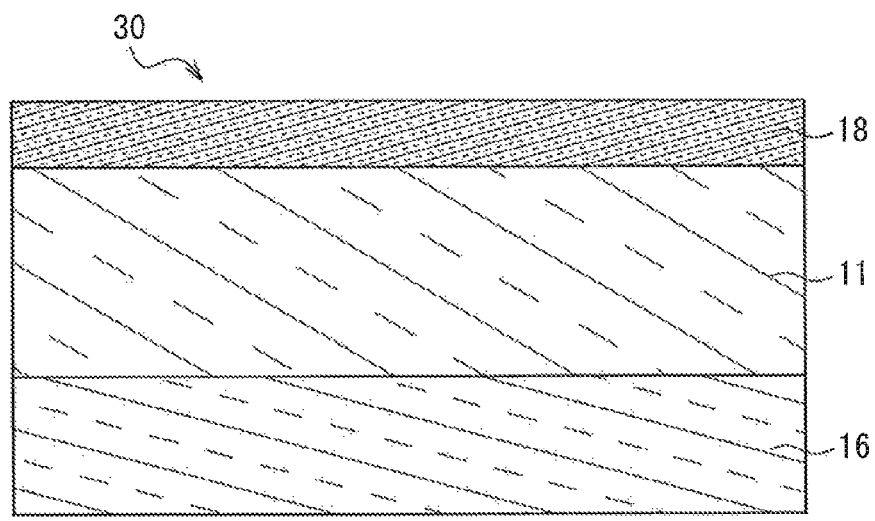
FIG. 9 is a schematic cross-sectional view showing an example of a conventional transparent screen.

FIG. 9 is a schematic cross-sectional view showing an example of a conventional transmissive transparent screen. In FIG. 9, a transparent screen 30 has a configuration including a protective layer 18 on one surface of a transparent base substrate 11, and a light diffusing pressure-sensitive adhesive layer 16 on the other surface of the transparent base substrate 11.

Figure 10:
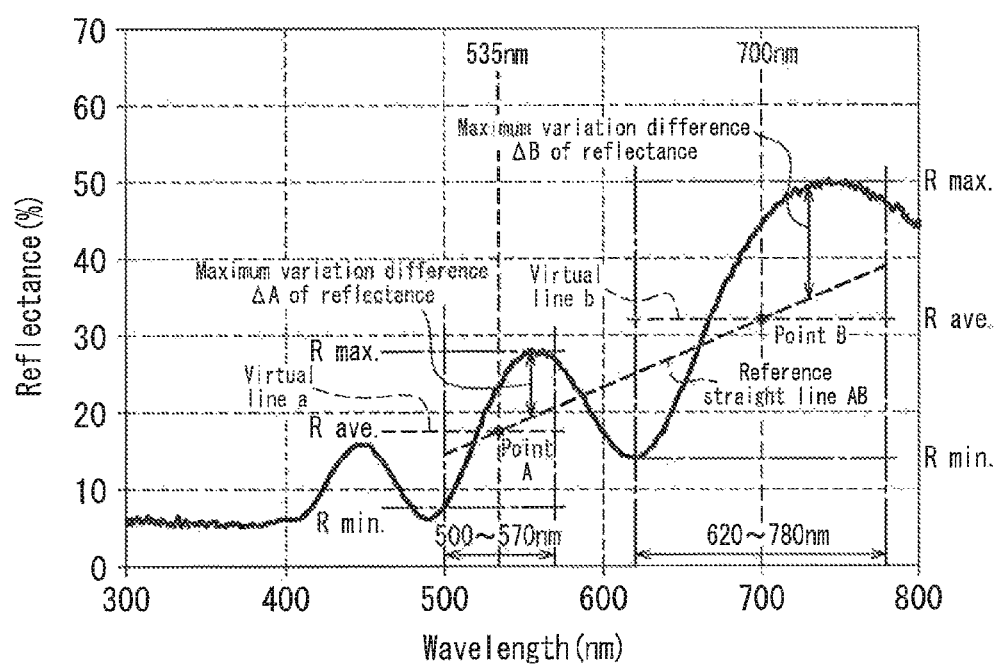
FIG. 10 illustrates a method for determining a "reference straight line BA", a "maximum variation difference ΔA" and a "maximum variation difference ΔB" of reflectance, with respect to a visible light reflectance spectrum of a transparent heat-shielding/heat-insulating member having a transparent screen function of the present invention.

FIG. 10 illustrates a method for determining a "reference straight line AB", a "maximum variation difference ΔA" and a "maximum variation difference ΔB" of reflectance, with respect to the visible light reflectance spectrum of the transparent heat-shielding/heat-insulating member having a transparent screen function of the present invention.

The following describes the reason why the present inventors focused on the difference in reflectance in the above wavelength regions. According to the relative luminous efficiency, the human eyes more strongly perceive the green region in the vicinity of wavelengths from 500 nm to 570 nm. Because of this, when the fluctuations called "ripple" (variation in reflectance in vertical direction) caused by a multi-reflective interference of light in the range of wavelengths from 500 nm to 570 nm are significantly large in the visible light reflectance spectrum of the transparent heat-shielding/heat-insulating member, even a slight thickness variation of film causes phase deviations in the reflectance spectrum, which largely affects the reflected color.

As described above, in the infrared reflective film that reflects near-infrared rays by the thin metal film, the reflectance spectrum inevitably has a shape in which the reflectance gradually increases in wavelengths from the visible region to the near infrared region. Accordingly, the reflected color of red tends to be emphasized in the infrared reflective film using the thin metal film. Similarly to the color region of green, for the reflected color of red in the range of wavelengths from 620 nm to 780 nm, when the phase deviations caused by the thickness variation of film is generated in the reflectance spectrum, the reflected color is largely affected.

Generally, in the transparent heat-shielding/heat-insulating member for use in window lanes or the like, red and yellow, which give an impression of hotness, and green, which deteriorates the design quality, tend to be avoided. In contrast, blue, which gives an impression of coolness and does not significantly deteriorate the design quality, tends to be preferred. However, when the thickness of the protective layer is reduced to several hundred nanometers that overlap the wavelength range of visible light, there are cases where reflected colors of red and green become particularly noticeable in the iridescent pattern and in the reflected color as a whole viewed from a different angle, which may deteriorate the appearance. In order to reduce such influences on the reflected color even when the phase deviation is generated by a slight thickness variation of film, it is important to reduce the size of ripple in the reflectance spectrum in the green region in the wavelengths from 500 to 570 nm and in the red region in the wavelengths from 620 to 780 nm, which largely affect the reflected color among the wavelengths of the visible region.

Next, the method for determining the "reference straight line AB", "maximum variation difference ΔA" and "maximum variation difference ΔB" of reflectance will be described with reference to FIG. 10. The curved line in FIG. 10 is an exemplary visible light reflectance spectrum of the transparent heat-shielding/heat-insulating member having a transparent screen function, observed in the light entrance measurement from a glass surface side, the surface of a transparent base substrate that is opposite to the surface on which an optical adjustment protective layer is formed being attached to the glass plate using a UV cut transparent pressure-sensitive adhesive.

First, a virtual line a is determined that represents an average (R ave.) of a maximum reflectance (R max.) and a minimum reflectance (R min.) in the range of wavelengths from 500 nm to 570 nm of the visible light reflectance spectrum in FIG. 10. A point on the virtual line a at a wavelength of 535 nm is defined as a point A. Similarly, a virtual line b is determined that represents an average (R ave.) of a maximum reflectance (R max.) and a minimum reflectance (R min.) in the range of wavelengths from 620 nm to 780 nm of the visible light reflectance spectrum. A point on the virtual line b at a wavelength of 700 nm is defined as a point B. A straight line passing through the point A and the point B is defined as a "reference straight line AB" of reflectance. A formula of the "reference straight line AB" of reflectance, i.e., $Y=a'X+b'$, is obtained from the inclination and intersection of the reference straight line AB. Here, Y represents a reflectance (%), X represents a wavelength (nm), a' represents the inclination of the straight line, and b' represents a Y-intercept.

Next, a reflectance value at each wavelength of the "reference straight line BA" of reflectance in the range of wavelengths from 500 nm to 570 nm is calculated from the formula $Y=a'X+b'$, and the obtained reflectance values are compared with the reflectance values of the visible light reflectance spectrum in the range of wavelengths from 500 nm to 570 nm. An absolute value of the difference in the reflectance value between the reference straight line AB and the visible light reflectance spectrum at a wavelength where the absolute value of the difference becomes maximum is defined as a "maximum variation difference ΔA" of reflectance.

Similarly, a reflectance value at each wavelength of the "reference straight line BA" of reflectance in the range of wavelengths from 620 nm to 780 nm is calculated from the formula Y=a'X+b', and the obtained reflectance values are compared with the reflectance values of the visible light reflectance spectrum in the range of wavelengths from 620 nm to 780 nm. An absolute value of the difference in the reflectance value between the reference straight line AB and the visible light reflectance spectrum at a wavelength where the absolute value of the difference becomes maximum is defined as a "maximum variation difference ΔB" of reflectance. The smaller the values of the "maximum variation difference ΔA" and "maximum variation difference ΔB" of reflectance are, the smaller the variation in reflectance is, in the range of wavelengths from 500 nm to 780 nm corresponding to green to red colors in the visible light reflectance spectrum.

In the transparent heat-shielding/heat-insulating member having a transparent screen function of the present invention, it is preferable to set the value of the "maximum variation difference ΔA" of reflectance expressed by percentage of reflectance to 7.0% or less, and set the value of the "maximum variation difference ΔB" expressed by percentage of reflectance to 9.0% or less. By setting the values of the "maximum variation difference ΔA" and "maximum variation difference ΔB" of reflectance within the ranges described above, it becomes possible to significantly reduce the reflectance variation difference that is linked particularly with wavelengths in the range of 500 nm to 780 nm corresponding to green to red colors in the visible light reflectance spectrum, and thereby the change in the reflectance can be moderated. Therefore, even when the total thickness of the optical adjustment protective layer is set within a range that overlaps the wavelength range of visible light (380 to 780 nm) for the sake of attaining both of the scratch resistance and heat-insulating properties of the protective layer, the reflected color change due to the iridescent phenomenon or viewing angle can be reduced to a level where the change is hardly recognized with the human eyes, and thus an excellent appearance can be accomplished.

When either of the "maximum variation difference ΔA" and "maximum variation difference ΔB" of reflectance is not within the range described above, the reflectance variation difference in the range of wavelengths from 500 nm to 780 nm corresponding to green to red colors in the visible light reflectance spectrum cannot be sufficiently reduced. As a result, when the total thickness of the optical adjustment protective layer is set within a range that overlaps the wavelength range of visible light (380 to 780 nm) for the sake of attaining both of the scratch resistance and heat-insulating properties of the protective layer, it is difficult to sufficiently suppress the reflected color change due to the iridescent phenomenon or viewing angle.

It is more preferable to set the value of the "maximum variation difference ΔA" of reflectance expressed by percentage of reflectance to less than 6.0%, and set the value of the "maximum variation difference ΔB" expressed by percentage of reflectance to less than 6.0%.

Hereinafter, constituent members of the transparent heat-shielding/heat-insulating member having a transparent screen function of the present invention and related matters thereof will be described.

[Transparent Base Substrate]

There is no particular limitation on the transparent base substrate constituting the transparent heat-shielding/heat-insulating member having a transparent screen function of the present invention as long as the transparent base substrate has optical transparency. As the transparent base substrate, it is possible to use a film or sheet formed from, for example, a resin such as polyester-based resin (for example, polyethylene terephthalate, polyethylene naphthalate or the like), polycarbonate-based resin, polyacrylic acid ester-based resin (for example, polymethyl methacrylate or the like), alicyclic polyolefin-based resin, polystyrene-based resin (for example, polystyrene, an acrylonitrile-styrene copolymer or the like), polyvinyl chloride-based resin, polyvinyl acetate-based resin, polyethersulfone-based resin, cellulose-based resin (for example, diacetyl cellulose, triacetyl cellulose or the like), or norbornene-based resin. As the method for forming the resin into a film or sheet, it is possible to use an extrusion method, a calendering method, a compression molding method, an injection molding method, a method in which any of the above resins is dissolved in a solvent and thereafter subjected to casting, or the like. The resin may further contain additives such as an antioxidant, a flame retardant, an anti-heat resistant agent, an ultraviolet absorbing agent, a lubricant, and an anti-static agent. An adhesion promotion layer may be provided on the transparent base substrate as needed. The transparent base substrate has a thickness of, for example, 10 μm to 500 μm, and preferably has a thickness of 25 μm to 125 μm considering the processability and the cost.

[Infrared Reflective Layer]

The infrared reflective layer constituting the transparent heat-shielding/heat-insulating member having a transparent screen function of the present invention is composed of a stack including at least a metal layer and a metal oxide layer and/or a metal nitride layer. The infrared reflective layer preferably has a configuration in which two layers, namely (1) a metal layer and (2) a metal oxide layer or a metal nitride layer, are stacked in this order on the transparent base substrate, or a configuration in which three layers, namely (1) a metal oxide layer or a metal nitride layer, (2) a metal layer and (3) a metal oxide layer or a metal nitride layer, are stacked in this order. Among these, from the viewpoint of improving visible light transmittance, it is more preferable to have a configuration in which three layers, namely (1) a metal oxide layer or a metal nitride layer, (2) a metal layer and (3) a metal oxide layer or a metal nitride layer, are stacked in this order on the transparent base substrate. By using this configuration, it is possible to improve visible light transmittance while maintaining infrared reflective performance. Also, the infrared reflective layer may have, on the transparent base substrate, for example, a stack configuration including four layers such as a metal layer, a metal oxide layer, a metal layer and a metal oxide layer, a stack configuration including six layers or eight layers, a stack configuration including five layers such as a metal oxide layer, a metal layer, a metal oxide layer, a metal layer and a metal oxide layer, or a stack configuration including seven layers or nine layers as needed, as long as the effects of the present invention are not impaired.

Also, a metal layer or a metal suboxide layer in which the metal is partially oxidized may be provided between a metal layer and a metal oxide layer or between a metal layer and a metal nitride layer as a barrier layer for preventing corrosion of the metal layer.

As the material for forming the metal layer, among commonly used metals, it is possible to use those having a high electric conductivity and excellent far infrared reflective performance as appropriate, such as silver, copper, gold, platinum and aluminum, and alloys thereof, but among these metals, it is preferable to use silver having the highest electric conductivity or a silver alloy to form the metal layer. Any of these materials can be used to form the metal layer directly on the transparent base substrate, on a metal oxide layer or a metal nitride layer that has been formed in advance on the transparent base substrate, or on a metal oxide layer or a metal nitride layer included in a stack in which a metal layer and a metal oxide layer or a metal nitride layer are repeatedly stacked, the stack having been formed in advance on the transparent base substrate, by using a sputtering method, a vapor deposition method or a dry coating method such as a plasma CVD method. The first metal layer may be formed on the transparent base substrate via another layer such as an adhesion promotion layer, a hardcoat layer or a light diffusing layer.

As the materials for forming the metal oxide layer and the metal nitride layer, it is preferable to use, from the viewpoint of improving visible light transmittance, a dielectric having a refractive index of 1.7 to 2.8, which can be used as a light compensation layer having an antireflection function for the thin metal film. For example, a metal oxide such as indium tin oxide, indium zinc oxide, indium oxide, titanium oxide, tin oxide, zinc oxide, zinc tin oxide, niobium oxide or aluminum oxide and a metal nitride such as silicon nitride or aluminum nitride can be used as appropriate. Any of these materials can be used to form the metal oxide layer or the metal nitride layer directly on the transparent base substrate, on a metal layer that has been formed in advance on the transparent base substrate, or on a metal layer included in a stack in which a metal oxide layer or a metal nitride layer and a metal layer are repeatedly stacked, the stack having been formed in advance on the transparent base substrate, by using a sputtering method, a vapor deposition method or a dry coating method such as a plasma CVD method. The first metal oxide layer or metal nitride layer may be formed on the transparent base substrate via another layer such as an adhesion promotion layer, a hardcoat layer or a light diffusing layer.

There is no particular limitation on the thickness of each of the metal layer, the metal oxide layer and the metal nitride layer, and the thickness may be adjusted as appropriate by taking into consideration the final near infrared reflective performance (shading coefficient), far infrared reflective performance (normal emissivity), visible light reflectance and visible light transmittance as required by the transparent heat-shielding/heat-insulating member having a transparent screen function described above.

The thickness of the metal layer is, although the suitable range depends on the refractive index, thickness, the stack configuration and the like of the metal oxide layer or the metal nitride layer stacked on the metal layer, preferably adjusted as appropriate within a range of 5 to 20 nm. If the thickness is less than 5 nm, the infrared reflective performance of the transparent heat-shielding/heat-insulating member having a transparent screen function is reduced, as a result of which the heat-shielding performance and the heat-insulating performance may also be reduced. If the thickness is greater than 20 nm, the visible light transmittance is reduced, as a result of which the transparent viewability of the background may be reduced. By configuring the metal layer so as to have a thickness within the above-described range and combining the metal layer with a metal oxide layer or a metal nitride layer having a thickness within a range described below as appropriate to form a stack configuration, the transparent heat-shielding/heat-insulating member having a transparent screen function can have a shading coefficient of 0.69 or less.

The thickness of the metal oxide layer and the metal nitride layer is preferably adjusted as appropriate within a range of 2 to 80 nm according to the refractive index of the material used for the metal layer and the thickness of the metal layer. If the thickness is less than 2 nm, the effect as a light compensation layer for the metal layer is small, and a significant improvement cannot be expected in the visible light transmittance of the transparent heat-shielding/heat-insulating member having a transparent screen function. Thus, the transparent viewability of the background may be reduced. In addition, because the metal oxide layer and the metal nitride layer also serve to suppress corrosion of the metal layer, the effect of suppressing corrosion of the metal layer may be reduced if the thickness is less than 2 nm. If the thickness is greater than 80 nm, a further effect as a light compensation layer for the metal layer cannot be obtained. On the contrary, the visible light transmittance will gradually decrease, and the transparent viewability of the background may be reduced.

The visible light reflectance of the transparent heat-shielding/heat-insulating member having the infrared reflective layer needs to be set to 12% or more and 30% or less in order to, when an image is projected by a projector, provide a reflected image having excellent brightness (luminance) and image clarity (less blur) in terms of reflective viewability from the projector side, without preventing the viewability of a transmitted image. If the visible light reflectance is less than 12%, the brightness (luminance) and the image clarity (less blur) of the reflected image may be poor. If the visible light reflectance is greater than 30%, the reflected image is strongly glittered or has a strong half-mirror appearance, and the transparent viewability of the background may be reduced, or the brightness (luminance) of the transmitted image may be reduced.

In order to set the visible light reflectance to 12% or more and 30% or less, it is preferable to adjust the thicknesses of the metal layer, the metal oxide layer and the metal nitride layer as appropriate to be within the ranges described above, for keeping a balance with the configuration of the optical adjustment protective layer described below. It is preferable to set the visible light reflectance to 15% or more and 25% or less. By setting the visible light reflectance to be within this range, it is possible to properly reflect the projected light from a projector and make up for the low backward light scattering properties of the light diffusing layer, as a result of which the brightness (luminance) and the image clarity (less blur) of the reflected image can be made better.

With a conventional reflective screen, a technique is used in which as a reflective layer for reflecting visible light, a metal vapor deposition layer or a transfer metal foil layer made of, for example, aluminum or the like, a layer including flakes obtained by pulverizing a metal vapor deposition film or a metal foil dispersed therein or coated therewith, or the like is used. However, the reflective screen has a non-transparent configuration that basically transmits little visible light. In other words, in the case where these materials are used, there is a limit on control of the balance between transmittance and reflectance of visible light and uniforming of the thin metal film and the prevention of corrosion of the thin metal film when the visible light transmittance is improved. Even if the transmittance is forcibly improved, the visible light transmittance can be practically increased to about 40 to 50% at most.

In contrast, as described above, a feature of the present invention is that the following points are found: by utilizing the characteristics of the infrared absorber in which the metal oxide layer and/or the metal nitride layer are stacked on the metal layer, the balance between the visible light transmittance required to secure background viewability and the visible light reflectance required to improve the viewability of the reflected image projected by a projector is controlled while the infrared reflective performance required for heat-shielding/heat-insulation is maintained; and by combining a stacked body of the metal layer, the metal oxide layer and/or the metal nitride layer with the light diffusing layer, in terms of reflective viewability from the projector side of a projected image, the brightness (luminance) and the image clarity (less blur) are unexpectedly improved without preventing the viewability of a transmitted image.

Also, it is preferable to set the average reflectance of the infrared reflective layer for far-infrared light having a wavelength of 5.5 μm to 25.2 μm to 80% or more. Since the average reflectance of the infrared reflective layer for far-infrared light is largely affected by the thickness of the metal layer, it is preferable to adjust the thickness of the metal layer as appropriate to be within the range described above. By doing so, the normal emissivity of the transparent heat-shielding/heat-insulating member of the present invention can be easily designed to 0.22 or less in the range of the total thickness of the optical adjustment protective layer formed on the infrared reflective layer of 250 nm to 980 nm, which is described below. This is advantageous in terms of providing a high heat-insulating function. The normal emissivity expressed by: normal emissivity $(\epsilon n)=1-$spectral reflectance $(\rho n)$ as specified in JIS R3106-2008. The spectral reflectance $\rho n$ is measured in the wavelength region of thermal radiation of 5.5 μm to 50 μm at room temperature. The wavelength region of 5.5 μm to 50 μm is a far-infrared wavelength region. As the reflectance for the far-infrared wavelength region increases, the normal emissivity decreases and the heat-insulating performance improves.

[Optical Adjustment Protective Layer]

The optical adjustment protective layer has a stack configuration including at least a high refractive index layer and a low refractive index layer in this order from the infrared reflective layer side, preferably a stack configuration including at least a medium refractive index layer, a high refractive index layer and a low refractive index layer in this order from the infrared reflective layer side. The total thickness of the optical adjustment protective layer is set within a range of 250 nm to 980 nm from the viewpoint of improving both of the scratch resistance and heat-insulating properties. Specifically, if the total thickness of the optical adjustment protective layer is less than 250 nm, physical properties such as scratch resistance and corrosion resistance of the metal layer may be reduced. If the total thickness of the optical adjustment protective layer is greater than 980 nm, the absorption of far-infrared rays having a wavelength of 5.5 μm to 25.2 μm in the optical adjustment protective layer increases due to the effects of C=O groups, C—O groups and aromatic groups contained in the molecular backbone of resin used in the medium refractive index layer, the high refractive index layer and the low refractive index layer, inorganic oxide fine particles used for adjusting the refractive indices of the respective refractive index layers and the like, and the normal emissivity increases, which may lead to a reduction in the heat-insulating properties of the infrared reflective film.

If the total thickness of the optical adjustment protective layer is within the above range, a normal emissivity measured based on JIS R3106-2008 of 0.22 or less (a heat transmission coefficient of 4.2 W/m²·K or less) is attained on the optical adjustment protective layer side, and a sufficient heat-insulating performance can be achieved. It is more preferable to set the total thickness of the optical adjustment protective layer to 300 nm or more from the viewpoint of further improving the scratch resistance and 700 nm or less from the viewpoint of further reducing the normal emissivity, i.e., within a range of 300 nm to 700 nm. If the total thickness of the optical adjustment protective layer is within a range of 300 nm to 700 nm, a normal emissivity measured based on JIS R3106-1988 of 0.17 or less (a heat transmission coefficient of 4.0 W/m²·K or less) is attained on the functional layer side, and both of the heat-insulating performance and scratch resistance can be achieved at a still higher level.

The combination of the refractive indices and thicknesses of the respective layers constituting the optical adjustment protective layer is required to be designed so that the size of the so-called ripple in the visible light reflectance spectrum of the heat-shielding/heat-insulating member having a transparent screen function of the present invention will be reduced. In other words, optimal refractive indices and thicknesses of the respective layers are adjusted and set as appropriate within the range of the total thickness of the optical adjustment protective layer of 250 nm to 980 nm so as to allow the heat-shielding/heat-insulating member to exhibit desired optical characteristics.

Hereinafter, the respective layers constituting the optical adjustment protective layer will be described.

<Medium Refractive Index Layer>

When the optical adjustment protective layer has a stack configuration including a medium refractive index layer, a high refractive index layer and a low refractive index layer in this order from the infrared reflective layer side, the medium refractive index layer is preferably set to have a light refractive index at a wavelength of 550 nm of 1.45 to 1.55, and more preferably 1.43 to 1.53. The thickness of the medium refractive index layer is, although the suitable range depends on the refractive index, thickness and the like of the high refractive index layer and the low refractive index layer stacked in order on the medium refractive index layer, preferably set as appropriate within a range of 80 to 200 nm, for keeping a balance with the configurations of the other layers. The medium refractive index layer having a thickness of less than 80 nm may result in, for example, an emphasis in red in the reflected color of a product, an emphasis in green in the transmitted color, and a decrease of the total light transmittance. The medium refractive index layer having a thickness of greater than 200 nm may result in, for example, an emphasis in red in the reflected color of a product and a decrease of the total light transmittance. Moreover, the absorption of light in the infrared region may increase, which decreases the heat-insulating properties.

There is no limitation on the constituent material of the medium refractive index layer as long as the refractive index of the medium refractive index layer can be set within the range described above. For example, a thermoplastic resin, a thermosetting resin and an ionizing radiation curable resin are preferably used. Inorganic fine particles for adjusting the refractive index may be dispersed and added into the resin as needed.

As the thermoplastic resin, it is possible to use, for example, modified polyolefin-based resin, vinyl chloride-based resin, acrylonitrile-based resin, polyamide-based resin, polyimide-based resin, polyacetal-based resin, polycarbonate-based resin, polyvinyl butyral-based resin, acrylic-based resin, polyvinyl acetate-based resin, polyvinyl alcohol-based resin, cellulose-based resin, and the like. As the thermosetting resin, it is possible to use, for example, phenol-based resin, melamine-based resin, urea-based resin, unsaturated polyester-based resin, epoxy-based resin, polyurethane-based resin, silicone-based resin, alkyd-based resin, and the like. These can be used alone or in combination. A crosslinking agent for crosslinking these resins by heat may be added as needed.

Among the thermoplastic resins, from the viewpoint of adhesion with the infrared reflective layer and low light absorption capability of absorbing light in the infrared region, it is preferable to use a modified polyolefin-based resin, and in particular, modified polyolefin-based resin having an acidic group. By forming the medium refractive index layer using the modified polyolefin-based resin having an acidic group, the adhesion to the infrared reflective layer can be further improved. The medium refractive index layer may be formed from a modified polyolefin-based resin having a hydroxy group unless the adhesion of the medium refractive index layer is reduced.

There is no particular limitation on the polyolefin-based resin serving as the backbone of the modified polyolefin-based resin, but polypropylene and a polypropylene-α-olefin copolymer are preferably used. Examples of α-olefin in the polypropylene-α-olefin copolymer include ethylene, 1-butene, 1-heptene, 1-octene, 4-methyl-1-pentene. They may be used alone or in combination. There is no particular limitation on the proportion of polypropylene in the polypropylene-α-olefin copolymer, but the proportion of polypropylene is preferably 50 mol % or more and 90 mol % or less from the viewpoint of solubility in organic solvents.

There is no particular limitation on the modified polyolefin-based resin having an acidic group, but it is possible to use, for example, a polyolefin-based resin that has been acid-modified by graft copolymerization of the polyolefin resin with at least one of α,β-unsaturated carboxylic acid and an acid anhydride thereof. There is no particular limitation on the α,β-unsaturated carboxylic acid and the acid anhydride, but examples thereof include maleic acid, itaconic acid, citraconic acid, fumaric acid, aconitic acid, crotonic acid, isocrotonic acid, acrylic acid, and anhydrides thereof. They may be used alone or in combination of two or more. Among them, from the viewpoint of versatility, it is preferable to perform modification by graft copolymerization of the polyolefin-based resin with at least one of maleic anhydride and itaconic anhydride.

The amount of graft copolymerization of the α,β-unsaturated carboxylic acid or the acid anhydride with respect to the polyolefin-based resin is preferably 0.2 to 30 mass %, and more preferably 1.0 to 10.0 mass %. If the amount of graft copolymerization is less than 0.2 mass %, the solubility in organic solvents is lowered, which may cause the stability as a medium refractive index coating material to be poor, or the adhesion to the infrared reflective layer to be insufficient. If, on the other hand, the amount of graft copolymerization is greater than 30 mass %, the absorption of light having a wavelength in the infrared region starts increasing, which may increase the normal emissivity and decrease a contribution to the improvement of heat-insulating performance.

The modified polyolefin-based resin having an acidic group can be produced by a known method such as a melting method or a solution method.

The modified polyolefin-based resin having an acidic group may be acrylic-modified by further adding a (meth)acrylic acid monomer so as to further improve the solubility in polar solvents, the adhesion to the hardcoat agent made of acrylic-based resin contained in the high refractive index layer described later or the like, and the compatibility. To be specific, this can be obtained by causing an unsaturated bond-containing compound having a functional group (hydroxy group or glycidyl group) reactive to an acid-modified portion of the modified polyolefin-based resin having an acidic group to react so as to introduce double bonds, and thereafter graft copolymerization of (meth)acrylic acid monomer.

As the unsaturated bond-containing compound having a functional group, it is preferable to use, for example, 2-hydroxyethyl acrylate, 2-hydroxypropyl acrylate, 4-hydroxybutyl acrylate, polypropylene glycol acrylate, 2-hydroxyethyl methacrylate, 2-hydroxypropyl methacrylate, 4-hydroxybutyl methacrylate, polypropylene glycol methacrylate, glycidyl acrylate, glycidyl methacrylate, and the like. It is preferable to use the unsaturated bond-containing compound in an amount of about 10 to 90 mass % with respect to the modified polyolefin-based resin having an acidic group.

As the (meth)acrylic acid monomer that is subjected to graft copolymerization after double bonds are introduced into the modified polyolefin-based resin having an acidic group, (meth)acrylic acid or a (meth)acrylic acid ester can be used. As the (meth)acrylic acid, at least one of acrylic acid and methacrylic acid can be used. Examples of the (meth)acrylic acid ester include methyl acrylate, ethyl acrylate, propyl acrylate, n-butyl acrylate, isobutyl acrylate, t-butyl acrylate, 2-ethylhexyl acrylate, lauryl acrylate, stearyl acrylate, 2-hydroxyethyl acrylate, 2-hydroxypropyl acrylate, 4-hydroxybutyl acrylate, glycidyl acrylate, cyclohexyl acrylate, polypropylene glycol acrylate, methyl methacrylate, ethyl methacrylate, propyl methacrylate, n-butyl methacrylate, isobutyl methacrylate, t-butyl methacrylate, 2-ethylhexyl methacrylate, lauryl methacrylate, stearyl methacrylate, 2-hydroxyethyl methacrylate, 2-hydroxypropyl methacrylate, 4-hydroxybutyl methacrylate, glycidyl methacrylate, cyclohexyl methacrylate, polypropylene glycol methacrylate. These (meth)acrylic acid monomers can be used alone or in combination of two or more.

Also, the modified polyolefin-based resin having a hydroxy group can be obtained by introducing double bonds to the modified polyolefin-based resin having an acidic group, and thereafter graft copolymerization of a hydroxy group-containing (meth)acrylic acid monomer such as 2-hydroxyethyl acrylate, 2-hydroxypropyl acrylate, 4-hydroxybutyl acrylate, 2-hydroxyethyl methacrylate, 2-hydroxypropyl methacrylate, or 4-hydroxybutyl methacrylate.

The modified polyolefin-based resin preferably has a weight-average molecular weight measured by a GPC method of 10,000 to 200,000. If the weight-average molecular weight is less than 10,000, the strength as the medium refractive index layer may deteriorate. If the weight-average molecular weight is greater than 200,000, the viscosity of the medium refractive index coating material increases, which may reduce the workability.

As the modified polyolefin-based resin having an acidic group, commercially available products can be used such as, for example, "Unistole P902" (trade name) available from Mitsui Chemicals Inc., "Hardlen" (trade name) available from Toyobo Co., Ltd., "Auroren" (trade name) available from Nippon Paper Chemicals Co., Ltd., "Surflen" (trade name) available from Mitsubishi Chemical Corporation, "Sumifitt" (trade name) available from Sumika Chemtex Co., Ltd., and "Zaikthene" (trade name) available from Sumitomo Seika Chemicals Co., Ltd. Likewise, as the modified polyolefin-based resin having a hydroxy group, commercially available products can be used such as, for example, "Unistole P901" (trade name) available from Mitsui Chemicals Inc., and "Polytale" (trade name) available from Mitsubishi Chemical Corporation.

As the ionizing radiation curable resin, it is possible to use a transparent ionizing radiation curable resin containing at least an ionizing radiation curable resin monomer, an ionizing radiation curable resin oligomer, or a mixture thereof. The medium refractive index layer made of the ionizing radiation curable resin is formed through curing by irradiation with ionizing radiation.

As the ionizing radiation curable resin monomer, it is possible to use, for example, a multifunctional acrylate monomer having two or more unsaturated groups or the like. Specific examples thereof include: acrylates such as ethylene glycol di(meth)acrylate, diethylene glycol di(meth)acrylate, triethylene glycol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, and 1,2,3-cyclohexane trimethacrylate; vinylbenzenes such as 1,4-divinylbenzene, 4-vinyl benzoic acid-2-acryloyl ethyl ester and 1,4-divinyl cyclohexanone, and derivatives thereof. The medium refractive index layer can be formed by adding a photopolymerization initiator if necessary, followed by irradiation with ionizing radiation to cure the layer.

Also, in order to further improve the adhesion between the ionizing radiation curable resin and the infrared reflective layer, a (meth)acrylic acid derivative having a polar group such as a phosphoric acid group, a sulfonic acid group or an amide group, a silane coupling agent having an unsaturated group such as a (meth)acrylic group or a vinyl group, etc., may be added to the ionizing radiation curable resin monomer and used.

Furthermore, in order to further improve the wettability of a solution of the ionizing radiation curable resin when applied to the infrared reflective layer, a leveling agent such as a fluorine-based leveling agent, a silicone-based leveling agent or an acrylic leveling agent may be added to the solution of the ionizing radiation curable resin monomer and used within a range that does not decrease the adhesion to the high refractive index layer to be stacked.

Moreover, in order to improve the film formability of the solution of the ionizing radiation curable resin when applied to the infrared reflective layer, a polymer such as an acrylic resin or acrylic resin acrylate may be added to the solution of the ionizing radiation curable resin monomer and used within a range that does not impair the object of the medium refractive index layer of the present invention.

Moreover, as the ionizing radiation curable resin oligomer, it is possible to use, for example: urethane-based multifunctional acrylate oligomers such as pentaerythritol triacrylate hexamethylene diisocyanate urethane prepolymer; ester-based multifunctional acrylate oligomers produced from a polyhydric alcohol and (meth)acrylic acid; and epoxy-based multifunctional acrylate oligomers. Among them, it is preferable to use urethane-based multifunctional acrylate oligomers because the hardness and flexibility of the protective layer to be formed can be easily balanced. The urethane-based multifunctional acrylate oligomers can be obtained by reacting, for example, a urethane acrylate having an acrylate polymer as the main chain backbone and a reactive acryloyl group at the terminal. The medium refractive index layer can be formed by adding a photopolymerization initiator if necessary, followed by irradiation with ionizing radiation to cure the layer.

Also, in order to further improve the adhesion to the infrared reflective layer, a (meth)acrylic acid derivative having a polar group such as a phosphoric acid group, a sulfonic acid group or an amide group, and a silane coupling agent having an unsaturated group such as a (meth)acrylic group or a vinyl group, etc., may be added to the ionizing radiation curable resin oligomer and used.

Furthermore, in order to further improve the wettability of the solution of the ionizing radiation curable resin when applied to the infrared reflective layer, a leveling agent such as a fluorine-based leveling agent, a silicone-based leveling agent or an acrylic leveling agent may be added to the solution of the ionizing radiation curable resin oligomer and used within a range that does not decrease the adhesion to the high refractive index layer to be stacked.

Moreover, in order to improve the film formability of the solution of the ionizing radiation curable resin when applied to the infrared reflective layer, a polymer such as an acrylic resin or acrylic resin acrylate may be added to the solution of the ionizing radiation curable resin oligomer and used within a range that does not impair the characteristics of the medium refractive index layer.

As the multifunctional acrylate oligomer, commercially available products can be used. It is possible to use, for example, "BPZA-66" and "BPZA-100" (trade name) available from Kyoeisha Chemical Co. Ltd., "Acrit 8KX-012C" and "Acrit 8KX-077" (trade name) available from Taisei Fine Chemical Co., Ltd., "Hitaloid 7975", "Hitaloid 7975D" and "Hitaloid 7988" (trade name) available from Hitachi Chemical Co. Ltd., "ACA-200M", "ACA-230AA", "ACA-Z250", "ACA-Z251", "ACA-Z300" and "ACA-Z320" (trade name) available from Daicel-Allnex Ltd., and the like.

<High Refractive Index Layer>

The high refractive index layer in the optical adjustment protective layer is preferably set to have a light refractive index at a wavelength of 550 nm of 1.65 to 1.95, and more preferably 1.70 to 1.90. The thickness of the high refractive index layer is, although the suitable range depends on the refractive index, thickness and the like of the medium refractive index layer, which is the lower layer of the high refractive index layer, and the low refractive index layer, which is the upper layer of the high refractive index layer, preferably set as appropriate within a range described below according to the stack configuration of the optical adjustment protective layer.

When the optical adjustment protective layer has a stack configuration including a high refractive index layer and a low refractive index layer in this order from the infrared reflective layer side, the thickness of the high refractive index layer is preferably set as appropriate within a range of 160 to 870 nm, for keeping a balance with the configuration of the low refractive index layer. The high refractive index layer having a thickness of less than 160 nm may result in, for example, an emphasis in red in the reflected color of a product and an emphasis in green in the transmitted color of a product. Moreover, the scratch resistance may be insufficient. The high refractive index layer having a thickness of greater than 870 nm may result in an increase in the absorption of far-infrared rays when the high refractive index layer contains a large amount of inorganic fine particles, which increases the normal emissivity and decreases the heat-insulating properties.

When the optical adjustment protective layer has a stack configuration including a medium refractive index layer, a high refractive index layer and a low refractive index layer in this order from the infrared reflective layer side, the thickness of the high refractive index layer is preferably set as appropriate within a range of 100 to 720 nm, for keeping a balance with the configurations of the other layers. The high refractive index layer having a thickness of less than 100 nm may result in, for example, an emphasis in green in the transmitted color of a product. The high refractive index layer having a thickness of greater than 720 nm may result in an increase in the absorption of far-infrared rays when the high refractive index layer contains a large amount of inorganic fine particles, which increases the normal emissivity and decreases the heat-insulating properties.

There is no particular limitation on the constituent material of the high refractive index layer as long as the refractive index of the high refractive index layer can be set within the range described above. For example, it is preferable to use a material containing a resin such as a thermoplastic resin, a thermosetting resin or an ionizing radiation curable resin, and inorganic fine particles dispersed in the resin. As the resin such as a thermoplastic resin, a thermosetting resin or an ionizing radiation curable resin, any of the resins listed above as the resins for the medium refractive index layer can be used. The high refractive index layer can be formed in the same formulation as the medium refractive index layer. Among the constituent materials of the high refractive index layer, a material containing an ionizing radiation curable resin and inorganic fine particles dispersed in the ionizing radiation curable resin is preferred, in terms of optical properties such as transparency, physical properties such as scratch resistance, and productivity.

The material containing an ionizing radiation curable resin and inorganic fine particles is generally applied onto the metal oxide layer or metal nitride layer, or the medium refractive index layer, and thereafter irradiated with ionizing radiation such as ultraviolet rays to cure the layer, and thus the high refractive index layer is formed as the optical adjustment layer. Since the inorganic fine particles contained in the material can reduce the shrinkage of the film during curing, the adhesion to the metal oxide layer or metal nitride layer, or the adhesion to the medium refractive index layer, can be improved.

The inorganic fine particles are added in order to adjust the refractive index of the high refractive index layer. As the inorganic fine particles, it is possible to use titanium oxide ($TiO_2$), zirconium oxide ($ZrO_2$), zinc oxide (ZnO), indium tin oxide (ITO), niobium oxide ($Nb_2O_5$), yttrium oxide ($Y_2O_3$), indium oxide ($In_2O_3$), tin oxide ($SnO_2$), antimony oxide ($Sb_2O_3$), tantalum oxide ($Ta_2O_5$), tungsten oxide ($WO_3$), and the like.

Among the inorganic fine particles, titanium oxide and zirconium oxide are preferred because a high refractive index can be attained by addition of a small amount thereof, titanium oxide and zinc oxide are preferred because the absorption of light in the infrared region is small, and titanium oxide is more preferred from both of the viewpoints.

As the particle size of the inorganic fine particles, from the viewpoint of transparency of the high refractive index layer, the inorganic fine particles preferably have an average particle size of 5 to 100 nm, and more preferably 10 to 80 nm. If the average particle size is greater than 100 nm, the haze value increases in the formed high refractive index layer, which is likely to cause a reduction in the transparency. If the average particle size is less than 5 nm, it is difficult to maintain dispersion stability of the inorganic fine particles when used in a high refractive index coating material.

<Low Refractive Index Layer>

The low refractive index layer in the optical adjustment protective layer is preferably set to have a light refractive index at a wavelength of 550 nm of 1.30 to 1.45, and more preferably 1.35 to 1.43. The thickness of the low refractive index layer is, although the suitable range depends on the refractive index, thickness and the like of the high refractive index layer, which is the lower layer of the low refractive index layer, and the medium refractive index layer, which is the lower layer of the high refractive index layer, preferably set as appropriate within a range described below according to the stack configuration of the optical adjustment protective layer.

When the optical adjustment protective layer has a stack configuration including a high refractive index layer and a low refractive index layer in this order from the infrared reflective layer side, the thickness of the low refractive index layer is preferably set as appropriate within a range of 75 to 125 nm, for keeping a balance with the configuration of the high refractive index layer. The low refractive index layer having a thickness of less than 75 nm may result in, for example, an emphasis in green in the transmitted color of a product. Moreover, the "maximum variation difference $\Delta A$" and the "maximum variation difference $\Delta B$" of reflectance may exceed desired values and the reflected color change due to the iridescent phenomenon or viewing angle may not be sufficiently reduced. The low refractive index layer having a thickness of greater than 125 nm may result in a situation in which the "maximum variation difference $\Delta A$" and the "maximum variation difference $\Delta B$" of reflectance exceed desired values and the reflected color change due to the iridescent phenomenon or viewing angle is not sufficiently reduced.

When the optical adjustment protective layer has a stack configuration including a medium refractive index layer, a high refractive index layer and a low refractive index layer in this order from the infrared reflective layer side, the thickness of the low refractive index layer is preferably set as appropriate within a range of 70 to 150 nm, for keeping a balance with the configurations of the other layers. The low refractive index layer having a thickness of less than 70 nm may result in, e.g., an emphasis in green in the transmitted color of a product. Moreover, the "maximum variation difference $\Delta A$" and the "maximum variation difference $\Delta B$" of reflectance may exceed desired values and the reflected color change due to the iridescent phenomenon or viewing angle may not be sufficiently reduced. The low refractive index layer having a thickness of greater than 150 nm may result in a situation in which the "maximum variation difference $\Delta A$" and the "maximum variation difference $\Delta B$" of reflectance exceed desired values and the reflected color change due to the iridescent phenomenon or viewing angle is not sufficiently reduced.

There is no particular limitation on the constituent material of the low refractive index layer as long as the refractive index of the low refractive index layer can be set within the range described above. For example, it is preferable to use a resin such as a thermosetting resin or an ionizing radiation curable resin, a material containing the resin and low refractive index inorganic fine particles dispersed in the resin, or a material containing an organic-inorganic hybrid material in which an organic component and an inorganic component are chemically bonded. Among the constituent materials of the low refractive index layer, a material containing an ionizing radiation curable resin and low refractive index inorganic fine particles dispersed in the ionizing radiation curable resin, and a material containing an organic-inorganic hybrid material in which an ionizing radiation curable resin and low refractive index inorganic fine particles are chemically bonded are preferred, in terms of optical properties such as transparency, physical properties such as scratch resistance, and productivity.

As the ionizing radiation curable resin, any of the resins listed above as the ionizing radiation curable resins for the medium refractive index layer and fluorine-based ionizing radiation curable resin can be used. The low high refractive index layer can be formed in the same formulation as the medium refractive index layer.

The inorganic fine particles are dispersed and added in the resin for adjusting the refractive index of the low refractive index layer. As the low refractive index inorganic fine particles, for example, it is possible to use, for example, silicon oxide, magnesium fluoride, aluminum fluoride, or the like. From the viewpoint of physical properties such as scratch resistance of the low refractive index layer that is to be located at an outermost surface of the protective layer, it is preferable to use a silicon oxide-based material, and it is particularly preferable to use a hollow silicon oxide (hollow silica)-based material having pores inside, in order to attain a low refractive index.

The material containing the ionizing radiation curable resin and the inorganic fine particles is generally applied onto the high refractive index layer, and thereafter irradiated with ionizing radiation such as ultraviolet rays to cure the layer, and thus the low refractive index layer is formed. Since the inorganic fine particles contained in the material can reduce the shrinkage of the film during curing, the adhesion to the high refractive index layer can be improved.

In order to further improve the adhesion between the low refractive index layer containing the ionizing radiation curable resin and the high refractive index layer, the ionizing radiation curable resin may contain a (meth)acrylic acid derivative having a polar group such as a phosphoric acid group, a sulfonic acid group or an amide group, a silane coupling agent having an unsaturated group such as a (meth)acrylic group or a vinyl group, etc.

Other than the constituent materials listed above, the constituent material of the low refractive index layer may further contain additives such as a leveling agent, a fingerprint adhesion inhibitor, a lubricant, an anti-static agent, and a haze imparting agent. The contents of these additives may be adjusted as appropriate within a range that does not impair the object of the low refractive index layer of the present invention.

As described above, the optical adjustment protective layer may have a stack configuration (1) including a high refractive index layer and a low refractive index layer in this order from the infrared reflective layer side, or a stack configuration (2) including a medium refractive index layer, a high refractive index layer and a low refractive index layer in this order from the infrared reflective layer side. With any of the configurations, the thickness of each layer of the optical adjustment protective layer may be set appropriately so that the total thickness of the optical adjustment protective layer will be within a range of 250 nm to 980 nm.

Specifically, when the optical adjustment protective layer has the stack configuration (1), the high refractive index layer having a refractive index at a wavelength of 550 nm of 1.65 to 1.95 is appropriately set to have a thickness of 160 nm to 870 nm, and the low refractive index layer having a refractive index at a wavelength of 550 nm of 1.30 to 1.45 is appropriately set to have a thickness of 75 nm to 125 nm. Meanwhile, when the optical adjustment protective layer has the stack configuration (2), the medium refractive index layer having a refractive index at a wavelength of 550 nm of 1.45 to 1.55 is appropriately set to have a thickness of 80 nm to 200 nm, the high refractive index layer having a refractive index at a wavelength of 550 nm of 1.65 to 1.95 is appropriately set to have a thickness of 100 nm to 720 nm, and the low refractive index layer having a refractive index at a wavelength of 550 nm of 1.30 to 1.45 is appropriately set to have a thickness of 70 nm to 150 nm. By doing so, it is possible to provide a heat-shielding/heat-insulating member having a transparent screen function that is excellent in physical properties such as scratch resistance while keeping heat-insulating properties (a normal emissivity of 0.22 or less, a heat transmission coefficient of 4.2 $W/m^2K$ or less), and that has excellent appearance with less reflected color change due to the iridescent phenomenon or viewing angle.

As a more preferable range, if the optical adjustment protective layer is set to have a total thickness of 300 nm to 700 nm, a normal emissivity measured based on JIS R3106-1998 of 0.17 or less (a heat transmission coefficient of 4.0 $W/m^2 \cdot K$ or less) is attained on the functional layer side, and adequate mechanical properties as a protective layer can be obtained, and thus both of the heat-insulating performance and scratch resistance can be achieved at a still higher level.

There is no particular limitation on the method for forming the respective layers of the optical adjustment protective layer, but the optical adjustment protective layer can be formed by a method in which a solution prepared by dissolving and dispersing a composition containing the above constituent materials in an appropriately selected organic solvent is applied onto the infrared reflective layer directly or via another thin layer such as a primer layer by using a coater such as a micro-gravure coater, a gravure coater, a die coater, a reverse coater or a roll coater, and then dried. The optical adjustment protective layer can be cross-linked and cured by irradiation with ionizing radiation or application of thermal energy after the organic solvent has been dried.

[Light Diffusing Layer]

The light diffusing layer constituting the transparent heat-shielding/heat-insulating member having a transparent screen function of the present invention is composed of a layer in which light diffusing particles are dispersed in a transparent resin. In general, the transparent resin has a refractive index different from that of the light diffusing particles dispersed therein. The refractive index of the transparent resin is preferably selected from a range of 1.45 to 1.60 as appropriate. There is no particular limitation on the refractive index of the light diffusing particles as long as the refractive index is different from (lower or higher than) that of the transparent resin, but the refractive index of the light diffusing particles is preferably selected from a range of 1.30 to 2.40 as appropriate, and more preferably from a range of 1.40 to 1.65 as appropriate. It is preferable that the absolute value of the difference in the refractive index between the transparent resin and the light diffusing particles is set to be within a range of 0.01 to 0.20. By setting the absolute value of the difference in the refractive index to be within this range, it is possible to obtain a light diffusing layer having a desired haze value.

There is no particular limitation on the transparent resin used for the light diffusing layer as long as it has optical transparency, and it is possible to use as appropriate known resins, adhesives and pressure-sensitive adhesives including thermoplastic resins, thermosetting resins and ionizing radiation curable resins such as (meth)acrylic-based resin, acrylic urethane-based resin, polyesterbased resin, polyester acrylate-based resin, polyurethane (meth)acrylate-based resin, epoxy (meth)acrylate-based resin, polyurethane-based resin, epoxy-based resin, polycarbonate-based resin, cellulose-based resin, acetal-based resin, vinyl-based resin, polyethylene-based resin, polystyrene-based resin, polypropylene-based resin, ethylene/vinyl acetate-based resin, polyamide-based resin, polyimide-based resin, melamine-based resin, phenol-based resin, silicone-based resin and fluorine-based resin; and rubber-based resins such as natural rubber-based resin, recycled rubber-based resin, chloroprene rubber-based resin, nitrile rubber-based resin and styrene/butadiene rubber-based resin. The transparent resin may further contain one or more additives such as a crosslinking agent, an ultraviolet absorbing agent, an antioxidant, an anti-static agent, a flame retardant agent, a plasticizing agent and a coloring agent according to the purpose. The refractive index of the transparent resin is preferably selected from a range of 1.45 to 1.60 as appropriate.

Among the transparent resins, it is particularly preferable to use a pressure-sensitive adhesive that has pressure sensitive adhesiveness at room temperature. It is preferable to use a pressure-sensitive adhesive as the transparent resin in which light diffusing particles are dispersed, in terms of processing cost because the functions of the light diffusing layer and the pressure-sensitive adhesive layer can be implemented by a single layer. Examples of the pressure-sensitive adhesive include acrylic-based resin, silicone-based resin, polyester-based resin, epoxy-based resin, and polyurethane-based resin. In particular, acrylic-based resin is more preferably used because it has high optical transparency, is highly reliable, has proven useful in many applications, and is relatively inexpensive.

Examples of the acrylic pressure-sensitive adhesive include a homopolymer or a copolymer of acrylic monomers such as acrylic acid and an ester thereof, methacrylic acid and an ester thereof, acrylamide, and acrylonitrile. Other examples thereof include a copolymer containing at least one of the acrylic monomers listed above and a vinyl monomer such as vinyl acetate, maleic anhydride, or styrene. In particular, a preferable acrylic pressure-sensitive adhesive can be a copolymer obtained by copolymerizing, as appropriate, a main alkyl acrylate-based monomer serving as a component for exhibiting pressure sensitive adhesiveness such as methyl acrylate, ethyl acrylate, butyl acrylate and 2-ethylhexyl acrylate; a monomer serving as a component for improving a cohesive force such as a vinyl acetate, acrylamide, acrylonitrile, styrene and methacrylate; and a functional group-containing monomer serving as a component for further improving the pressure sensitive adhesiveness and providing a crosslinking point such as acrylic acid, methacrylic acid, itaconic acid, crotonic acid, maleic anhydride, hydroxyl ethyl methacrylate, hydroxyl propyl methacrylate, dimethyl aminoethyl methacrylate, methylol acrylamide, and a glycidyl methacrylate. The acrylic pressure-sensitive adhesive preferably has a Tg (glass transition temperature) of −60° C. to −10° C. and a weight-average molecular weight of 100,000 to 2,000,000, and more preferably a weight-average molecular weight of 500,000 to 1,000,000. The acrylic pressure-sensitive adhesive may be mixed with one or more crosslinking agents such as an isocyanate-based crosslinking agent, an epoxy-based crosslinking agent, and a metal chelate-based crosslinking agent as needed.

Also, as the acrylic pressure-sensitive adhesive, it is possible to use an ionizing radiation curable coating material obtained by blending a photopolymerization initiator and the like with an oligomer having a (meth)acryl group at the terminal or side chain and a (meth)acrylic monomer. When such an ionizing radiation curable coating material is applied to a transparent base substrate and then irradiated with ionizing radiation such as ultraviolet rays, the coating layer is formed into a pressure-sensitive adhesive, which can be used as the acrylic pressure-sensitive adhesive.

As the light diffusing particles used for the light diffusing layer, it is possible to use inorganic fine particles and organic fine particles. The refractive index of the light diffusing particles is preferably selected as appropriate from a range of 1.30 to 2.40, and more preferably from a range of 1.40 to 1.65. As long as the refractive index of the light diffusing particles is within the range, the absolute value of the difference in the refractive index with respect to the transparent resin can be set to be within a desired range, and thus a light diffusing layer having a desired haze value can be obtained.

As the inorganic fine particles, it is possible to use, as appropriate, conventionally known inorganic fine particles of silica, alumina, rutile titanium dioxide, anatase titanium dioxide, zinc oxide, zinc sulfide, white lead, antimony oxides, zinc antimonate, lead titanate, potassium titanate, barium titanate, zirconium oxide, cerium oxide, hafnium oxide, tantalum pentoxide, niobium pentoxide, yttrium oxide, chromium oxide, tin oxide, molybdenum oxide, indium tin oxide, antimony-doped tin oxide, calcium carbonate, talc, oxide glass such as silicate glass, phosphate glass or borate glass, diamond or the like.

As the organic fine particles, it is possible to use, as appropriate, conventionally known organic fine particles of, for example, an acrylic polymer, an acrylonitrile polymer, a styrene-acrylic copolymer, a vinyl acetate-acrylic copolymer, a vinyl acetate polymer, an ethylene-vinyl acetate copolymer, a chlorinated polyolefin polymer, a multi-component copolymer such as an ethylene-vinyl acetate-acrylic copolymer, SBR, NBR, MBR, carboxylated SBR, carboxylated NBR, carboxylated MBR, polyvinylchloride-based resin, polyvinylidene chloride-based resin, polyester-based resin, polyolefin-based resin, polyurethane-based resin, polymethacrylate-based resin, polytetrafluoroethylene-based resin, polymethyl methacrylate-based resin, polycarbonate-based resin, polyvinyl acetal-based resin, rosin ester-based resin, episulfide-based resin, epoxy-based resin, silicone-based resin, silicone-acrylic-based resin, melamine-based resin or the like.

The shape of the light diffusing particles may be any shape such as a spherical shape, a flat shape, an amorphous shape, a starlike shape, or a spherical star shape. Also, the light diffusing particles may be hollow particles or core-shell particles. The light diffusing particles may be used alone or in combination of two or more.

Among the shapes of the light diffusing particles, an amorphous shape, a starlike shape, and a spherical star shape are more preferred from the viewpoint of enhancing an internal diffusion effect and allowing the particles to be scattered forward, backward and around as uniform as possible so as to increase the transmission diffusion angle.

The light diffusing particles preferably has an average particle size of 0.2 to 10.0 μm and more preferably 0.5 to 5.0 μm. If the average particle size is less than 0.2 μm, the light diffusing performance will be low, which may result in poor viewability of projected images, as well as a cost increase and a reduction in the physical properties of the light diffusing layer as a result of addition of an excessively large amount of the light diffusing particles. If, on the other hand, the average particle size is greater than 10.0 μm, the visible light transmittance may be reduced or the contrast may be reduced due to glittering. Moreover, in order to correspond to short-projection projectors in which light of a light source obliquely enters a screen, it is preferable to use, as the light diffusing particles, a mixture of particles having a large average particle size and particles having a small average particle size (the average particle sizes are to be within the range of the visible light wavelength region). For example, it is preferable to combine light diffusing particles having an average particle size of 4.0 μm and light diffusing particles having an average particle size of 0.5 μm. Thus, the brightness of a projected image in an area other than the optical axis area also can be obtained easily.

The amount of light diffusing fine particles in the light diffusing layer is, although the suitable range depends on the refractive index of the transparent resin and the light diffusing particles used, the size of the light diffusing particles, the thickness of the light diffusing layer, the dispersed state of the light diffusing particles and the like, preferably 0.3 to 20 parts by mass and more preferably 1 to 10 parts by mass with respect to 100 parts by mass of the transparent resin. If the amount is less than 0.3 parts by mass, the haze value of the transparent heat-shielding member having a transparent screen function may be less than 5%, and as a result, the light diffusing performance may be insufficient and the viewability of a projected image from a projector may be poor. If the amount is greater than 20 parts by mass, the haze value may exceed 35%, and as a result, the background viewability or the visible light transmittance may be reduced. By blending the light diffusing particles in an amount within the above range, it is possible to obtain a light diffusing layer having excellent light diffusing performance.

The thickness of the light diffusing layer is determined as appropriate according to the size and amount of the light diffusing particles used, the refractive indices of the transparent resin and the light diffusing particles, and the like. By adjusting the thickness, the transparent heat-shielding member having a transparent screen function can have a haze value within a desired range. The thickness of the light diffusing layer is preferably 5 to 200 μm and more preferably 10 to 100 μm. If the thickness is less than 5 μm, the haze value may also be less than 5%, and as a result, the light diffusing performance may be insufficient and the viewability of a projected image from a projector may be poor. If the thickness is greater than 200 μm, a problem may occur in handling or workability, and the haze value may exceed 35%, and as a result, the background viewability or the visible light transmittance may be reduced.

In the case where the above-described pressure-sensitive adhesive is used as the transparent resin, the thickness of the light diffusing layer is preferably 10 to 150 μm. If the thickness is less than 10 μm, the pressure-sensitive adhesive force with respect to a transparent substrate serving as an adherend may decrease. If the thickness is greater than 150 μm, when a web of the transparent heat-shielding member having a transparent screen function is finally wound and its ends are slit, the slit end faces may be sticky and dust or the like may adhere thereto, or a problem may occur in handling or workability.

The light diffusing layer may be formed directly on a transparent base substrate or via an adhesion promotion layer, an adhesive layer or the like.

There is no particular limitation on the method for forming the light diffusing layer, but it is preferable to form the light diffusing layer by using a method in which a coating material obtained by dispersing the light diffusing particles described above in a solution in which the transparent resin described above is dissolved in an organic solvent such as ethyl acetate, butyl acetate, acetone, methyl ethyl ketone, methyl isobutyl ketone, cyclohexanone, toluene or xylene is applied onto the surface of the transparent base substrate on which the infrared reflective layer is not formed, and then dried.

Also, in the case using a pressure-sensitive adhesive as the transparent resin, the light diffusing layer can be formed by a method in which a pressure-sensitive adhesive solution in which the light diffusing particles are dispersed is applied onto the surface of the transparent base substrate that is opposite to the surface on which the infrared reflective layer is formed, and then dried, and thereafter a release film is laminated onto the pressure-sensitive adhesive layer, or a method in which a pressure-sensitive adhesive solution in which the light diffusing particles are dispersed is applied onto a release film, and then dried, and thereafter the surface of the transparent base substrate that is opposite to the surface on which the infrared reflective layer is formed is bonded onto the spread pressure-sensitive adhesive layer.

Furthermore, the light diffusing layer can also be formed by a method in which the light diffusing particles are hot melt kneaded in a transparent resin such as polyolefin or polyethylene terephthalate and subjecting the mixture to an extrusion method, a calendering method, a compression molding method, an injection molding method, a casting method or the like to form a film, and thereafter the film obtained is bonded to the surface of the transparent base substrate that is opposite to the surface on which the infrared reflective layer is formed by using a transparent adhesive. The film, which is obtained by hot melt kneading the light diffusing particles in a transparent resin such as polyolefin or polyethylene terephthalate and subjecting the mixture to an extrusion method, a calendering method, a compression molding method, an injection molding method, a casting method or the like, also can be used as it is as a transparent base substrate that also functions as a light diffusing layer.

When the light diffusing layer is formed between the transparent base substrate and the infrared reflective layer, the light diffusing layer is formed on the transparent base substrate in the same manner as the method described above, and then the infrared reflective layer is formed on the light diffusing layer by a dry coating method.

The dispersion of the light diffusing particles in the transparent resin can be performed by using various mixing/agitating apparatuses and dispersion apparatuses such as a Disper, an Ajiter, a ball mill, an Attritor and a sand mill. A dispersing agent for dispersing the light diffusing particles may be added and dispersed as needed. It is preferable that the coating material in which the light diffusing particles are dispersed is defoamed before application so as to reduce, as much as possible, air bubbles that remain in the light diffusing layer formed by application of the coating material and drying.

The application of the coating material in which the light diffusing particles are dispersed can be performed by using a coater such as a die coater, a comma coater, a reverse coater, a dam coater, a doctor bar coater, a gravure coater, a micro-gravure coater or a roll coater.

The light diffusing layer may be cured, as needed, through cross-linking suitable for a functional group contained in the transparent resin used such as for example, cross-linking due to heat by addition of a crosslinking agent having multiple functional groups, cross-linking by irradiation with ionizing radiation, or the like.

[Transparent Substrate]

There is no particular limitation on the transparent substrate to which the transparent heat-shielding/heat-insulating member having a transparent screen function of the present invention is attached via a transparent pressure-sensitive adhesive, an adhesive or the like, or by electrostatic attraction as long as it has optical transparency, and a plate-like material made of glass or plastic can be preferably used. There is no particular limitation on the type of glass, but it is preferable to use, for example, silicic acid salt glass such as silicate glass, alkali silicate glass, soda lime glass, potash lime glass, lead glass, barium glass, borosilicate glass, or the like. There is no particular limitation on the type of plastic, but it is preferable to use, for example, polyacrylic acid ester-based resin, polycarbonate-based resin, polyvinylchloride-based resin, polyarylate-based resin, polyethylene-based resin, polypropylene-based resin, polyester-based resin, or the like.

[Pressure-Sensitive Adhesive Layer]

The transparent heat-shielding/heat-insulating member having a transparent screen function of the present invention is easily attached to a transparent substrate such as a window pane by forming a pressure-sensitive adhesive layer or the like on the surface of the transparent base substrate that is opposite to the surface on which the optical adjustment protective layer is formed. As the material of the pressure-sensitive adhesive layer, a material having a high visible light transmittance is preferably used. Examples thereof include acrylic-based resin, silicone-based resin, polyester-based resin, epoxy-based resin and polyurethane-based resin. In particular, acrylic-based resin is more preferably used because it has high optical transparency, has good balance between wettability and pressure-sensitive adhesive force, is reliable, has proven useful in many applications, and is relatively inexpensive. As the acrylic-based pressure-sensitive adhesive, any of the pressure-sensitive adhesives listed as the material for the light diffusing layer above can be used in the same formulation.

The pressure-sensitive adhesive layer preferably contains an ultraviolet absorbing agent in order to suppress the degradation of the transparent heat-shielding/heat-insulating member having a transparent screen function caused by ultraviolet rays of sunlight and the like. Also, the pressure-sensitive adhesive layer preferably includes a release film on the pressure-sensitive adhesive layer until the transparent heat-shielding/heat-insulating member having a transparent screen function is attached to a transparent substrate and used.

The thickness of the pressure-sensitive adhesive is preferably 10 to 150 μm. If the thickness is less than 10 μm, the pressure-sensitive adhesive force with respect to a transparent substrate serving as an adherend may decrease. If the thickness is greater than 150 μm, when a web of the transparent heat-shielding/heat-insulating member having a transparent screen function is finally wound and its ends are slit, the slit end faces may be sticky and dust or the like may adhere thereto, or a problem may occur in handling or workability.

There is no particular limitation on the method for forming the pressure-sensitive adhesive layer on the transparent heat-shielding/heat-insulating member having a transparent screen function, but it is preferable to form the pressure-sensitive adhesive layer by a method in which a solution prepared by dissolving any of the above-listed resins for forming the pressure-sensitive adhesive layer in an appropriately selected organic solvent is first applied onto a release film by using a coater such as a die coater, a comma coater, a reverse coater, a dam coater, a doctor bar coater, a gravure water, a micro-gravure coater or a roll coater and dried, and thereafter an exposed surface of the pressure-sensitive adhesive layer is attached to the surface of the transparent heat-shielding/heat-insulating member having a transparent screen function that is opposite to the surface on which the optical adjustment protective layer is formed.

EXAMPLES

Hereinafter, the present invention will be described in detail by way of examples. It is to be noted, however, that the present invention is not limited to the examples given below. Also, in the following description, unless otherwise stated, the term "part(s)" means "part(s) by mass".

<Measurement of Refractive Index and Thickness of Each Layer of Optical Adjustment Protective Layer>

(Measurement of Refractive Index)

The refractive indices of the medium refractive index layer, the high refractive index layer and the low refractive index layer obtained in each of the following examples and comparative examples were measured by the following method.

A film sample for refractive index measurement was produced by applying a coating material for forming each layer onto a surface, not being subjected to an adhesion promotion treatment, of a polyethylene terephthalate (PET) film "A4100" available from Toyobo Co., Ltd., so as to have a thickness of 500 nm, and then drying the coating material. In the case of using an ultraviolet curable coating material in the coating material for forming each layer, the film sample for refractive index measurement was produced by, after drying, applying ultraviolet rays in an amount of 300 mJ/cm$^2$ with a high-pressure mercury lamp so as to cure the coating material.

Next, a black tape was attached to the back side of the produced sample for refractive index measurement, a reflective spectrum was obtained by using a reflectance spectroscopic thickness meter "FE-3000" (trade name) available from Otsuka Electronics Co., Ltd., and fitting was performed from n-Cauchy equation based on the obtained reflective spectrum, and the light refractive index at a wavelength of 550 nm of each layer was obtained.

(Measurement of Thickness)

The thicknesses of the medium refractive index layer; the high refractive index layer and the low refractive index layer obtained in each of the following examples and comparative examples were measured by attaching a black tape on a surface of the transparent substrate on which the infrared reflective layer and the protective layer were not formed, obtaining a reflective spectrum for each layer by an instantaneous multi-purpose photometric system "MCPD-3000" (trade name) available from Otsuka Electronics Co., Ltd., and performing optimization fitting by using a refractive index obtained by the above method from the obtained reflective spectrum.

Example 1

<Formation of Infrared Reflective Layer>

A polyethylene terephthalate (PET) film "A4300" (trade name, thickness: 50 μm) available from Toyobo Co., Ltd. having both surfaces subjected to an adhesion promotion treatment was first prepared as a transparent base substrate. Next, an infrared reflective layer having a three-layer structure composed of a 29 nm thick indium tin oxide (ITO) layer, a 12 nm thick silver (Ag) layer and a 29 nm thick indium tin oxide (ITO) layer was formed on one side of the PET film by a sputtering method. Formation of Medium Refractive Index Layer <Formation of Optical Adjustment Protective Layer>
(Formation of Medium Refractive Index Layer)

A medium refractive index layer-forming coating material A was prepared by mixing, in a Disper, 100 parts of modified polyolefin resin solution "Hardlen NS-2002" (trade name, acid-modified type, solid content: 20 mass %) available from Toyobo Co., Ltd., 800 parts of methylcyclohexane as a diluting solvent, and 200 parts of methyl isobutyl ketone. Next, the medium refractive index layer-forming coating material A was applied onto the infrared reflective layer by using a micro-gravure coater (available from Yasui Seiki Co., Ltd.) and dried so as to have a dry thickness of 160 nm, and thereby a medium refractive index layer was formed on the infrared reflective layer. The refractive index of the medium refractive index layer produced was 1.51.

(Formation of High Refractive Index Layer)

A high refractive index layer-forming coating material A was prepared by mixing, in a Disper, 100 parts of titanium oxide-containing high refractive index layer-forming coating material "Lioduras (registered trademark) TYT-80" (trade name, solid content: 25 mass %) available from TOYO INC CO., LTD., 0.3 parts of phosphoric acid group-containing methacrylic acid derivative "Light Ester P-2M" (trade name) available from Kyoeisha Chemical Co., Ltd, and 153 parts of methyl isobutyl ketone as a diluting solvent. Next, the high refractive index layer-forming coating material A was applied onto the medium refractive index layer by using the aforementioned micro-gravure coater and dried so as to have a dry thickness of 335 nm, and thereafter irradiated with ultraviolet rays in an amount of 300 mJ/cm$^2$ with a high-pressure mercury lamp so as to cure the coating material, and thereby a high refractive index layer was formed. The refractive index of the high refractive index layer produced was 1.79.

(Formation of Low Refractive Index Layer)

A hollow silica-containing low refractive index layer-forming coating material "ELCOM P-5062" (trade name, solid content: 3 mass %) available from JGC Catalysts and Chemicals Ltd. was used as a low refractive index layer-forming coating material A, and the coating material A was applied onto the high refractive index layer by using the aforementioned micro-gravure coater and dried so as to have a dry thickness of 105 nm, and thereafter irradiated with ultraviolet rays in an amount of 300 mJ/cm$^2$ with a high-pressure mercury lamp so as to cure the coating material, and thereby a low refractive index layer was formed. The refractive index of the low refractive index layer produced was 1.38.

In the manner as described above, an infrared reflective film was produced in which the optical adjustment protective layer including the medium refractive index layer, the high refractive index layer, and the low refractive index layer stacked in this order from the infrared reflective layer side was formed on the infrared reflective layer.

<Formation of Light Diffusing Pressure-Sensitive Adhesive Layer>

First, a PET film "NS-38+A" (trade name, thickness: 38 μm) available from Nakamoto Packs Co., Ltd. having a silicone-treated surface was prepared as a release film. Also, a light diffusing pressure-sensitive adhesive layer-forming coating material was prepared by dispersing and mixing 0.88 parts [3.5 parts with respect to 100 parts of pressure-sensitive adhesive resin] of amorphous silicone resin fine particles "TOSPEARL 240" (trade name, average particle size: 4.0 μm, refractive index: 1.42) available from Momentive Performance Materials Japan Inc., 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper and then defoaming the resulting mixture.

Next, the light diffusing pressure-sensitive adhesive layer-forming coating material was applied onto the silicone-treated surface of the above PET film serving as the release film using a die coater and dried so as to have a dry thickness of 25 μm, and thereby a light diffusing pressure-sensitive adhesive layer was formed. Furthermore, an exposed surface of the light diffusing pressure-sensitive adhesive layer was attached to the surface of the infrared reflective film having the optical adjustment protective layer on which the optical adjustment protective layer was not formed. Thereby, a transparent heat-shielding/heat-insulating member having a transparent screen function was produced in which the light diffusing pressure-sensitive adhesive layer was formed on one surface of the PET film base substrate, and the infrared reflective layer and the optical adjustment protective layer composed of three layers of the medium refractive index layer, the high refractive index layer and the low refractive index layer were formed on the other surface.

<Attachment to Glass Substrate>

First, a 3 mm-thick float glass sheet (available from Nippon Sheet Glass Co. Ltd.) was prepared as a glass substrate. Next, the release film arranged on the light diffusing pressure-sensitive adhesive layer side of the transparent heat-shielding/heat-insulating member having a transparent screen function was removed, and the light diffusing pressure-sensitive adhesive layer side was attached to the float glass.

Example 2

A transparent heat-shielding/heat-insulating member having a transparent screen function of Example 2 was produced in the same manner as in Example 1 except that the dry thicknesses of a medium refractive index layer, a high refractive index layer and a low refractive index layer were set to 175 nm, 440 nm and 100 nm, respectively. Then, the produced member was attached to a glass substrate (float glass).

Example 3

A transparent heat-shielding/heat-insulating member having a transparent screen function of Example 3 was produced in the same manner as in Example 1 except that the dry thicknesses of a medium refractive index layer, a high refractive index layer and a low refractive index layer were set to 150 nm, 540 nm and 110 nm, respectively. Then, the produced member was attached to a glass substrate (float glass).

Example 4

A transparent heat-shielding/heat-insulating member having a transparent screen function of Example 4 was produced in the same manner as in Example 3 except that the dry thickness of a high refractive index layer was set to 720 nm. Then, the produced member was attached to a glass substrate (float glass).

Example 5

A transparent heat-shielding/heat-insulating member having a transparent screen function of Example 5 was produced in the same manner as in Example 1 except that the dry thicknesses of a medium refractive index layer, a high refractive index layer and a low refractive index layer were set to 100 nm, 100 nm and 100 nm, respectively. Then, the produced member was attached to a glass substrate (float glass).

Example 6

A transparent heat-shielding/heat-insulating member having a transparent screen function of Example 6 was produced in the same manner as in Example 5 except that the dry thicknesses of a medium refractive index layer and a low refractive index layer were set to 80 nm and 70 nm, respectively. Then, the produced member was attached to a glass substrate (float glass).

Example 7

A transparent heat-shielding/heat-insulating member having a transparent screen function of Example 7 was produced in the same manner as in Example 1 except that the dry thicknesses of a medium refractive index layer and a low refractive index layer were set to 150 nm and 150 nm, respectively. Then, the produced member was attached to a glass substrate (float glass).

Example 8

A transparent heat-shielding/heat-insulating member having a transparent screen function of Example 8 was produced in the same manner as in Example 1 except that a high refractive index layer was produced in the manner described below and the dry thickness of a medium refractive index layer was set to 200 nm. Then, the produced member was attached to a glass substrate (float glass).

(Formation of High Refractive Index Layer)

A high refractive index layer-forming coating material B was prepared by mixing, in a Disper, 100 parts of titanium oxide-containing high refractive index layer-forming coating material "Lioduras (registered trademark) TYZ-74" (trade name, solid content: 40 mass %) available from TOYO INC CO., LTD., and 1900 parts of methyl isobutyl ketone as a diluting solvent. Next, the high refractive index layer-forming coating material B was applied onto the medium refractive index layer by using the aforementioned micro-gravure coater and dried so as to have a dry thickness of 550 nm, and thereafter irradiated with ultraviolet rays in an amount of 300 mJ/cm$^2$ with a high-pressure mercury lamp so as to cure the coating material, and thereby a high refractive index layer was formed. The refractive index of the high refractive index layer produced was 1.76.

Example 9

A transparent heat-shielding/heat-insulating member having a transparent screen function of Example 9 was produced in the same manner as in Example 8 except that the dry thicknesses of a medium refractive index layer, a high refractive index layer and a low refractive index layer were set to 155 nm, 335 nm and 100 nm, respectively. Then, the produced member was attached to a glass substrate (float glass).

Example 10

A transparent heat-shielding/heat-insulating member having a transparent screen function of Example 10 was produced in the same manner as in Example 1 except that the thickness of a silver layer in an infrared reflective layer was set to 10 nm. Then, the produced member was attached to a glass substrate (float glass).

Example 11

A transparent heat-shielding/heat-insulating member having a transparent screen function of Example 11 was produced in the same manner as in Example 1 except that the thickness of a silver layer in an infrared reflective layer was set to 15 nm. Then, the produced member was attached to a glass substrate (float glass).

Example 12

A transparent heat-shielding/heat-insulating member having a transparent screen function of Example 12 was produced in the same manner as in Example 1 except that an infrared reflective layer having a three-layer structure composed of a 30 nm thick aluminum nitride (ALN) layer, a 15 nm thick silver (Ag) layer and a 30 nm thick aluminum nitride (ALN) layer was used. Then, the produced member was attached to a glass substrate (float glass).

Example 13

A transparent beat-shielding/heat-insulating member having a transparent screen function of Example 13 in which a light diffusing pressure-sensitive adhesive layer was formed on one surface of a PET film base substrate, and an infrared reflective layer and an optical adjustment protective layer composed of two layers of a high refractive index layer and a low refractive index layer were formed on the other surface was produced in the same manner as in Example 1, except that a medium refractive index layer was not formed and the high refractive index layer and the low refractive index layer were produced in the manner described below. Then, the produced member was attached to a glass substrate (float glass).

(Formation of High Refractive Index Layer)

A high refractive index layer-forming coating material C was prepared by mixing, in a Disper, 100 parts of titanium oxide-containing high refractive index layer-forming coating material "Lioduras (registered trademark) TYT-90" (trade name, solid content: 25 mass %) available from TOYO INC CO., LTD., 0.3 parts of phosphoric acid group-containing methacrylic acid derivative "Light Ester P-2M" (trade name) available from Kyoeisha Chemical Co., Ltd, and 150 parts of methyl isobutyl ketone as a diluting solvent. Next, the high refractive index layer-forming coating material C was applied onto the infrared reflective layer by using the aforementioned micro-gravure coater and dried so as to have a dry thickness of 440 nm, and thereafter irradiated with ultraviolet rays in an amount of 300 mJ/cm$^2$ with a high-pressure mercury lamp so as to cure the coating material, and thereby a high refractive index layer was formed. The refractive index of the high refractive index layer produced was 1.88.

(Formation of Low Refractive Index Layer)

A hollow silica-containing low refractive index layer-forming coating material "ELCOM P-5062" (trade name, solid content: 3 mass %) available from JGC Catalysts and Chemicals Ltd. was used as a low refractive index layer-forming coating material A, and the coating material A was applied onto the high refractive index layer by using the aforementioned micro-gravure coater and dried so as to have a dry thickness of 80 nm, and thereafter irradiated with ultraviolet rays in an amount of 300 mJ/cm$^2$ with a high-pressure mercury lamp so as to cure the coating material, and thereby a low refractive index layer was formed. The refractive index of the low refractive index layer produced was 1.38.

Example 14

A transparent heat-shielding/heat-insulating member having a transparent screen function of Example 14 was produced in the same manner as in Example 13 except that the dry thicknesses of a high refractive index layer and a low refractive index layer were set to 245 nm and 105 nm, respectively. Then, the produced member was attached to a glass substrate (float glass).

Example 15

A transparent heat-shielding/heat-insulating member of Example 15 was produced in the same manner as in Example 13 except that the high refractive index layer-forming coating material C was changed to the high refractive index layer-forming coating material A, and the dry thicknesses of a high refractive index layer and a low refractive index layer were set to 870 nm and 110 nm, respectively. Then, the produced member was attached to a glass substrate (float glass).

Example 16

A transparent heat-shielding/heat-insulating member having a transparent screen function of Example 16 was produced in the same manner as in Example 15 except that the dry thicknesses of a high refractive index layer and a low refractive index layer were set to 855 nm and 120 nm, respectively. Then, the produced member was attached to a glass substrate (float glass).

Example 17

A transparent heat-shielding/heat-insulating member having a transparent screen function of Example 17 was produced in the same manner as in Example 15 except that the dry thicknesses of a high refractive index layer and a low refractive index layer were set to 160 nm and 90 nm, respectively. Then, the produced member was attached to a glass substrate (float glass).

Example 18

A transparent heat-shielding/heat-insulating member having a transparent screen function of Example 18 was produced in the same manner as in Example 1 except that the addition amount of amorphous silicone resin fine particles "TOSPEARL 240" (trade name, average particle size: 4.0 μm) in a light diffusing pressure-sensitive adhesive layer was 0.25 parts [1.0 part with respect to 100 parts of pressure-sensitive adhesive resin]. Then, the produced member was attached to a glass substrate (float glass).

Example 19

A transparent heat-shielding/heat-insulating member having a transparent screen function of Example 19 was produced in the same manner as in Example 1 except that the addition amount of amorphous silicone resin fine particles "TOSPEARL 240" (trade name, average particle size: 4.0 μm) in a light diffusing pressure-sensitive adhesive layer was 1.13 parts [4.5 parts with respect to 100 parts of pressure-sensitive adhesive resin]. Then, the produced member was attached to a glass substrate (float glass).

Example 20

<Formation of Infrared Reflective Layer and Protective Layer>

In the same manner as in Example 1, an infrared reflective film was produced in which an optical adjustment protective layer including a medium refractive index layer, a high refractive index layer and a low refractive index layer stacked in this order from an infrared reflective layer side was formed on the infrared reflective layer.

<Formation of Light Diffusing Layer>

A light diffusing layer-forming coating material A was prepared by dispersing and mixing 3.5 parts of amorphous silicone resin fine particles "TOSPEARL 240" (trade name, average particle size: 4.0 μm) available from Momentive Performance Materials Japan Inc., 75 parts of methyl ethyl ketone and 75 parts of toluene in 100 parts of acrylic resin "Dianal BR-90" (trade name, refractive index: 1.49) available from Mitsubishi Rayon Co., Ltd. by using a Disper, and then defoaming the resulting mixture.

Next, a light diffusing layer was formed by applying the light diffusing layer-forming coating material A onto the surface of the infrared reflective film having the optical adjustment protective layer on which the optical adjustment protective layer was not formed by using the above die coater and drying the same so as to have a dry thickness of 25 μm.

<Formation of Pressure-Sensitive Adhesive Layer>

First, a PET film "NS-38+A" (trade name, thickness: 38 μm) available from Nakamoto Packs Co., Ltd. having a silicone-treated surface was prepared as a release film. Also, a pressure-sensitive adhesive layer-forming coating material was prepared by dispersing and mixing 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper, and then defoaming the resulting mixture.

Next, a pressure-sensitive adhesive layer was formed by applying the pressure-sensitive adhesive layer-forming coating material onto the silicone-treated surface of the PET film serving as the release film by using the above die coater and drying the same so as to have a dry thickness of 25 μm. Furthermore, an exposed surface of the pressure-sensitive adhesive layer was attached to the surface of the infrared reflective film having the optical adjustment protective layer on which the light diffusing layer was formed. Thereby, a transparent heat-shielding/heat-insulating member having a transparent screen function was produced in which the pressure-sensitive adhesive layer and the light diffusing layer were formed on one surface of the PET film base substrate, and the infrared reflective layer and the optical adjustment protective layer composed of three layers of the medium refractive index layer, the high refractive index layer and the low refractive index layer were formed on the other surface.

<Attachment to Glass Substrate>

First, a 3 mm-thick float glass sheet (available from Nippon Sheet Glass Co. Ltd.) was prepared as a glass substrate. Next, the release film arranged on the pressure-sensitive adhesive layer side of the transparent heat-shielding/heat-insulating member was removed, and the pressure-sensitive adhesive layer side was attached to the float glass.

Example 21

<Formation of Light Diffusing Layer>

A light diffusing layer-forming coating material B was prepared by dispersing and mixing 5.6 parts [7.0 parts with respect to 100 parts of ionizing radiation curable resin oligomer] of amorphous silicone resin fine particles "TOSPEARL 240" (trade name, average particle size: 4.0 µm) available from Momentive Performance Materials Japan Inc., 2.4 parts of a photopolymerization initiator "Irgacure 819" (trade name) available from BASF Ltd., and 129 parts of methyl isobutyl ketone in 100 parts of an ionizing radiation curable resin oligomer solution "BPZA-66" (trade name, solid content: 80 mass %, weight-average molecular weight: 20,000) available from Kyoeisha Chemical Co. Ltd., by using a Disper, and then defoaming the resulting mixture.

Next, a light diffusing layer was formed by applying the light diffusing layer-forming coating material B onto one side of a polyethylene terephthalate (PET) film "A4300" (trade name, thickness: 50 µm) available from Toyobo Co., Ltd. having two adhesion promoted surfaces by using the above die coater and drying the same so as to have a dry thickness of 12 µm. Thereafter, the coating material was irradiated with ultraviolet rays in an amount of 300 mJ/cm$^2$ with a high-pressure mercury lamp so as to cure the coating material.

<Formation of Infrared Reflective Layer>

Next, an infrared reflective layer having a three-layer structure composed of a 29 nm thick indium tin oxide (ITO) layer, a 12 nm thick silver (Ag) layer and a 29 nm thick indium tin oxide (ITO) layer was formed on the light diffusing layer formed on one side of the PET film, by a sputtering method.

<Formation of Optical Adjustment Protective Layer>

Next, in the same manner as in Example 1, an infrared reflective film was produced in which an optical adjustment protective layer including a medium refractive index layer, a high refractive index layer, and a low refractive index layer stacked in this order from the infrared reflective layer side was formed on the infrared reflective layer.

<Formation of Pressure-Sensitive Adhesive Layer>

Next, a PET film "NS-38+A" (trade name, thickness: 38 µm) available from Nakamoto Packs Co., Ltd. having a silicone-treated surface was prepared as a release film. Also, a pressure-sensitive adhesive layer-forming coating material was prepared by dispersing and mixing 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper, and then defoaming the resulting mixture.

Next, a pressure-sensitive adhesive layer was formed by applying the pressure-sensitive adhesive layer-forming coating material onto the silicone-treated surface of the PET film serving as the release film by using the above die coater and drying the same so as to have a dry thickness of 25 µm. Furthermore, an exposed surface of the pressure-sensitive adhesive layer was attached to the surface of the infrared reflective film having the optical adjustment protective layer on which the optical adjustment protective layer was not formed. Thereby, a transparent heat-shielding/heat-insulating member having a transparent screen function was produced in which the pressure-sensitive adhesive layer was formed on one surface of the PET film base substrate, and the light diffusing layer, the infrared reflective layer and the optical adjustment protective layer composed of three layers of the medium refractive index layer, the high refractive index layer and the low refractive index layer were formed on the other surface.

<Attachment to Glass Substrate>

First, a 3 mm-thick float glass sheet (available from Nippon Sheet Glass Co. Ltd.) was prepared as a glass substrate. Next, the release film arranged on the pressure-sensitive adhesive layer side of the transparent heat-shielding/heat-insulating member having a transparent screen function was removed, and the pressure-sensitive adhesive layer side was attached to the float glass.

Example 22

A transparent heat-shielding/heat-insulating member having a transparent screen function of Example 22 was produced in the same manner as in Example 8 except that a medium refractive index layer was formed in the manner described below. Then, the produced member was attached to a glass substrate (float glass).

(Formation of Medium Refractive Index Layer)

A medium refractive index layer-forming coating material B was prepared by mixing, in a Disper, 10 parts of acrylic hardcoat agent "Z-773" (trade name, solid content: 34 mass %) available from Aica Kogyo Co., Ltd. and 100 parts of butyl acetate as a diluting solvent. Next, the medium refractive index layer-forming coating material B was applied onto an infrared reflective layer by using the aforementioned micro-gravure coater and dried so as to have a dry thickness of 200 nm, and thereafter irradiated with ultraviolet rays in an amount of 300 mJ/cm$^2$ with a high-pressure mercury lamp so as to cure the coating material, and thereby a medium refractive index layer having a thickness of 200 nm was formed. The refractive index of the medium refractive index layer produced was 1.52.

Comparative Example 1

<Formation of Protective Layer>

First, a polyethylene terephthalate (PET) film "A4300" (trade name, thickness: 50 µm) available from Toyobo Co., Ltd. having two adhesion promoted surfaces was prepared as a transparent base substrate. Next, a medium refractive index layer-forming coating material C was prepared by mixing, in a Disper, 100 parts of an ionizing radiation curable resin oligomer solution "BPZA-66" (trade name, solid content: 80 mass %, weight-average molecular weight: 20,000) available from Kyoeisha Chemical Co. Ltd., 2.4 parts of a photopolymerization initiator "Irgacure 819" (trade name) available from BASF Ltd., and 300 parts of methyl isobutyl ketone. Next, a medium refractive index protective layer (hardcoat layer (HC layer)) was formed by applying the medium refractive index layer-forming coating material C onto a surface of the PET film by using the above micro-gravure coater and drying the same so as to have a dry thickness of 1550 nm, and thereafter performing irradiation with ultraviolet rays in an amount of 300 mJ/cm$^2$ with a high-pressure mercury lamp so as to cure the coating material. The refractive index of the medium refractive index protective layer (HC layer) produced was 1.50.

<Formation of Light Diffusing Pressure-Sensitive Adhesive Layer>

First, a PET film "NS-38+A" (trade name, thickness: 38 μm) available from Nakamoto Packs Co., Ltd. having a silicone-treated surface was prepared as a release film. Also, a light diffusing pressure-sensitive adhesive layer-forming coating material was prepared by dispersing and mixing 0.88 parts [3.5 parts with respect to 100 parts of pressure-sensitive adhesive resin] of amorphous silicone resin fine particles "TOSPEARL 240" (trade name, average particle size: 4.0 μm, refractive index: 1.42) available from Momentive Performance Materials Japan Inc., 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper, and then defoaming the resulting mixture.

Next, the light diffusing pressure-sensitive adhesive layer-forming coating material was applied onto the silicone-treated surface of the above PET film serving as the release film using a die coater and dried so as to have a dry thickness of 25 μm, and thereby a light diffusing pressure-sensitive adhesive layer was formed. Furthermore, an exposed surface of the light diffusing pressure-sensitive adhesive layer was attached to the surface of the PET film having the medium refractive index protective layer (HC layer) on which the medium refractive index protective layer (HC layer) was not formed. Thereby, a transparent screen film was produced in which the light diffusing pressure-sensitive adhesive layer was formed on one surface of the PET film base substrate, and the medium refractive index protective layer (HC layer) was formed on the other surface.

<Attachment to Glass Substrate>

First, a 3 mm-thick float glass sheet (available from Nippon Sheet Glass Co. Ltd.) was prepared as a glass substrate. Next, the release film arranged on the light diffusing pressure-sensitive adhesive layer of the transparent screen film was removed, and the light diffusing pressure-sensitive adhesive layer side was attached to the float glass.

Comparative Example 2

<Formation of Infrared Reflective Layer>

First, in the same manner as in Example 1, an infrared reflective layer having a three-layer structure composed of a 29 nm thick indium tin oxide (ITO) layer, a 12 nm thick silver (Ag) layer and a 29 nm thick indium tin oxide (ITO) layer was formed on one side of a PET film by a sputtering method.

<Formation of Protective Layer>

A medium refractive index layer-forming coating material D was prepared by mixing, in a Disper, 100 parts of an ionizing radiation curable resin oligomer solution "BPZA-66" (trade name, solid content: 80 mass %, weight-average molecular weight: 20,000) available from Kyoeisha Chemical Co. Ltd., 2.4 parts of phosphoric acid group-containing methacrylic acid derivative "Light Ester P-2M" (trade name) available from Kyoeisha Chemical Co. Ltd., 4.0 parts of a photopolymerization initiator "Irgacure 819" (trade name) available from BASF Ltd., and 300 parts of methyl isobutyl ketone. Next, a medium refractive index protective layer (HC layer) was formed on the infrared reflective layer of an infrared reflective film by applying the medium refractive index layer-forming coating material D onto the infrared reflective layer by using the above micro-gravure coater and drying the same so as to have a dry thickness of 1550 nm, and thereafter performing irradiation with ultraviolet rays in an amount of 300 mJ/cm$^2$ with a high-pressure mercury lamp so as to cure the coating material. The refractive index of the medium refractive index protective layer (HC layer) produced was 1.50.

<Formation of Pressure-Sensitive Adhesive Layer>

First, a PET film "NS-38+A" (trade name, thickness: 38 μm) available from Nakamoto Packs Co., Ltd. having a silicone-treated surface was prepared as a release film. Also, a pressure-sensitive adhesive layer-forming coating material was prepared by dispersing and mixing 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper, and then defoaming the resulting mixture.

Next, a pressure-sensitive adhesive layer was formed by applying the pressure-sensitive adhesive layer-forming coating material onto the silicone-treated surface of the PET film serving as the release film by using the above die coater and drying the same so as to have a dry thickness of 25 μm. Furthermore, an exposed surface of the pressure-sensitive adhesive layer was attached to the surface of the infrared reflective film having the medium refractive index protective layer (HC layer) on which the medium refractive index protective layer (HC layer) was not formed. Thereby, a transparent heat-shielding/heat-insulating member was produced in which the pressure-sensitive adhesive layer was formed on one surface of the PET film base substrate, and the infrared reflective layer and the medium refractive index protective layer (HC layer) were formed on the other surface.

<Attachment to Glass Substrate>

First, a 3 mm-thick float glass sheet (available from Nippon Sheet Glass Co. Ltd.) was prepared as a glass substrate. Next, the release film arranged on the pressure-sensitive adhesive layer side of the transparent heat-shielding/heat-insulating member was removed, and the pressure-sensitive adhesive layer side was attached to the float glass.

Comparative Example 3

A transparent heat-shielding/heat-insulating member of Comparative Example 3 was produced in the same manner as in Comparative Example 2 except that the dry thickness of a protective layer was set to 680 nm. Then, the produced member was attached to a glass substrate (float glass).

Comparative Example 4

A transparent heat-shielding/heat-insulating member of Comparative Example 4 was produced in the same manner as in Comparative Example 2 except that the dry thickness of a protective layer was set to 550 nm. Then, the produced member was attached to a glass substrate (float glass).

Comparative Example 5

A transparent heat-shielding/heat-insulating member of Comparative Example 5 in which a pressure-sensitive adhesive layer was formed on one surface of a PET film base substrate, and an infrared reflective layer and a low refractive index protective layer were formed on the other surface was produced in the same manner as in Comparative Example 2 except that the protective layer was formed in the manner described below. Then, the produced member was attached to a glass substrate (float glass).

<Formation of Protective Layer>

A low refractive index protective layer was formed by using a hollow silica-containing low refractive index layer-forming coating material "ELCOM P-5062" (trade name, solid content: 3 mass %) available from JGC Catalysts and Chemicals Ltd. as a low refractive index layer-forming coating material A, applying the coating material A onto the infrared reflective layer using the above micro-gravure coater and drying the same so as to have a dry thickness of 100 nm, and thereafter performing irradiation with ultraviolet rays in an amount of 300 mJ/cm$^2$ with a high-pressure mercury lamp so as to cure the coating material. The refractive index of the low refractive index protective layer produced was 1.38.

Comparative Example 6

A transparent heat-shielding/heat-insulating member having a transparent screen function of Comparative Example 6 in which a light diffusing pressure-sensitive adhesive layer was formed on one surface of a PET film base substrate, and an infrared reflective layer and a medium refractive index protective layer (HC layer) were formed on the other surface was produced in the same manner as in Comparative Example 4, except that a light diffusing pressure-sensitive adhesive layer below was formed instead of the pressure-sensitive adhesive layer. Then, the produced member was attached to a glass substrate (float glass).

<Formation of Light Diffusing Pressure-Sensitive Adhesive Layer>

First, a PET film "NS-38+A" (trade name, thickness: 38 μm) available from Nakamoto Packs Co., Ltd. having a silicone-treated surface was prepared as a release film. Also, a light diffusing pressure-sensitive adhesive layer-forming coating material was prepared by dispersing and mixing 0.88 parts [3.5 parts with respect to 100 parts of pressure-sensitive adhesive resin] of amorphous silicone resin fine particles "TOSPEARL 240" (trade name, average particle size: 4.0 μm, refractive index: 1.42) available from Momentive Performance Materials Japan Inc., 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper, and then defoaming the resulting mixture.

Next, the light diffusing pressure-sensitive adhesive layer-forming coating material was applied onto the silicone-treated surface of the above PET film serving as the release film using a die coater and dried so as to have a dry thickness of 25 μm, and thereby a light diffusing pressure-sensitive adhesive layer was formed. Furthermore, an exposed surface of the light diffusing pressure-sensitive adhesive layer was attached to the surface of an infrared reflective film having the medium refractive index protective layer (HC layer) on which the medium refractive index protective layer (HC layer) was not formed. Thereby, a transparent heat-shielding/heat-insulating member having a transparent screen function was produced in which the light diffusing pressure-sensitive adhesive layer was formed on one surface of the PET film base substrate, and the infrared reflective layer and the medium refractive index protective layer (HC layer) were formed on the other surface.

Comparative Example 7

A transparent heat-shielding/heat-insulating member having a transparent screen function of Comparative Example 7 in which a light diffusing pressure-sensitive adhesive layer was formed on one surface of a PET film base substrate, and an infrared reflective layer and a low refractive index protective layer were formed on the other surface was produced in the same manner as in Comparative Example 5, except that the light diffusing pressure-sensitive adhesive layer below was formed instead of the pressure-sensitive adhesive layer. Then, the produced member was attached to a glass substrate (float glass).

<Formation of Light Diffusing Pressure-Sensitive Adhesive Layer>

First, a PET film "NS-38+A" (trade name, thickness: 38 μm) available from Nakamoto Packs Co., Ltd. having a silicone-treated surface was prepared as a release film. Also, a light diffusing pressure-sensitive adhesive layer-forming coating material was prepared by dispersing and mixing 0.88 parts [3.5 parts with respect to 100 parts of pressure-sensitive adhesive resin] of amorphous silicone resin fine particles "TOSPEARL 240" (trade name, average particle size: 4.0 μm, refractive index: 1.42) available from Momentive Performance Materials Japan Inc., 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper, and then defoaming the resulting mixture.

Next, the light diffusing pressure-sensitive adhesive layer-forming coating material was applied onto the silicone-treated surface of the above PET film serving as the release film using a die coater and dried so as to have a dry thickness of 25 μm, and thereby a light diffusing pressure-sensitive adhesive layer was formed. Furthermore, an exposed surface of the light diffusing pressure-sensitive adhesive layer was attached to the surface of an infrared reflective film having the low refractive index protective layer on which the low refractive index protective layer was not formed. Thereby, a transparent heat-shielding/heat-insulating member having a transparent screen function was produced in which the light diffusing pressure-sensitive adhesive layer was formed on one surface of the PET film base substrate, and the infrared reflective layer and the low refractive index protective layer were formed on the other surface.

Comparative Example 8

<Formation of Infrared Reflective Layer>

First, in the same manner as in Example 1, an infrared reflective layer having a three-layer structure composed of a 29 nm thick indium tin oxide (ITO) layer, a 12 nm thick silver (Ag) layer and a 29 nm thick indium tin oxide (ITO) layer was formed on one side of a PET film by a sputtering method.

<Formation of Light Diffusing Layer>

A light diffusing layer-forming coating material C was prepared by dispersing and mixing 5.6 parts [7.0 parts with respect to 100 parts of a mixture of ionizing radiation curable resin oligomer and phosphoric acid group-containing methacrylic acid derivative] of amorphous silicone resin fine particles "TOSPEARL 240" (trade name, average particle size: 4.0 μm) available from Momentive Performance Materials Japan Inc., 2.4 parts of a photopolymerization initiator "Irgacure 819" (trade name) available from BASF Ltd., and 130 parts of methyl isobutyl ketone in a mixture of 95 parts of an ionizing radiation curable resin oligomer solution "BPZA-66" (trade name, solid content: 80 mass %, weight-average molecular weight: 20,000) available from Kyoeisha Chemical Co. Ltd., and 4.0 parts of phosphoric acid group-containing methacrylic acid derivative "Light Ester P-2M" (trade name) available from Kyoeisha Chemical Co. Ltd., by using a Disper, and then defoaming the resulting mixture.

Next, a light diffusing layer was formed by applying the light diffusing layer-forming coating material C onto the infrared reflective layer by using the above die coater and drying the same so as to have a dry thickness of 12 μm. Thereafter, the the coating material was irradiated with ultraviolet rays in an amount of 300 mJ/cm$^2$ with a high-pressure mercury lamp so as to cure the coating material.

<Formation of Optical Adjustment Protective Layer>

In the same manner as in Example 14, an infrared reflective film was produced in which an optical adjustment protective layer including a high refractive index layer and a low refractive index layer stacked in this order from the light diffusing layer side was formed on the light diffusing layer.

<Formation of Pressure-Sensitive Adhesive Layer>

Next, a PET film "NS-38+A" (trade name, thickness: 38 μm) available from Nakamoto Packs Co., Ltd. having a silicone-treated surface was prepared as a release film. Also, a pressure-sensitive adhesive layerforming coating material was prepared by dispersing and mixing 1.25 parts of an ultraviolet absorbing agent (benzophenone-based ultraviolet absorbing agent) available from Wako Pure Chemical Industries, Ltd. and 0.27 parts of a crosslinking agent "E-AX" (trade name, solid content: 5 mass %) available from Soken Chemical & Engineering Co., Ltd. in 100 parts of an acrylic pressure-sensitive adhesive solution "SK-Dyne 2094" (trade name, solid content: 25 mass %, refractive index: 1.49) available from Soken Chemical & Engineering Co., Ltd. by using a Disper, and then defoaming the resulting mixture.

Next, a pressure-sensitive adhesive layer was formed by applying the pressure-sensitive adhesive layer-forming coating material onto the silicone-treated surface of the PET film serving as the release film by using the above die coater and drying the same so as to have a dry thickness of 25 μm. Furthermore, an exposed surface of the pressure-sensitive adhesive layer was attached to the surface of the infrared reflective film having the optical adjustment protective layer on which the optical adjustment protective layer was not formed. Thereby, a transparent heat-shielding member having a transparent screen function was produced in which the pressure-sensitive adhesive layer was formed on one surface of the PET film base substrate, and the infrared reflective layer, the light diffusing layer and the optical adjustment protective layer composed of two layers of the high refractive index layer and the low refractive index layer were formed on the other surface.

<Attachment to Glass Substrate>

First, a 3 mm-thick float glass sheet (available from Nippon Sheet Glass Co. Ltd.) was prepared as a glass substrate. Next, the release film arranged on the pressure-sensitive adhesive layer side of the transparent heat-shielding member having a transparent screen function was removed, and the pressure-sensitive adhesive layer side was attached to the float glass.

Comparative Example 9

A transparent heat-shielding/heat-insulating member having a transparent screen function of Comparative Example 9 was produced in the same manner as in Example 1 except that an infrared reflective layer having a three-layer structure composed of a 35 nm thick indium tin oxide (ITO) layer, a 4 nm thick silver (Ag) layer and a 35 nm thick indium tin oxide (ITO) layer was used. Then, the produced member was attached to a glass substrate (float glass).

Comparative Example 10

A transparent heat-shielding/heat-insulating member having a transparent screen function of Comparative Example 10 was produced in the same manner as in Example 1 except that the thickness of a silver (Ag) layer in an infrared reflective layer was set to 21 nm. Then, the produced member was attached to a glass substrate (float glass).

Comparative Example 11

A transparent heat-shielding/heat-insulating member having a transparent screen function of Comparative Example 11 was produced in the same manner as in Example 1 except that the addition amount of amorphous silicone resin fine particles "TOSPEARL 240" (trade name, average particle size: 4.0 μm) in a light diffusing pressure-sensitive adhesive layer was 0.12 parts [0.5 parts with respect to 100 parts of pressure-sensitive adhesive resin]. Then, the produced member was attached to a glass substrate (float glass).

Comparative Example 12

A transparent heat-shielding/heat-insulating member having a transparent screen function of Comparative Example 12 was produced in the same manner as in Example 1 except that the addition amount of amorphous silicone resin fine particles "TOSPEARL 240" (trade name, average particle size: 4.0 μm) in a light diffusing pressure-sensitive adhesive layer was 1.38 parts [5.5 parts with respect to 100 parts of pressure-sensitive adhesive resin]. Then, the produced member was attached to a glass substrate (float glass).

Comparative Example 13

A transparent heat-shielding/heat-insulating member having a transparent screen function of Comparative Example 13 was produced in the same manner as in Example 3 except that the dry thickness of a high refractive index layer was set to 820 nm. Then, the produced member was attached to a glass substrate (float glass).

Comparative Example 14

A transparent heat-shielding/heat-insulating member having a transparent screen function of Comparative Example 14 in which a light diffusing pressure-sensitive adhesive layer was formed on one surface of a PET film base substrate, and an infrared reflective layer and an optical adjustment protective layer composed of two layers of a high refractive index layer and a low refractive index layer were formed on the other surface was produced in the same manner as in Example 13, except that a medium refractive index layer was not formed, and the dry thicknesses of the high refractive index layer and the low refractive index layer were set to 115 nm and 90 nm, respectively. Then, the produced member was attached to a glass substrate (float glass).

[Evaluation of Transparent Member]

Each of the transparent members produced in Examples 1 to 22 and Comparative Examples 1 to 14 described above was attached to a 5 cm square glass substrate (float glass) to prepare a measurement sample. The visible light transmittance, the visible light reflectance, the haze value, the normal emissivity, the shading coefficient, and the scratch resistance of the protective layer were evaluated as follows by using the measurement sample. Also, each transparent member was attached to a 30 cm×23 cm glass substrate to prepare a measurement sample, and the appearance, the viewability of a reflected image and a transmitted image projected by a projector were evaluated as follows by using the measurement sample.

<Maximum Variation Difference in Reflectance>

Figure 11:
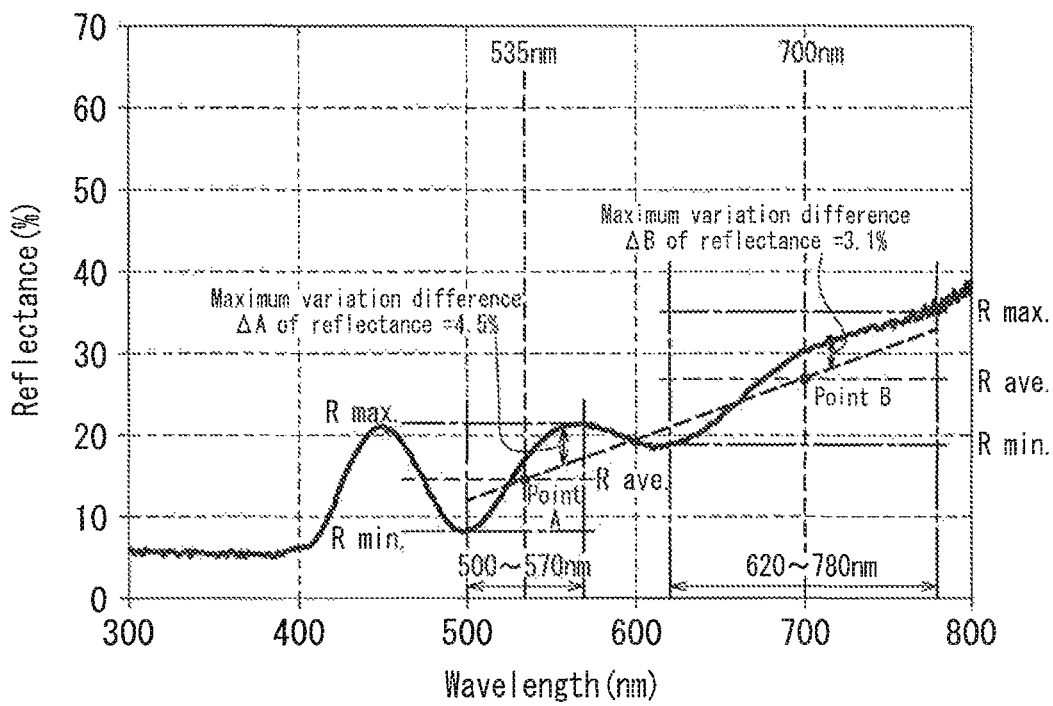
FIG. 11 is a reflectance spectrum in the visible region observed in the light entrance measurement from the glass surface side in Example 1 of the present invention.
Figure 12:
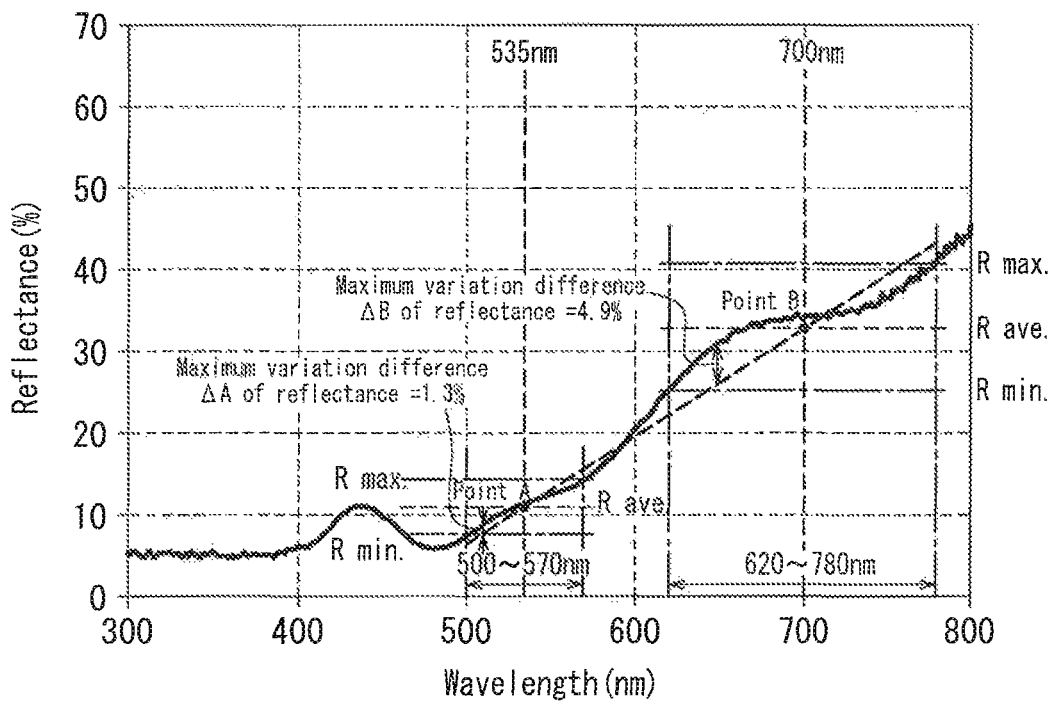
FIG. 12 is a reflectance spectrum in the visible region observed in the light entrance measurement from the glass surface side in Example 2 of the present invention.
Figure 13:
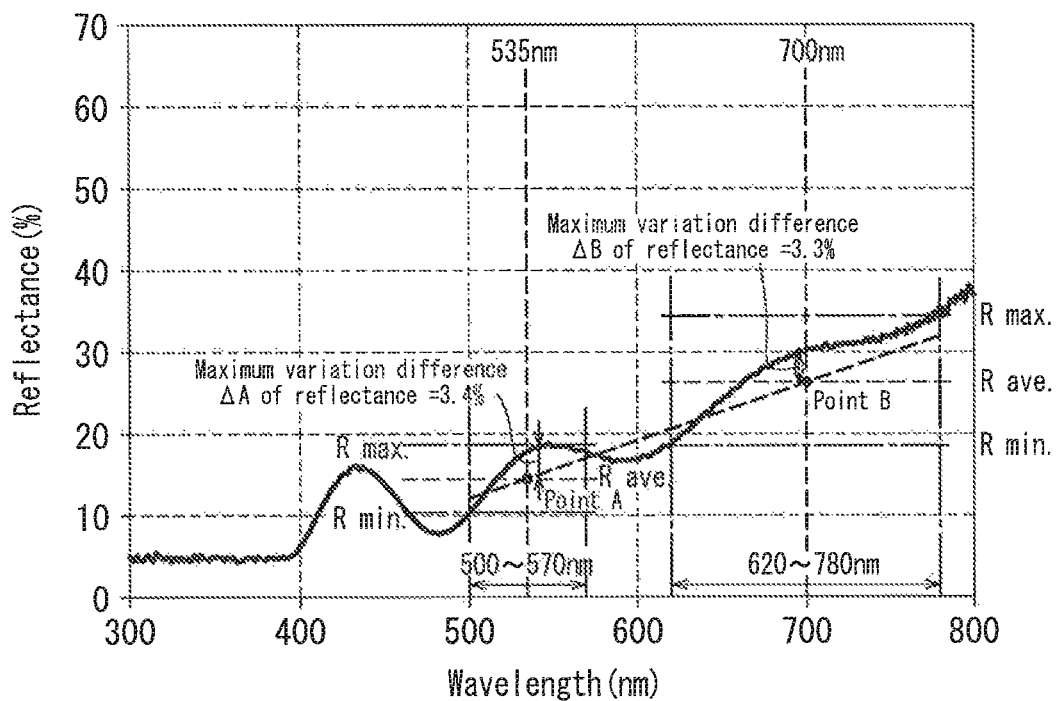
FIG. 13 is a reflectance spectrum in the visible region observed in the light entrance measurement from the glass surface side in Example 9 of the present invention.
Figure 14:
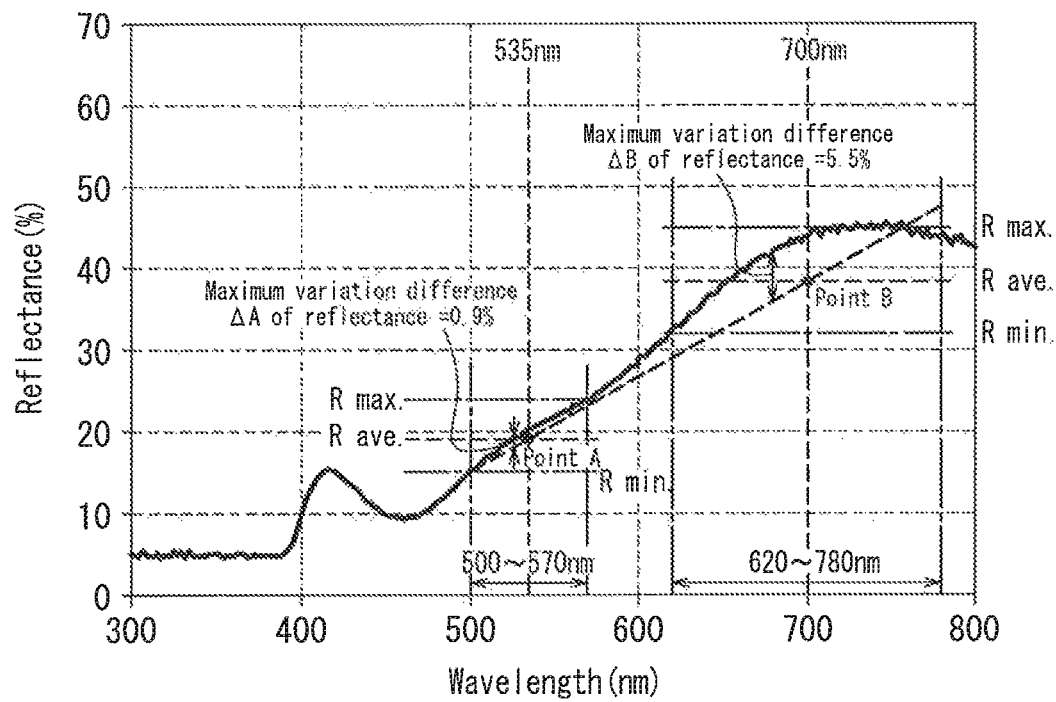
FIG. 14 is a reflectance spectrum in the visible region observed in the light entrance measurement from the glass surface side in Example 13 of the present invention.
Figure 15:
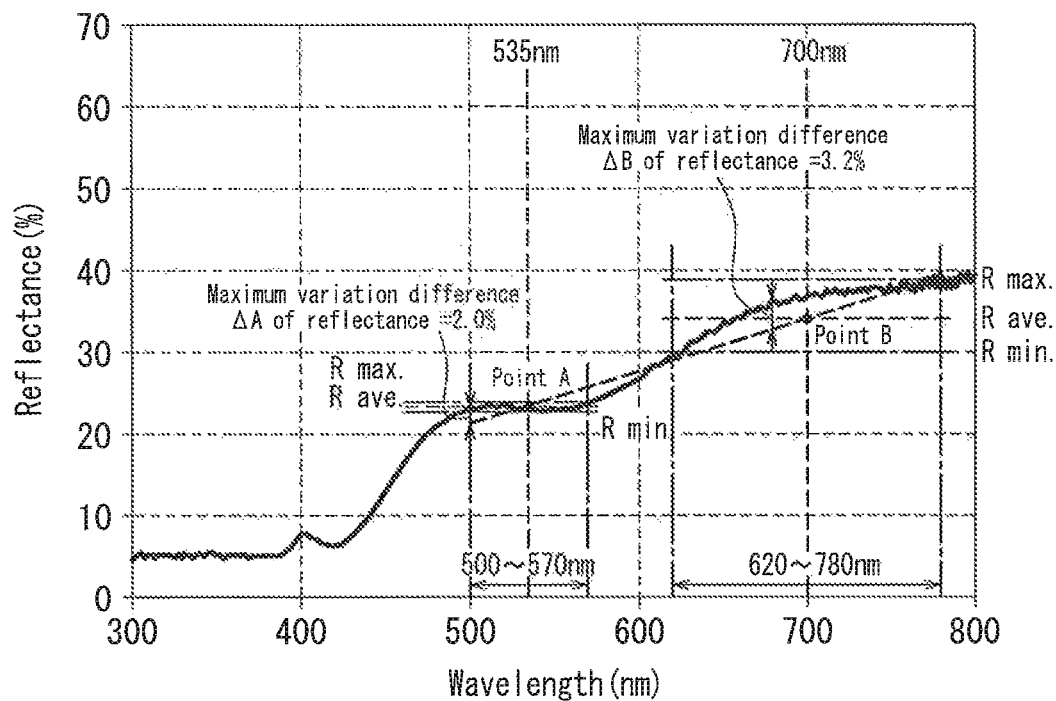
FIG. 15 is a reflectance spectrum in the visible region observed in the light entrance measurement from the glass surface side in Example 14 of the present invention.
Figure 16:
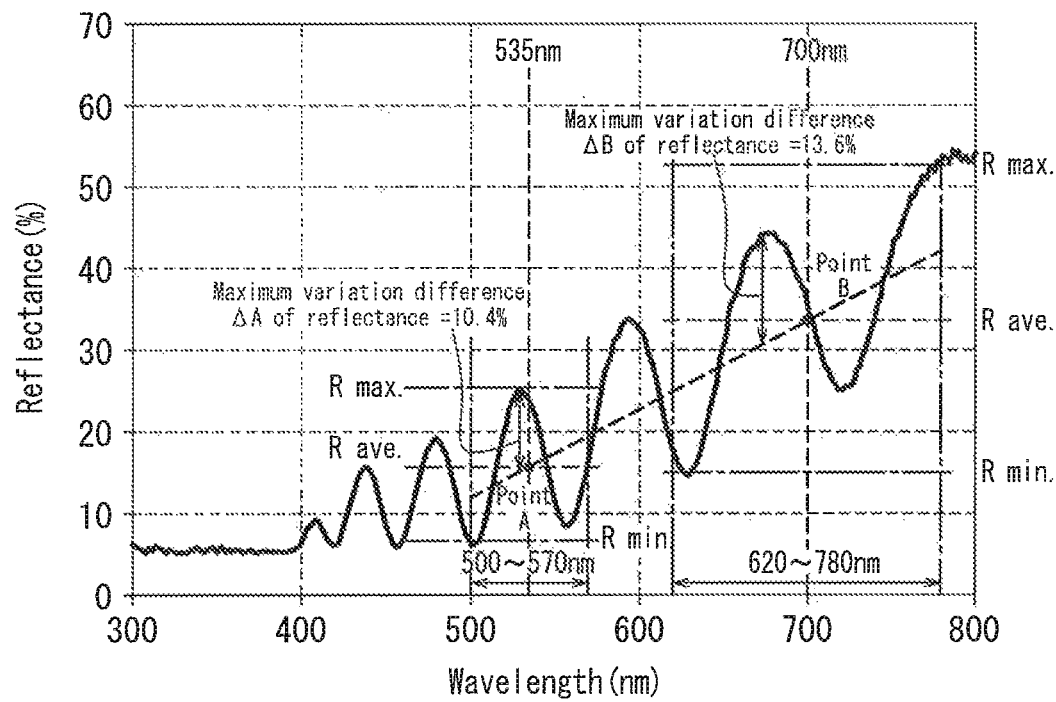
FIG. 16 is a reflectance spectrum in the visible region observed in the light entrance measurement from the glass surface side in Comparative Example 2 of the present invention.
Figure 17:
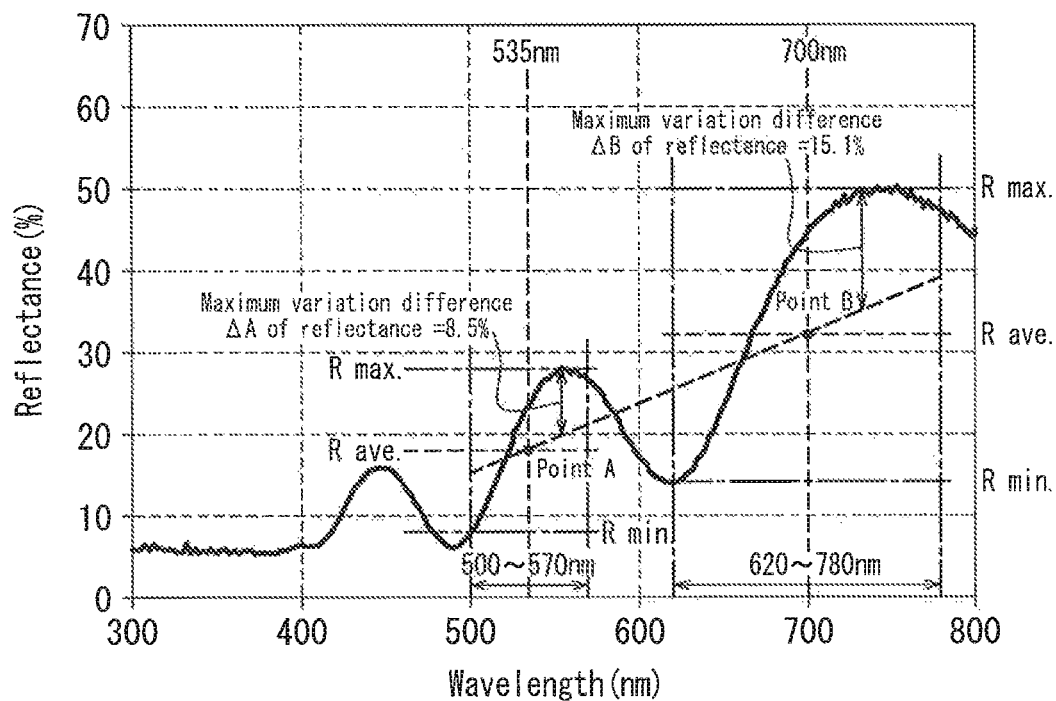
FIG. 17 is a reflectance spectrum in the visible region observed in the light entrance measurement from the glass surface side in Comparative Example 3 of the present invention.
Figure 18:
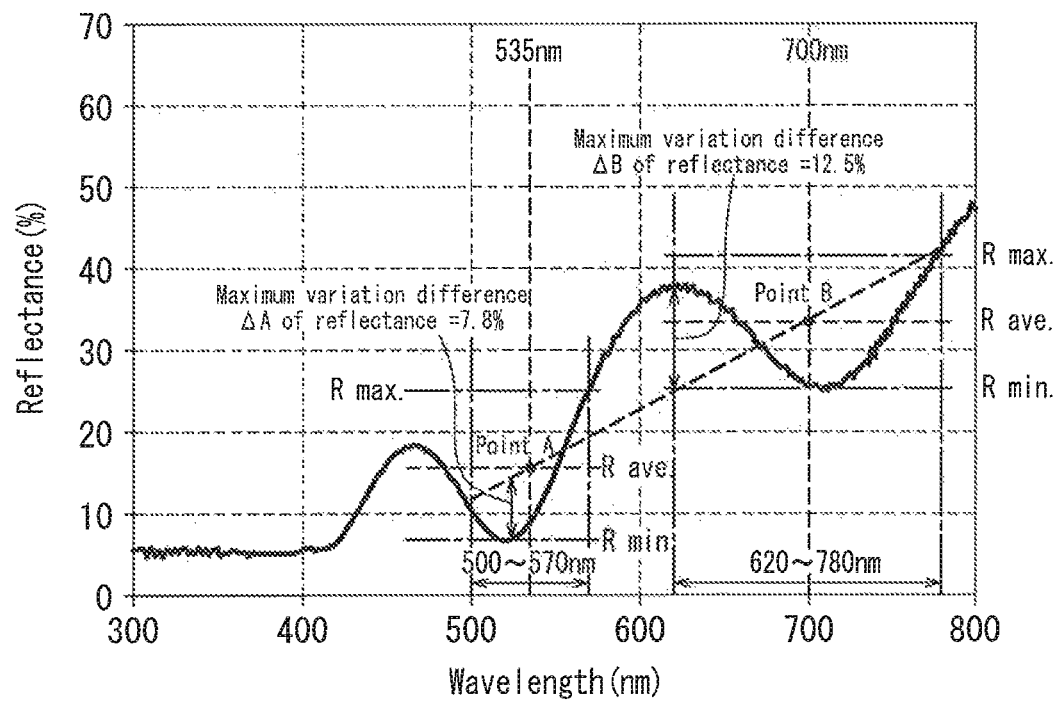
FIG. 18 is a reflectance spectrum in the visible region observed in the light entrance measurement from the glass surface side in Comparative Example 6 of the present invention.
Figure 19:
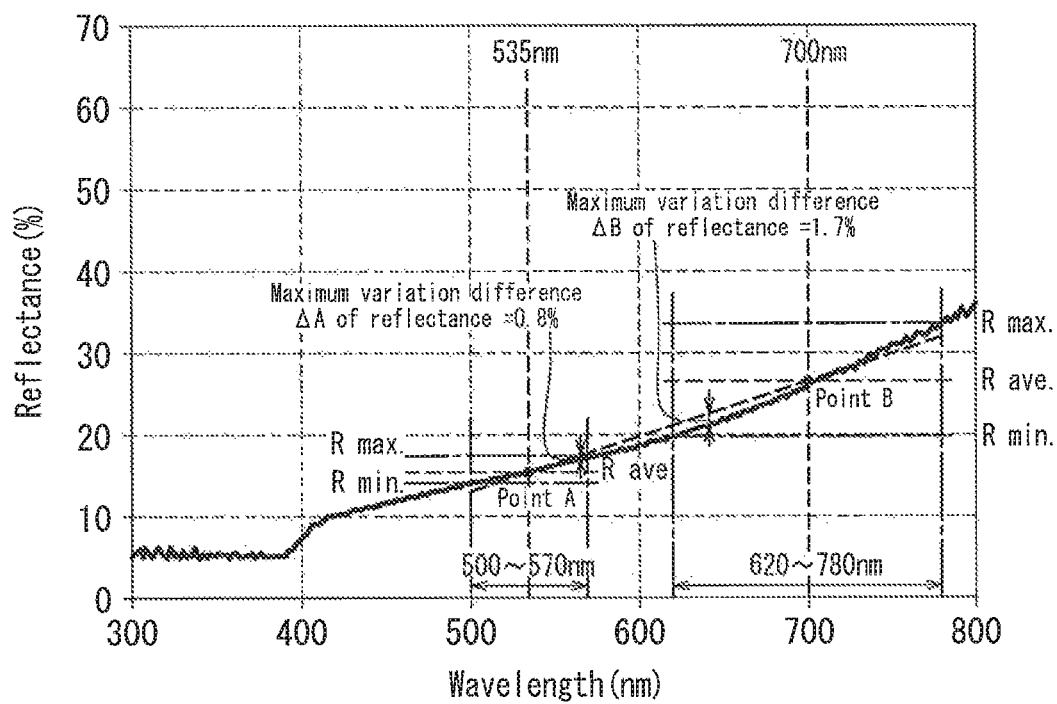
FIG. 19 is a reflectance spectrum in the visible region observed in the light entrance measurement from the glass surface side in Comparative Example 7 of the present invention.

First, a spectral reflectance was measured based on JIS R3106-1998 in a range of wavelengths from 300 to 800 nm by using a UV-Vis-NIR spectrophotometer "Ubest V-570 type" (trade name) available from JASCO Corporation, with the glass substrate side being set as the light-entering side. FIG. 11 shows a reflectance spectrum of Example 1, FIG. 12 shows a reflectance spectrum of Example 2, FIG. 13 shows a reflectance spectrum of Example 9, FIG. 14 shows a reflectance spectrum of Example 13, FIG. 15 shows a reflectance spectrum of Example 14, FIG. 16 shows a reflectance spectrum of Comparative Example 2, FIG. 17 shows a reflectance spectrum of Comparative Example 3, FIG. 18 shows a reflectance spectrum of Comparative Example 6, and FIG. 19 shows a reflectance spectrum of Comparative Example 7.

Next, the reference straight line AB, the maximum variation difference ΔA and the maximum variation difference ΔB were obtained using the above reflectance spectra by the method described above.

<Visible Light Transmittance>

Visible light transmittance was obtained by measuring a spectral transmittance in a range of wavelengths from 380 to 780 nm by using a UV-Vis-NIR spectrophotometer "Ubest V-570 type" (trade name) available from JASCO Corporation, with the glass substrate side being set as the light-entering side, and performing calculation in accordance with JIS A5759-2008.

<Visible Light Reflectance>

Visible light reflectance was obtained by a measuring spectral reflectance in a range of wavelengths from 380 to 780 nm by using a UV-Vis-NIR spectrophotometer "Ubest V-570 type" (trade name) available from JASCO Corporation, with the transparent member side (protective layer side) being set as the light-entering side, and performing calculation in accordance with JIS R3106-1998.

<Haze Value>

Haze value was obtained by performing measurement by using a haze meter "NDH-2000" (trade name) available from Nippon Denshoku Industries Co., Ltd. with the transparent member side (protective layer side) being set as the light-entering side, and then performing calculation in accordance with JIS K7136-2000.

<Normal Emissivity>

Normal emissivity was obtained by measuring a regular spectral reflectance in a range of wavelengths from 5.5 to 25.2 μm by using an infrared spectrophotometer "IR Prestige 21" (trade name) available from Shimadzu Corporation to which an attachment for regular reflectance measurement had been attached, with the transparent member side (protective layer side) being set as the light-entering side and performing calculation in accordance with JIS R3106-2008. In the calculation of the normal emissivity, a wavelength value of 25.2 μm was used as the regular spectral reflectance in a wavelength range of 25.2 to 50.0 μm.

<Shading Coefficient>

Shading coefficient was obtained by measuring a spectral transmittance and a spectral reflectance in a range of wavelengths from 300 to 2500 nm by using a UV-Vis-NIR spectrophotometer "Ubest V-570 type" (trade name) available from JASCO Corporation, with the glass substrate side being set as the light-entering side, and performing calculation by using the values of solar transmittance and solar reflectance calculated in accordance with JIS A5759-2008 and the normal emissivity obtained above.

<Scratch Resistance of Protective Layer>

For the scratch resistance of the protective layer of each transparent member, a white flannel cloth was placed on the protective layer, and then moved back and forth 1000 times under a load of 1000 g/cm$^2$. Thereafter, the surface condition of the protective layer was visually observed and evaluated based on the following three criteria:

A: no scratches were found;

B: a few (5 or less) scratches were found; and

C: a large number (6 or more) of scratches were found.

<Adhesion of Protective Layer>

The adhesion of the protective layer of each transparent member was evaluated by performing a cross cut tape separation test in accordance with JIS D0202-1988. Specifically, adhesion was evaluated by applying a cellophane tape "CT24" (trade name) available from Nichiban Co., Ltd onto the protective layer so as to adhere to the protective layer by using the pad of the finger and thereafter peeling off the tape therefrom. Evaluation was made by the number of grid squares remaining without being taken away among 100 grid squares, and a rating of 100/100 was given if the protective layer was not taken away at all, and a rating of 0/100 was given if the protective layer was completely taken away.

<Background Viewability>

Background viewability was obtained by, using a measurement sample obtained by attaching each transparent member to a 30 cm×23 cm glass substrate, evaluating, through visual observation, the ease of view of the background through the sample based on the following four criteria:

AA: very good;

A: good;

B: slightly poor; and

C: poor.

<Viewability of Image Projected by Projector>

For the viewability of an image projected by a projector, an image was actually projected, by using a portable laser pico projector "SHOWWX-HDMI (registered trademark) Laser Pocket Projector" (trade name) available from Micro Vision Co., Ltd., from the transparent member side (protective layer side) of a measurement sample attached to a 30 cm×23 cm glass substrate. With respect to the reflected image from the projector side, luminance (brightness), the presence or absence of blur (image clarity) and the presence or absence of glittering were visually evaluated, and with respect to the transmitted image from the opposite side of the projector, luminance (brightness) and the presence or absence of blur (image clarity) were visually evaluated.

Luminance (brightness) was evaluated based on the following four criteria:

AA: the image had a very high luminance, and viewability was very good;

A: the image had a high luminance, and viewability was good;

B: the image had a slightly low luminance, and viewability was slightly poor; and C: the image was hardly viewed.

The presence or absence of blur (image clarity) was evaluated based on the following four criteria:

AA: very good image clarity without blur in the image;

A: good image clarity with a slight amount of blur in the image;

B: slightly poor image clarity with a small amount of blur in the image; and

C: poor image clarity with a large amount of blur in the image.

The presence or absence of glittering was evaluated based on the following two criteria:

A: no glittering was observed; and

C: glittering was observed

<Appearance (Iridescent Pattern)>

For the appearance (iridescent pattern) of each transparent member, the surface on the transparent member side (protective layer side) was visually observed under a 3-wavelength fluorescent lamp and evaluated based on the following three criteria:

A: an iridescent pattern is hardly observed;

B: an iridescent pattern is slightly observed; and

C: an iridescent pattern is clearly observed.

<Appearance (Reflected Color Change)>

For the angle dependence of a reflected color (reflected color change) of each transparent member, the reflected color on the surface on the transparent member side (protective layer side) was visually observed under a 3-wavelength fluorescent lamp while changing the viewing angle, and evaluated based on the following three criteria:

A: the reflected color change is hardly recognized even when the viewing angle is changed in the observation;

B: the reflected color change is slightly recognized when the viewing angle is changed in the observation; and C: the reflected color change is clearly recognized when the viewing angle is changed in the observation.

Tables 1 to 6 below show the above results and the layer configuration of each transparent heat-shielding/heat-insulating member attached to a glass substrate.

TABLE 1

| Item | | Example 1 | Example 2 | Example 3 | Example 4 | Example 5 | Example 6 |
|---|---|---|---|---|---|---|---|
| Configuration of transparent member layer | | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate |
| Optical adjustment protective layer | Low refractive index layer | Low refractive index layer-forming coating material A Thickness: 105 nm Refractive index: 1.38 | Low refractive index layer-forming coating material A Thickness: 100 nm Refractive index: 1.38 | Low refractive index layer-forming coating material A Thickness: 110 nm Refractive index: 1.38 | Low refractive index layer-forming coating material A Thickness: 110 nm Refractive index: 1.38 | Low refractive index layer-forming coating material A Thickness: 100 nm Refractive index: 1.38 | Low refractive index layer-forming coating material A Thickness: 70 nm Refractive index: 1.38 |
| | High refractive index layer | High refractive index layer-forming coating material A Thickness: 335 nm Refractive index: 1.79 | High refractive index layer-forming coating material A Thickness: 440 nm Refractive index: 1.79 | High refractive index layer-forming coating material A Thickness: 540 nm Refractive index: 1.79 | High refractive index layer-forming coating material A Thickness: 720 nm Refractive index: 1.79 | High refractive index layer-forming coating material A Thickness: 100 nm Refractive index: 1.79 | High refractive index layer-forming coating material A Thickness: 100 nm Refractive index: 1.79 |

TABLE 1-continued

| Item | | Example 1 | Example 2 | Example 3 | Example 4 | Example 5 | Example 6 |
|---|---|---|---|---|---|---|---|
| | Medium refractive index layer | Medium refractive index layer-forming coating material A Thickness: 160 nm Refractive index: 1.51 | Medium refractive index layer-forming coating material A Thickness: 175 nm Refractive index: 1.51 | Medium refractive index layer-forming coating material A Thickness: 150 nm Refractive index: 1.51 | Medium refractive index layer-forming coating material A Thickness: 150 nm Refractive index: 1.51 | Medium refractive index layer-forming coating material A Thickness: 100 nm Refractive index: 1.51 | Medium refractive index layer-forming coating material A Thickness: 80 nm Refractive index: 1.51 |
| | Total thickness | 600 nm | 715 nm | 800 nm | 980 nm | 300 nm | 250 nm |
| | Configuration of infrared reflective layer | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm |
| Light diffusing agent | Type of resin particles | Silicone | Silicone | Silicone | Silicone | Silicone | Silicone |
| | Average particle size(μm) | 4.0 | 4.0 | 4.0 | 4.0 | 4.0 | 4.0 |
| | Amount Added (part) | 3.5 | 3.5 | 3.5 | 3.5 | 3.5 | 3.5 |
| Maximum variation difference ΔA in reflectance between reflectance spectrum and straight line AB (wavelength region: 500-570 nm) | | 4.5 | 1.3 | 3.0 | 2.9 | 2.5 | 1.1 |
| Maximum variation difference ΔB in reflectance between reflectance spectrum and straight line AB (wavelength region: 620-780 nm) | | 3.1 | 4.9 | 2.7 | 2.7 | 3.5 | 6.5 |
| | Visible light transmittance (%) | 74.7 | 75.6 | 74.8 | 73.2 | 78.0 | 77.5 |
| | Visible light reflectance (%) | 17.8 | 14.6 | 17.4 | 18.0 | 15.2 | 15.7 |
| | Haze value (%) | 23.5 | 23.5 | 23.8 | 23.9 | 23.2 | 23.1 |
| | Shading coefficient | 0.58 | 0.58 | 0.58 | 0.58 | 0.59 | 0.59 |
| | Normal emissivity | 0.15 | 0.17 | 0.18 | 0.21 | 0.12 | 0.11 |
| | Scratch resistance | A | A | A | A | A | B |
| | Adhesion | 100/100 | 100/100 | 100/100 | 100/100 | 100/100 | 100/100 |
| Appearance | Iridescent pattern | A | A | A | A | A | B |
| | Reflected color change | A | A | A | A | A | B |
| Reflected image | Luminance | AA | AA | AA | AA | AA | AA |
| | Blur | A | A | A | A | A | A |
| | Glittering | A | A | A | A | A | A |
| Transmitted image | Luminance | AA | AA | AA | AA | AA | AA |
| | Blur | AA | AA | AA | AA | AA | AA |
| | Background viewability | AA | AA | AA | AA | AA | AA |

TABLE 2

| Item | | Example 7 | Example 8 | Example 9 | Example 10 | Example 11 | Example 12 |
|---|---|---|---|---|---|---|---|
| Configuration of transparent member layer | | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate |
| Optical adjustment protective layer | Low refractive index layer | Low refractive index layer-forming coating material A Thickness: 150 nm | Low refractive index layer-forming coating material A Thickness: 105 nm | Low refractive index layer-forming coating material A Thickness: 100 nm | Low refractive index layer-forming coating material A Thickness: 105 nm | Low refractive index layer-forming coating material A Thickness: 105 nm | Low refractive index layer-forming coating material A Thickness: 105 nm |

TABLE 2-continued

| Item | | Example 7 | Example 8 | Example 9 | Example 10 | Example 11 | Example 12 |
|---|---|---|---|---|---|---|---|
| | High refractive index layer | Refractive index: 1.38 High refractive index layer-forming coating material A Thickness: 335 nm Refractive index: 1.79 | Refractive index: 1.38 High refractive index layer-forming coating material B Thickness: 550 nm Refractive index: 1.76 | Refractive index: 1.38 High refractive index layer-forming coating material B Thickness: 335 nm Refractive index: 1.76 | Refractive index: 1.38 High refractive index layer-forming coating material A Thickness: 335 nm Refractive index: 1.79 | Refractive index: 1.38 High refractive index layer-forming coating material A Thickness: 335 nm Refractive index: 1.79 | Refractive index: 1.38 High refractive index layer-forming coating material A Thickness: 335 nm Refractive index: 1.79 |
| | Medium refractive index layer | Medium refractive index layer-forming coating material A Thickness: 150 nm Refractive index: 1.51 | Medium refractive index layer-forming coating material A Thickness: 200 nm Refractive index: 1.51 | Medium refractive index layer-forming coating material A Thickness: 155 nm Refractive index: 1.51 | Medium refractive index layer-forming coating material A Thickness: 160 nm Refractive index: 1.51 | Medium refractive index layer-forming coating material A Thickness: 160 nm Refractive index: 1.51 | Medium refractive index layer-formin coating material A Thickness: 160 nm Refractive index: 1.51 |
| | Total thickness | 635 nm | 855 nm | 590 nm | 600 nm | 600 nm | 600 nm |
| | Configuration of infrared reflective layer | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 10 nm ITO layer: 29 nm | ITO layer: 29 nm Ag layer: 15 nm ITO layer: 29 nm | ALN layer: 30 nm Ag layer: 15 nm ALN layer: 30 nm |
| Light diffusing agent | Type of resin particles | Silicone | Silicone | Silicone | Silicone | Silicone | Silicone |
| | Average particle size(μm) | 4.0 | 4.0 | 4.0 | 4.0 | 4.0 | 4.0 |
| | Amount Added | 3.5 | 3.5 | 3.5 | 3.5 | 3.5 | 3.5 |
| Maximum variation difference ΔA in reflectance between reflectance spectrum and straight line AB (wavelength region: 500-570 nm) | | 5.5 | 3.1 | 3.4 | 3.0 | 2.3 | 3.0 |
| Maximum variation difference ΔB in reflectance between reflectance spectrum and straight line AB (wavelength region: 620-780 nm) | | 7.0 | 6.5 | 3.3 | 2.7 | 6.5 | 4.0 |
| Visible light transmittance (%) | | 73.9 | 73.5 | 74.7 | 79.7 | 71.2 | 79.8 |
| Visible light reflectance (%) | | 19.3 | 18.7 | 17.7 | 12.8 | 22.0 | 18.3 |
| Haze value (%) | | 23.9 | 23.5 | 23.4 | 23.7 | 23.5 | 23.4 |
| Shading coefficient | | 0.58 | 0.58 | 0.58 | 0.65 | 0.50 | 0.65 |
| Normal emissivity | | 0.15 | 0.20 | 0.17 | 0.18 | 0.13 | 0.13 |
| Scratch resistance | | A | A | A | A | A | A |
| Adhesion | | 100/100 | 100/100 | 100/100 | 100/100 | 100/100 | 100/100 |
| Appearance | Iridescent pattern | B | B | A | A | B | A |
| | Reflected color change | B | B | A | A | B | A |
| Reflected image | Luminance | AA | AA | AA | A | AA | AA |
| | Blur | A | A | A | A | A | A |
| | Glittering | A | A | A | A | A | A |
| Transmitted image | Luminance | AA | AA | AA | AA | A | AA |
| | Blur | AA | AA | AA | AA | AA | AA |
| Background viewability | | AA | AA | AA | AA | AA | AA |

TABLE 3

| Item | Example 13 | Example 14 | Example 15 | Example 16 | Example 17 | Example 18 |
|---|---|---|---|---|---|---|
| Configuration of transparent member layer | Low refractive index layer High refractive index layer — Infrared reflective layer PET base substrate | Low refractive index layer High refractive index layer — Infrared reflective layer PET base substrate | Low refractive index layer High refractive index layer — Infrared reflective layer PET base substrate | Low refractive index layer High refractive index layer — Infrared reflective layer PET base substrate | Low refractive index layer High refractive index layer — Infrared reflective layer PET base substrate | Low refractive index layer High refractive index layer Medium refractive index layer Infrared reflective layer PET base substrate |

TABLE 3-continued

| | Item | Example 13 | Example 14 | Example 15 | Example 16 | Example 17 | Example 18 |
|---|---|---|---|---|---|---|---|
| Optical adjustment protective layer | | Light diffusing pressure-sensitive adhesive layer Glass substrate | Light diffusing pressure-sensitive adhesive layer Glass substrate | Light diffusing pressure-sensitive adhesive layer Glass substrate | Light diffusing pressure-sensitive adhesive layer Glass substrate | Light diffusing pressure-sensitive adhesive layer Glass substrate | Light diffusing pressure-sensitive adhesive layer Glass substrate |
| | Low refractive index layer | Low refractive index layer-forming coating material A Thickness: 80 nm Refractive index: 1.38 | Low refractive index layer-forming coating material A Thickness: 105 nm Refractive index: 1.38 | Low refractive index layer-forming coating material A Thickness: 110 nm Refractive index: 1.38 | Low refractive index layer-forming coating material A Thickness: 120 nm Refractive index: 1.38 | Low refractive index layer-forming coating material A Thickness: 90 nm Refractive index: 1.38 | Low refractive index layer-forming coating material A Thickness: 105 nm Refractive index: 1.38 |
| | High refractive index layer | High refractive index layer-forming coating material C Thickness: 440 nm Refractive index: 1.88 | High refractive index layer-forming coating material C Thickness: 245 nm Refractive index: 1.88 | High refractive index layer-forming coating material A Thickness: 870 nm Refractive index: 1.79 | High refractive index layer-forming coating material A Thickness: 855 nm Refractive index: 1.79 | High refractive index layer-forming coating material A Thickness: 160 nm Refractive index: 1.79 | High refractive index layer-forming coating material A Thickness: 335 nm Refractive index: 1.79 |
| | Medium refractive index layer | — | — | — | — | — | Medium refractive index layer-forming coating material A Thickness: 160 nm Refractive index: 1.51 |
| | Total thickness | 520 nm | 350 nm | 980 nm | 975 nm | 250 nm | 600 nm |
| | Configuration of infrared reflective layer | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm |
| Light diffusing agent | Type of resin particles | Silicone | Silicone | Silicone | Silicone | Silicone | Silicone |
| | Average particle size (μm) | 4.0 | 4.0 | 4.0 | 4.0 | 4.0 | 4.0 |
| | Amount Added | 3.5 | 3.5 | 3.5 | 3.5 | 3.5 | 1.0 |
| Maximum variation difference ΔA in reflectance between reflectance spectrum and straight line AB (wavelength region: 500-570 nm) | | 0.9 | 2.0 | 3.7 | 3.9 | 1.0 | 4.6 |
| Maximum variation difference ΔB in reflectance between reflectance spectrum and straight line AB (wavelength region: 620-780 nm) | | 5.5 | 3.2 | 4.0 | 3.5 | 5.9 | 3.2 |
| Visible light transmittance (%) | | 71.0 | 69.9 | 69.7 | 71.4 | 74.5 | 74.8 |
| Visible light reflectance (%) | | 23.2 | 22.8 | 21.5 | 21.8 | 18.7 | 17.7 |
| Haze value (%) | | 23.5 | 23.7 | 23.9 | 23.8 | 23.5 | 8.3 |
| Shading coefficient | | 0.58 | 0.57 | 0.57 | 0.58 | 0.58 | 0.58 |
| Normal emissivity | | 0.15 | 0.13 | 0.21 | 0.21 | 0.11 | 0.15 |
| Scratch resistance | | A | A | A | A | B | A |
| Adhesion | | 83/100 | 85/100 | 79/100 | 80/100 | 90/100 | 100/100 |
| Appearance | Iridescent pattern | A | A | A | A | A | A |
| | Reflected color change | A | A | A | A | A | A |
| Reflected image | Luminance | AA | AA | AA | AA | AA | A |
| | Blur | A | A | A | A | A | A |
| | Glittering | A | A | A | A | A | A |
| Transmitted image | Luminance | AA | AA | AA | AA | AA | A |
| | Blur | AA | AA | AA | AA | AA | A |
| Background viewability | | AA | A | A | AA | AA | AA |

TABLE 4

| | Item | Example 19 | Example 20 | Example 21 | Example 22 | Comparative Example 1 | Comparative Example 2 |
|---|---|---|---|---|---|---|---|
| Configuration of transparent member layer | | Low refractive index layer High refractive index layer | Low refractive index layer High refractive index layer | Low refractive index layer High refractive index layer | Low refractive index layer High refractive index layer | — | — |

TABLE 4-continued

| Item | | Example 19 | Example 20 | Example 21 | Example 22 | Comparative Example 1 | Comparative Example 2 |
|---|---|---|---|---|---|---|---|
| | | Medium refractive index layer | Medium refractive index layer | Medium refractive index layer | Medium refractive index layer | Medium refractive index layer | Medium refractive index layer |
| | | Infrared reflective layer | Infrared reflective layer | Infrared reflective layer | Infrared reflective layer | — | Infrared reflective layer |
| | | — | PET base substrate | Light diffusing layer | — | — | — |
| | | PET base substrate | Light diffusing layer | PET base substrate | PET base substrate | PET base substrate | PET base substrate |
| | | Light diffusing pressure-sensitive adhesive layer | Pressure-sensitive adhesive layer | Pressure-sensitive adhesive layer | Light diffusing pressure-sensitive adhesive layer | Light diffusing pressure-sensitive adhesive layer | Pressure-sensitive adhesive layer |
| | | Glass substrate | Glass substrate | Glass substrate | Glass substrate | Glass substrate | Glass substrate |
| Optical adjustment protective layer | Low refractive index layer | Low refractive index layer-forming coating material A Thickness: 105 nm Refractive index: 1.38 | Low refractive index layer-forming coating material A Thickness: 105 nm Refractive index: 1.38 | Low refractive index layer-forming coating material A Thickness: 105 nm Refractive index: 1.38 | Low refractive index layer-forming coating material A Thickness: 105 nm Refractive index: 1.38 | — | — |
| | High refractive index layer | High refractive index layer-forming coating material A Thickness: 335 nm Refractive index: 1.79 | High refractive index layer-forming coating material A Thickness: 335 nm Refractive index: 1.79 | High refractive index layer-forming coating material A Thickness: 335 nm Refractive index: 1.79 | High refractive index layer-forming coating material B Thickness: 550 nm Refractive index: 1.76 | — | — |
| | Medium refractive index layer | Medium refractive index layer-forming coating material A Thickness: 160 Refractive index: 1.51 | Medium refractive index layer-forming coating material A Thickness: 160 Refractive index: 1.51 | Medium refractive index layer-forming coating material A Thickness: 160 Refractive index: 1.51 | Medium refractive index layer-forming coating material B Thickness: 200 Refractive index: 1.52 | Medium refractive index layer-forming coating material C Thickness: 1550 Refractive index: 1.50 | Medium refractive index layer-forming coating material D Thickness: 1550 nm Refractive index: 1.50 |
| | Total thickness | 600 nm | 600 nm | 600 nm | 855 nm | 1550 nm | 1550 nm |
| | Configuration of infrared reflective layer | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | — | ITO layer: 29 nm Ag layer: 12 nm ITO layer: 29 nm |
| Light diffusing agent | Type of resin particles | Silicone | Silicone | Silicone | Silicone | Silicone | — |
| | Average particle size(μm) | 4.0 | 4.0 | 4.0 | 4.0 | 4.0 | — |
| | Amount Added | 4.5 | 3.5 | 7.0 | 3.5 | 3.5 | — |
| Maximum variation difference ΔA in reflectance between reflectance spectrum and straight line AB (wavelength region: 500-570 nm) | | 4.3 | 4.4 | 4.6 | 3.2 | 0.5 | 10.4 |
| Maximum variation difference ΔB in reflectance between reflectance spectrum and straight line AB (wavelength region: 620-780 nm) | | 3.0 | 3.1 | 3.2 | 6.6 | 1.0 | 13.6 |
| Visible light transmittance (%) | | 73.4 | 74.6 | 75.3 | 73.6 | 88.8 | 71.6 |
| Visible light reflectance (%) | | 17.5 | 17.7 | 17.9 | 18.7 | 9.8 | 19.5 |
| Haze value (%) | | 30.1 | 23.0 | 22.1 | 23.5 | 23.6 | 0.40 |
| Shading coefficient | | 0.58 | 0.58 | 0.58 | 0.58 | 0.89 | 0.57 |
| Normal emissivity | | 0.15 | 0.15 | 0.15 | 0.21 | 0.93 | 0.25 |
| Scratch resistance | | A | A | A | A | A | A |
| Adhesion | | 100/100 | 100/100 | 100/100 | 100/100 | 100/100 | 100/100 |
| Appearance | Iridescent pattern | A | A | A | B | A | B |
| | Reflected color change | A | A | A | B | A | B |
| Reflected image | Luminance | AA | AA | AA | AA | B | C |
| | Blur | A | A | A | A | B | — |
| | Glittering | A | A | A | A | A | — |
| Transmitted image | Luminance | AA | AA | AA | AA | AA | C |
| | Blur | AA | AA | AA | AA | AA | — |
| Background viewability | | A | AA | AA | AA | AA | AA |

TABLE 5

| Item | | Comparative Example 3 | Comparative Example 4 | Comparative Example 5 | Comparative Example 6 | Comparative Example 7 | Comparative Example 8 |
|---|---|---|---|---|---|---|---|
| Configuration of transparent member layer | | — | — | Low refractive index layer | — | Low refractive index layer | Low refractive index layer |
| | | — | — | — | — | — | High refractive index layer |
| | | Medium refractive index layer | Medium refractive index layer | — | Medium refractive index layer | — | Light diffusing layer |
| | | Infrared reflective layer | Infrared reflective layer | Infrared reflective layer | Infrared reflective layer | Infrared reflective layer | Infrared reflective layer |
| | | PET base substrate | PET base substrate | PET base substrate | PET base substrate | PET base substrate | PET base substrate |
| | | Pressure-sensitive adhesive layer | Pressure-sensitive adhesive layer | Pressure-sensitive adhesive layer | Light diffusing pressure-sensitive adhesive layer | Light diffusing pressure-sensitive adhesive layer | Pressure-sensitive adhesive layer |
| | | Glass substrate | Glass substrate | Glass substrate | Glass substrate | Glass substrate | Glass substrate |
| Optical adjustment protective layer | Low refractive index layer | — | — | Low refractive index layer-forming coating material A | — | Low refractive index layer-forming coating material A | Low refractive index layer-forming coating material A |
| | | — | — | Thickness: 100 nm | — | Thickness: 100 nm | Thickness: 105 nm |
| | | — | — | Refractive index: 1.38 | — | Refractive index: 1.38 | Refractive index: 1.38 |
| | High refractive index layer | — | — | — | — | — | High refractive index layer-forming coating material C |
| | | — | — | — | — | — | Thickness: 245 nm |
| | | — | — | — | — | — | Refractive index: 1.88 |
| | Medium refractive index layer | Medium refractive index layer-forming coating material D | Medium refractive index layer-forming coating material D | — | Medium refractive index layer-forming coating material D | — | — |
| | | Thickness: 680 nm | Thickness: 550 nm | — | Thickness: 550 nm | — | — |
| | | Refractive index: 1.50 | Refractive index: 1.50 | — | Refractive index: 1.50 | — | — |
| | Total thickness | 680 nm | 550 nm | 100 nm | 550 nm | 100 nm | 350 nm |
| Configuration of infrared reflective layer | | ITO layer: 29 nm | ITO layer: 29 nm | ITO layer: 29 nm | ITO layer: 29 nm | ITO layer: 29 nm | ITO layer: 29 nm |
| | | Ag layer: 12 nm | Ag layer: 12 nm | Ag layer: 12 nm | Ag layer: 12 nm | Ag layer: 12 nm | Ag layer: 12 nm |
| | | ITO layer: 29 nm | ITO layer: 29 nm | ITO layer: 29 nm | ITO layer: 29 nm | ITO layer: 29 nm | ITO layer: 29 nm |
| Light diffusing agent | Type of resin particles | — | — | — | Silicone | Silicone | Silicone |
| | Average particle size (μm) | — | — | — | 4.0 | 4.0 | 4.0 |
| | Amount Added | — | — | — | 3.5 | 3.5 | 7.0 |
| Maximum variation difference ΔA in reflectance between reflectance spectrum and straight line AB (wavelength region: 500-570 nm) | | 8.5 | 7.9 | 0.9 | 7.8 | 0.8 | 9.2 |
| Maximum variation difference ΔB in reflectance between reflectance spectrum and straight line AB (wavelength region: 620-780 nm) | | 15.1 | 12.6 | 1.8 | 12.5 | 1.7 | 10.6 |
| Visible light transmittance (%) | | 71.5 | 72.1 | 76.1 | 72.1 | 76.1 | 72.4 |
| Visible light reflectance (%) | | 21.2 | 20.4 | 16.4 | 20.4 | 16.4 | 18.8 |
| Haze value (%) | | 0.39 | 0.39 | 1.05 | 23.5 | 23.9 | 22.3 |
| Shading coefficient | | 0.57 | 0.57 | 0.58 | 0.57 | 0.58 | 0.58 |
| Normal emissivity | | 0.14 | 0.13 | 0.09 | 0.13 | 0.09 | 0.77 |
| Scratch resistance | | A | A | C | A | C | A |
| Adhesion | | 100/100 | 100/100 | 100/100 | 100/100 | 100/100 | 100/100 |
| Appearance | Iridescent pattern | C | C | A | C | A | A |
| | Reflected color change | C | C | A | C | A | A |
| Reflected image | Luminance | C | C | C | AA | AA | AA |
| | Blur | — | — | — | A | A | AA |
| | Glittering | — | — | — | A | A | A |
| Transmitted image | Luminance | C | C | C | AA | AA | AA |
| | Blur | — | — | — | AA | AA | AA |
| Background viewability | | AA | AA | AA | AA | AA | AA |

TABLE 6

| Item | | Comparative Example 9 | Comparative Example 10 | Comparative Example 11 | Comparative Example 12 | Comparative Example 13 | Comparative Example 14 |
|---|---|---|---|---|---|---|---|
| Configuration of transparent member layer | | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer Medium refractive index layer Infrared reflective layer PET base substrate Light diffusing pressure-sensitive adhesive layer Glass substrate | Low refractive index layer High refractive index layer — Infrared reflective layer PET base substrate Light diffusing pressure-sensitive adhesive layer Glass substrate |
| Optical adjustment protective layer | Low refractive index layer | Low refractive index layer-forming coating material A Thickness: 105 nm Refractive index: 1.38 | Low refractive index layer-forming coating material A Thickness: 105 nm Refractive index: 1.38 | Low refractive index layer-forming coating material A Thickness: 105 nm Refractive index: 1.38 | Low refractive index layer-forming coating material A Thickness: 105 nm Refractive index: 1.38 | Low refractive index layer-forming coating material A Thickness: 110 nm Refractive index: 1.38 | Low refractive index layer-forming coating material A Thickness: 90 nm Refractive index: 1.38 |
| | High refractive index layer | High refractive index layer-forming coating material A Thickness: 335 nm Refractive index: 1.79 | High refractive index layer-forming coating material A Thickness: 335 nm Refractive index: 1.79 | High refractive index layer-forming coating material A Thickness: 335 nm Refractive index: 1.79 | High refractive index layer-forming coating material A Thickness: 335 nm Refractive index: 1.79 | High refractive index layer-forming coating material A Thickness: 820 nm Refractive index: 1.79 | High refractive index layer-forming coating material C Thickness: 115 nm Refractive index: 1.88 |
| | Medium refractive index layer | Medium refractive index layer-forming coating material A Thickness: 160 nm Refractive index: 1.51 | Medium refractive index layer-forming coating material A Thickness: 160 nm Refractive index: 1.51 | Medium refractive index layer-forming coating material A Thickness: 160 nm Refractive index: 1.51 | Medium refractive index layer-forming coating material A Thickness: 160 nm Refractive index: 1.51 | Medium refractive index layer-forming coating material A Thickness: 150 nm Refractive index: 1.51 | — |
| | Total thickness | 600 nm | 600 nm | 600 nm | 600 nm | 1080 nm | 205 nm |
| Configuration of infrared reflective layer | | ITO layer: 35 nm Ag layer: 4 nm ITO layer: 35 nm | ITO layer: 29 nm Ag layer: 21 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm | ITO layer: 29 nm Ag layer: 12 nm ITO layer: 29 nm |
| Light diffusing agent | Type of resin particles | Silicone | Silicone | Silicone | Silicone | Silicone | Silicone |
| | Average particle size (μm) | 4.0 | 4.0 | 4.0 | 4.0 | 4.0 | 4.0 |
| | Amount Added | 3.5 | 3.5 | 0.5 | 5.5 | 3.5 | 3.5 |
| Maximum variation difference ΔA in reflectance between reflectance spectrum and straight line AB (wavelength region: 500-570 nm) | | 2.0 | 3.0 | 4.6 | 4.2 | 2.8 | 3.1 |
| Maximum variation difference ΔB in reflectance between reflectance spectrum and straight line AB (wavelength region: 620-780 nm) | | 3.0 | 7.5 | 3.3 | 3.0 | 3.0 | 3.8 |
| Visible light transmittance (%) | | 82.9 | 56.7 | 74.9 | 73.5 | 74.2 | 70.2 |
| Visible light reflectance (%) | | 10.3 | 36.5 | 17.7 | 17.5 | 18.0 | 23.0 |
| Haze value (%) | | 23.4 | 23.6 | 3.9 | 36.1 | 24.0 | 23.2 |
| Shading coefficient | | 0.83 | 0.46 | 0.58 | 0.58 | 0.58 | 0.58 |
| Normal emissivity | | 0.26 | 0.06 | 0.15 | 0.15 | 0.23 | 0.10 |
| Scratch resistance | | A | A | A | A | A | C |
| Adhesion | | 100/100 | 100/100 | 100/100 | 100/100 | 100/100 | 91/100 |
| Appearance | Iridescent pattern | A | B | A | A | A | A |
| | Reflected color change | A | B | A | A | A | A |
| Reflected image | Luminance | C | AA | C | AA | AA | AA |
| | Blur | B | A | — | A | A | A |
| | Glittering | A | C | — | A | A | A |
| Transmitted image | Luminance | AA | B | C | AA | AA | AA |
| | Blur | AA | A | — | AA | AA | AA |
| Background viewability | | AA | C | AA | B | AA | AA |

As can be seen from Tables 1 to 4, the transparent heat-shielding/heat-insulating members having a transparent screen function of Examples 1 to 22 provide excellent heat-shielding and heat-insulating properties when used as a solar control transparent window film for saving energy throughout the year, provides excellent viewability from both sides of a screen onto which an image is projected when used as a transparent screen for digital signage, in particular, in terms of reflective viewability from the projector side, excellent brightness (luminance) and image clarity (less blur), and the background viewability with clarity.

Moreover, in Examples 1 to 22, the scratch resistance was excellent, the values of the maximum variation differences ΔA and ΔB of reflectance were small, the reflected color change due to the iridescent phenomenon or viewing angle was reduced, and the appearance was excellent.

As to appearance, the transparent members of Examples 1 to 5, 9, 10, and 12 to 21 resulted in very small values of both the maximum variation differences ΔA and ΔB of reflectance and had particularly excellent appearance. The transparent members of Examples 6 to 8, 11 and 22 resulted in a slightly large value of ΔB, and the appearance was slightly inferior as compared with that of the transparent members of Examples 1 to 5, 9, 10 and 12 to 21.

In the comparison of Examples 1 to 9 (all having the infrared reflective layer of the same configuration and having the three-layered optical adjustment protective layer), the transparent members of Examples 2 to 4 and 8, in which the total thickness of the optical adjustment protective layer was greater than 700 nm, resulted in slightly higher normal emissivity and slightly inferior heat-insulating properties as compared with those of the transparent members of Examples 1, 5 to 7 and 9, in which the total thickness of the optical adjustment protective layer was less than 700 nm. The transparent member of Example 6, in which the total thickness of the optical adjustment protective layer was 250 nm, resulted in slightly inferior scratch resistance in the white flannel cloth slide test as compared with that of the transparent members of Examples 1 to 5 and 7 to 9.

In the comparison of Examples 13 to 17 (all having the infrared reflective layer of the same configuration and having the two-layered optical adjustment protective layer), the transparent members of Examples 15 and 16, in which the total thickness of the optical adjustment protective layer was greater than 700 nm, resulted in slightly higher normal emissivity and slightly inferior heat-insulating properties as compared with those of the transparent members of Examples 13, 14 and 17, in which the total thickness of the optical adjustment protective layer was less than 700 nm. The transparent member of Example 17, in which the total thickness of the optical adjustment protective layer was 250 nm, resulted in slightly inferior scratch resistance in the white flannel cloth slide test as compared with that of the transparent members of Examples 13 to 16.

In Example 10, the thickness of the Ag layer of the infrared reflective layer was 10 nm, which was slightly thin, and the visible light reflectance was 12.8%, which was a little low, and thus the luminance of the reflected image of the transparent screen was slightly lower than that of the transparent members of Examples 1 and 11.

The transparent member of Example 22, in which acrylic-based hardcoat resin was used in the medium refractive index layer, resulted in slightly higher normal emissivity and slightly inferior heat-insulating properties as compared with those of the transparent member of Example 8, in which the modified polyolefin-based resin having an acidic group was used in the medium refractive index layer.

Meanwhile, the transparent member of Comparative Example 1 had a light diffusing layer, but did not have an infrared reflective layer. Thus, the appearance was good, but the shading coefficient was as high as 0.89, the normal emissivity was as high as 0.93, and heat-shielding performance and heat-insulating performance as a solar control transparent film were not obtained. Also, as a transparent screen, the transmitted image was clear, but the reflected image had a slightly low luminance, and there was a small amount of blur in the image, and the viewability was slightly poor.

The transparent members of Comparative Examples 2 to 5 had an infrared reflective layer, but did not have a light diffusing layer. Thus, although they had a function as a solar control transparent film, it was almost not possible to view the reflected image and the transmitted image as the transparent screen. In Comparative Examples 3 and 4, the optical adjustment protective layer was composed only of the medium refractive index layer, and the total thickness overlapped the wavelength range of visible light, and thus the values of the maximum variation differences ΔA and ΔB of reflectance were large, and the appearance was poor. In Comparative Example 5, the optical adjustment protective layer was composed only of the low refractive index layer having a total thickness of 100 nm, and thus the appearance was good, but the scratch resistance was poor in the white flannel cloth slide test.

The transparent members of Comparative Examples 6 and 7 had an infrared reflective layer and a light diffusing layer, and had good functions as a solar control transparent film and a transparent screen. However, in Comparative Example 6, the optical adjustment protective layer was composed only of the medium refractive index layer having a total thickness of 550 nm, and thus the values of the maximum variation differences ΔA and ΔB of reflectance were large, and the appearance was poor. In Comparative Example 7, the optical adjustment protective layer was composed only of the low refractive index layer having a total thickness of 100 nm, and thus the appearance was good, but the scratch resistance was poor in the white flannel cloth slide test.

In Comparative Example 8, the light diffusing layer having a thickness of 12 μm was provided on the infrared reflective layer, and thus the absorption of far-infrared rays was large, and the normal emissivity was as high as 0.77, and heat-insulating properties were poor.

In Comparative Example 9, the thickness of the Ag layer of the infrared reflective layer was as thin as 4 nm, and the visible light reflectance was less than 12%, and thus the reflected image of the transparent screen had a low luminance, there was a small amount of blur in the image, and the viewability was slightly poor. Meanwhile, in Comparative Example 10, the thickness of the Ag layer of the infrared reflective layer was as thick as 21 nm, and the visible light reflectance was greater than 30%, and thus the image had a strong half mirror appearance. Also, the reflected image was glittered, and the transmitted image had a slightly low luminance, and the viewability was slightly poor. In addition, the visible light transmittance was also low, and the background viewability was poor.

In Comparative Example 11, the haze value was less than 5%, and thus it was almost not possible to clearly view the reflected image and the transmitted image of the transparent screen although they were barely recognized. In Comparative Example 12, the haze value was greater than 35%, and thus the transparent heat-shielding/heat-insulating member appeared slightly whitish, and the background viewability was slightly poor.

In Comparative Example 13, the three-layered optical adjustment protective layer was provided on the infrared reflective layer, but the total thickness of the optical adjustment protective layer was greater than 980 nm, and thus the normal emissivity was as high as 0.23, and the heat-insulating properties were inferior to those in the examples. In Comparative Example 14, the two-layered optical adjustment protective layer was provided on the infrared reflective layer, but the total thickness of the optical adjustment protective layer was less than 250 nm, and thus the scratch resistance was inferior to that in the examples in the white flannel cloth slide test.

INDUSTRIAL APPLICABILITY

The transparent member of the present invention can be used, when being attached to a transparent substrate such as, for example, a window pane by using a transparent pressure-sensitive adhesive or the like, as a transparent heat-shielding/heat-insulating member that allows the background to be transparently viewed with clarity, that has excellent scratch resistance and excellent appearance with less reflected color change due to the iridescent phenomenon or viewing angle, or in other words, as a solar control transparent film for saving energy throughout the year, and at the same time, as a transparent screen for digital signage that provides excellent viewability from both sides of a screen onto which an image is projected, in particular, in terms of reflective viewability from the projector side, excellent brightness (luminance) and image clarity (less blur). Accordingly, the transparent member is very useful in every scene.

DESCRIPTION OF REFERENCE NUMERALS 101, 102, 103, 104, 105 transparent heat-shielding/heat-insulating member having a transparent screen function
   11 transparent base substrate
   12 infrared reflective layer
   13 optical adjustment protective layer
   13A medium refractive index layer
   13B high refractive index layer
   13C low refractive index layer
   14 light diffusing layer
   15 pressure-sensitive adhesive layer
   16 light diffusing pressure-sensitive adhesive layer
   17 glass plate
   18 protective layer
   20 transparent heat-shielding/heat-insulating member
   30 transparent screen

The invention claimed is:

1. A transparent heat-shielding/heat-insulating member having a transparent screen function,
   wherein the transparent heat-shielding/heat-insulating member having a transparent screen function comprises, with respect to a transparent base substrate, at least:
   (1) an infrared reflective layer and an optical adjustment protective layer in this order from the transparent base substrate side; and
   (2) a light diffusing layer on a surface of the transparent base substrate that is opposite to the surface on which the infrared reflective layer is formed or between the transparent base substrate and the infrared reflective layer,
   (3) the infrared reflective layer includes a metal layer and at least one selected from a metal oxide layer and a metal nitride layer,
   (4) the optical adjustment protective layer includes at least a high refractive index layer and a low refractive index layer in this order from the infrared reflective layer side, and has a total thickness of 250 nm to 980 nm,
   (5) the light diffusing layer contains a transparent resin and light diffusing particles, and
   the transparent heat-shielding/heat-insulating member having a transparent screen function has (6) a visible light reflectance measured in accordance with JIS R3106-1998 of 12% or more and 30% or less, (7) a haze value measured in accordance with JIS K7136-2000 of 5% or more and 35% or less, (8) a shading coefficient measured in accordance with JIS A5759-2008 of 0.69 or less, and (9) a normal emissivity measured in accordance with JIS R3106-2008 of 0.22 or less.

2. The transparent heat-shielding/heat-insulating member having a transparent screen function according to claim 1,
   wherein the optical adjustment protective layer includes a high refractive index layer and a low refractive index layer in this order from the infrared reflective layer side,
   the high refractive index layer has a refractive index at a wavelength of 550 nm of 1.65 to 1.95 and is set to have a thickness of 160 nm to 870 nm, and
   the low refractive index layer has a refractive index at a wavelength of 550 nm of 1.30 to 1.45 and is set to have a thickness of 75 nm to 125 nm.

3. The transparent heat-shielding/heat-insulating member having a transparent screen function according to claim 1,
   wherein the optical adjustment protective layer includes a medium refractive index layer, a high refractive index layer and a low refractive index layer in this order from the infrared reflective layer side,
   the medium refractive index layer has a refractive index at a wavelength of 550 nm of 1.45 to 1.55 and is set to have a thickness of 80 nm to 200 nm,
   the high refractive index layer has a refractive index at a wavelength of 550 nm of 1.65 to 1.95 and is set to have a thickness of 100 nm to 720 nm, and
   the low refractive index layer has a refractive index at a wavelength of 550 nm of 1.30 to 1.45 and is set to have a thickness of 70 nm to 150 nm.

4. The transparent heat-shielding/heat-insulating member having a transparent screen function according to claim 3, wherein the medium refractive index layer in the optical adjustment protective layer contains a modified polyolefin-based resin having an acidic group.

5. The transparent heat-shielding/heat-insulating member having a transparent screen function according to claim 1,
   wherein, in a reflectance spectrum of the transparent heat-shielding/heat-insulating member having a transparent screen function measured in accordance with JIS R3106-1998,
   provided that:
   a point A is a point at a wavelength of 535 nm on a virtual line a that represents an average of a maximum reflectance and a minimum reflectance of the reflectance spectrum in a range of wavelengths from 500 nm to 570 nm;
   a point B is a point at a wavelength of 700 nm on a virtual line b that represents an average of a maximum reflectance and a minimum reflectance of the reflectance spectrum in a range of wavelengths from 620 nm to 780 nm; and a reference straight line AB is a straight line passing through the point A and the point B and extending in a range of wavelengths from 500 nm to 780 nm, when reflectance values of the reflectance spectrum and reflectance values of the reference straight line AB are compared in the range of wavelengths from 500 nm to 570 nm, and provided that a maximum variation difference $\Delta A$ is an absolute value of a difference in the reflectance value between the reflectance spectrum and the reference straight line AB at a wavelength where the absolute value of the difference becomes maximum, the maximum variation difference $\Delta A$ expressed by percentage of reflectance is 7% or less, and when reflectance values of the reflectance spectrum and reflectance values of the reference straight line AB are compared in the range of wavelengths from 620 nm to 780 nm, and provided that a maximum variation difference $\Delta B$ is an absolute value of a difference in the reflectance value between the reflectance spectrum and the reference straight line AB at a wavelength where the absolute value of the difference becomes maximum, the maximum variation difference $\Delta B$ expressed by percentage of reflectance is 9% or less.

6. The transparent heat-shielding/heat-insulating member having a transparent screen function according to claim 1, wherein the transparent heat-shielding/heat-insulating member having a transparent screen function has a visible light transmittance measured in accordance with JIS A5759-2008 of 65% or more.

7. The transparent heat-shielding/heat-insulating member having a transparent screen function according to claim 1, wherein the infrared reflective layer has a two-layer structure composed of a metal layer and a metal oxide layer or metal nitride layer that are stacked in this order on the transparent base substrate.

8. The transparent heat-shielding/heat-insulating member having a transparent screen function according to claim 1, wherein the infrared reflective layer has a three-layer structure composed of a metal oxide layer or metal nitride layer, a metal layer, and a metal oxide layer or metal nitride layer that are stacked in this order on the transparent base substrate.

* * * * *